United States Patent [19]
Southby et al.

[11] Patent Number: 6,007,973
[45] Date of Patent: Dec. 28, 1999

[54] TIGHT WRAPPED PHOTOGRAPHIC ELEMENT CONTAINING A HIGH DYE-YIELD COUPLER

[75] Inventors: David Thomas Southby; Richard Peter Szajewski, both of Rochester, N.Y.

[73] Assignee: Eastman Kodak Company, Rochester, N.Y.

[21] Appl. No.: 08/939,468

[22] Filed: Sep. 22, 1997

Related U.S. Application Data

[63] Continuation of application No. 08/565,122, Nov. 30, 1995, abandoned, which is a continuation of application No. 08/250,199, May 27, 1994, abandoned.

[51] Int. Cl.⁶ .............................. G03C 1/00; G03C 3/00
[52] U.S. Cl. ..................... 430/496; 430/501; 430/543; 430/958; 430/500
[58] Field of Search ................................ 430/496, 500, 430/501, 543, 958

[56] References Cited

U.S. PATENT DOCUMENTS

| | | | |
|---|---|---|---|
| 4,840,884 | 6/1989 | Mooberry et al. | 430/559 |
| 4,895,791 | 1/1990 | Mukunoki | 430/523 |
| 5,250,404 | 10/1993 | Sakakibara | 430/531 |
| 5,326,689 | 7/1994 | Murayama | 430/530 |
| 5,336,589 | 8/1994 | Mukunoki et al. | 430/501 |
| 5,338,650 | 8/1994 | Iwagaki | 430/496 |

FOREIGN PATENT DOCUMENTS

| | | | |
|---|---|---|---|
| 295439 | 12/1988 | European Pat. Off. | G03C 1/02 |
| 299719 | 1/1989 | European Pat. Off. | G03C 1/005 |
| 468104 | 1/1992 | European Pat. Off. | G03C 1/485 |
| 476521 | 3/1992 | European Pat. Off. | G03C 1/34 |
| 482599 | 4/1992 | European Pat. Off. | G03C 1/10 |
| 293207 | 8/1991 | Germany | G03C 1/06 |
| 92/12459 | 7/1992 | WIPO | G03C 1/015 |

*Primary Examiner*—Geraldine Letscher
*Attorney, Agent, or Firm*—Arthur E. Kluegel

[57] ABSTRACT

The invention provides a tightly wrapped photographic element comprising a support bearing at least one photographic silver halide emulsion having associated therewith at least one high dye-yield coupler that releases a dye having an electrically neutral dye chromophore, said element having a radius of curvature of less than 6,000 micrometers. The tightly wrapped photographic element exhibits less pressure sensitivity than conventional elements while maintaining satisfactory photographic response.

16 Claims, No Drawings

TIGHT WRAPPED PHOTOGRAPHIC ELEMENT CONTAINING A HIGH DYE-YIELD COUPLER

This is a Continuation of application Ser. No. 08/565,122, filed Nov. 30, 1995, now abandoned, which is a Continuation of application Ser. No. 08/250,199, file May 27, 1994, now abandoned.

FIELD OF THE INVENTION

This invention relates to a tightly wrapped photographic element containing a high dye-yield coupler which exhibits less pressure fog as a result of small radius of curvature than experienced with conventional photographic elements.

BACKGROUND OF THE INVENTION

This invention involves the use of an image dye-forming coupler which releases a dye or dye precursor as the coupling off group. These are called "High Dye-Yield" (HDY) couplers because they form two molecules of dye for each molecule of coupler which is consumed.

Useful high dye-yield couplers have been disclosed by Mooberry and Singer in U.S. Pat. 4,840,884. (The '884 patent) Such couplers react with oxidized color developer to form one dye and in doing so release a precursor of a second dye having a neutral dye chromophore. In accordance with the patent, the new couplers described therein enable lower concentrations of silver halide in the photographic element without lowering image quality.

Large, high speed silver halide emulsions coated on a support, particularly those with a tabular morphology, are sensitive to fog formation caused by pressure events. These pressure events can arise from the film being tightly wound around a spindle in a film cartridge, or from contact with rollers and other surfaces during its manufacture and use, or from any bending of a flexible support bearing such an emulsion through a severe radius of curvature.

Various ways are known in the art by which the film structure may be modified or by which the sensitive emulsion may be modified to reduce the pressure sensitivity. For instance, the incorporation of pressure absorbing layers in the top of the film pack is well known. The inclusion of hydroquinones in such layers is taught in DD293207, EP476,521 and 482,599. Polymeric inclusions are described in U.S. Pat. No. 4,895,791. While these methods offer good reduction in pressure fog etc, they add material to the upper layers of the film material. This means that those layers are thicker and so there is a concomitant reduction in the sharpness and developability of underlying layers. Modifications to the structure of the silver halide emulsions to reduce pressure sensitivity are also known. For example, EP 295,439 and EP 299,719 describe the preparation of emulsions with low pressure sensitivity, and EP 517,901 describes an emulsion surface treatment to reduce pressure sensitivity. It is also possible to release antifoggants in the layer to reduce sensitivity (eg. EP 468,104). These methods lead to changes in the structure, speed, or developability of the emulsion and so they can adversely affect its performance.

Current trends are toward the miniaturization of cameras and the film employed to record the image. These trends may be served through the utilization of film which is smaller in format and/or is more tightly wrapped than is the case with conventional cameras and film. Thus, the desired miniaturization is dependent on a photographic element which can withstand a tight wrapping about the film spool without undue increase in pressure fog.

It is a problem to be solved to provide a tightly wrapped photographic element which exhibits less pressure sensitivity than conventional elements while maintaining satisfactory photographic response.

SUMMARY OF THE INVENTION

The invention provides a tightly wrapped photographic element comprising a support bearing at least one photographic silver halide emulsion having associated therewith at least one high dye-yield coupler that releases a dye having an electrically neutral dye chromophore, said element having a radius of curvature of less than 6000 micrometers.

The tightly wrapped photographic element exhibits less pressure sensitivity than conventional elements while maintaining satisfactory photographic response.

DETAILED DESCRIPTION OF THE INVENTION

The incorporation of the HDY coupler enables the photographic layer to be built with lower silver halide and coupler laydowns than are required with a conventional coupler. Even though the silver development signal is amplified more by the HDY coupler, so as to produce a sensitometric match with the conventional system, the pressure fog is significantly reduced.

The invention provides a photographic element comprising a support bearing a light sensitive photographic silver halide emulsion layer wherein the layer has associated therewith a coupler capable of combining with oxidized developer to form a first dye, the coupler also containing a coupling-off group which is released during development to form a precursor of a second dye, the precursor having an electrically neutral dye chromophore bonded to a linking group selected form the group consisting of —OC(O)—, —OC(S)—, —SC(O)—, —SC(S)—, and —OC(=NSO$_2$R)— where R is substituted or unsubstituted alkyl or aryl;

wherein the amount of said coupler associated with the layer and the amount of silver in the layer is such that the molar ratio of the dye formable from the coupler to the silver contained in the layer is less than 1.0. It is desirable but not essential that the second dye has a calculated logarithm of its neutral partition coefficient (ClogP) in the range of 3.5 to 5.5.

The dye forming coupler of the invention has the general formula:

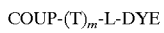

COUP-(T)$_m$-L-DYE where COUP is the parent group of the coupler capable of reacting at the coupling position with oxidized color developer to form a first dye, T is one or more optional timing groups with m=0 to 2, L is a particular linking group, and DYE is a second dye.

COUP is the parent portion of a coupler that is capable of coupling with oxidized developer to form a dye. As described more fully hereafter, the dye may be of any desired color or may be colorless and if desired, it may be of the so-called universal type which washes out of the element during processing.

Image dye-forming couplers may be included in the element such as couplers that form cyan dyes upon reaction with oxidized color developing agents which 30 are described in such representative patents and publications as: U.S. Pat. Nos. 2,367,531, 2,423,730, 2,474,293, 2,772,162, 2,895,826, 3,002,836, 3,034,892, 3,041,236, 4,333,999, 4,883,746 and "Farbkuppler-eine LiteraturUbersicht," published in Agfa Mitteilungen, Band III, pp. 156–175 (1961). Preferably such couplers are phenols and naphthols that form cyan dyes on reaction with oxidized color developing agent.

Couplers that form magenta dyes upon reaction with oxidized color developing agent are described in such representative patents and publications as: U.S. Pat. Nos. 2,311,082, 2,343,703, 2,369,489, 2,600,788, 2,908,573, 3,062,653, 3,152,896, 3,519,429, and "Farbkuppler-eine LiteraturUbersicht," published in Agfa Mitteilungen, Band III, pp. 126–156 (1961). Preferably such couplers are pyrazolones, pyrazolotriazoles, or pyrazolobenzimidazoles that form magenta dyes upon reaction with oxidized color developing agents.

Couplers that form yellow dyes upon reaction with oxidized color developing agent are described in such representative patents and publications as: U.S. Pat. Nos. 2,298,443, 2,407,210, 2,875,057, 3,048,194, 3,265,506, 3,447,928, 4,022,620, 4,443,536, and "Farbkuppler-eine LiteraturUbersicht," published in Agfa Mitteilungen, Band III, pp. 112–126 (1961). Such couplers are typically open chain ketomethylene compounds.

Couplers that form colorless products upon reaction with oxidized color developing agent are described in such representative patents as: U.K. Patent No. 861,138; U.S. Pat. Nos. 3,632,345, 3,928,041, 3,958,993 and 3,961,959. Typically such couplers are cyclic carbonyl containing compounds that form colorless products on reaction with an oxidized color developing agent.

Couplers that form black dyes upon reaction with oxidized color developing agent are described in such representative patents as U.S. Pat. Nos. 1,939,231; 2,181,944; 2,333,106; and 4,126,461; German OLS No. 2,644,194 and German OLS No. 2,650,764. Typically, such couplers are resorcinols or m-aminophenols that form black or neutral products on reaction with oxidized color developing agent.

In addition to the foregoing, so-called "universal" or "washout" couplers may be employed. These couplers do not contribute to image dye-formation. Thus, for example, a naphthol having an unsubstituted carbamoyl or one substituted with a low molecular weight substituent at the 2- or 3-position may be employed. Couplers of this type are described, for example, in U.S. Pat. Nos. 5,026,628, 5,151,343, and 5,234,800.

T is a timing group which, as indicated by the value range for m of from 0 to 2, may be absent or may represent one or two such timing groups. Such groups are well-known in the art such as (1) groups utilizing the cleavage reaction of a hemiacetal (U.S. Pat. No. 4,146,396, Japanese Applications 60-249148; 60-249149); (2) groups utilizing an electron transfer reaction along a conjugated system (U.S. Pat. No. 4,409,323; 4,421,845; Japanese Applications 57-188035; 58-98728; 58-209736; 58-209738); (3) groups utilizing the cleavage of imino ketals (U.S. Pat. No. 4,546,073); (4) groups that function as a coupler or reducing agent after the coupler reaction (U.S. Pat. No. 4,438,193; U.S. Pat. No. 4,618,571); and (5) groups using an intramolecular nucleophilic substitution reaction (U.S. Pat. No. 4,248,962). The timing group to which the L-DYE group of the invention is optionally attached is any one which will permit release of the L-DYE group. Foregoing group (5) is not suitable as the group to release L-DYE but could serve as the first of a sequence of two timing groups. Other timing groups are generally suitable for releasing -L-DYE. Timing groups as described under (2) and the listed patents are most suitable. Generally these consist of a bond from COUP or another timing group to an oxygen atom which is bonded to a substituted or unsubstituted aromatic hydrocarbyl or heterocyclic ring at a location in conjugation with a methyl group on the ring which may optionally be substituted with one or two alkyl groups, where the methyl group is bonded to L-DYE or a second timing group. A typical such group based on an aromatic hydrocarbyl group has the formula:

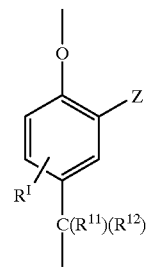

wherein Z is selected from the group consisting of nitro, cyano, alkylsulfonyl; sulfamoyl (—SO$_2$NR$_2$); and sulfonamido (—NRSO$_2$R) groups; R is hydrogen or a substituent such as alkyl; R$^7$, R$^{11}$ and R$^{12}$ are independently hydrogen or substituents that do not adversely affect the coupling and release reactions or the properties of the dyes formed thereby.

One example of such a group containing an aromatic heterocycle is:

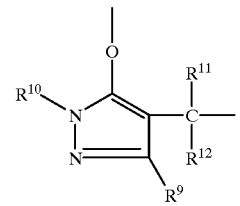

where R$^9$ through R$^{12}$ are independently hydrogen or substituents that do not adversely affect the coupling and release reactions or the properties of the dyes formed thereby.

L is a group which serves to connect COUP (or T, if present) to the second dye. L has a formula so as to permit -L-DYE or -(T)$_m$-L-DYE to be cleaved from the coupler upon the coupler's oxidative coupling with color developer during development processing. COUP combines with the oxidized developer to form the first dye and the fragment -L-DYE or -(T)m-L-DYE is then freed from COUP. Suitable groups for L are —OC(O)—, —OC(S)—, —SC(O)—, —SC(S)—, or —OC(=NSO$_2$R)—, where R is substituted or unsubstituted alkyl or aryl. Such groups permit the cleavage of the fragment from COUP and are cleaved from DYE. U.S. Pat. No. 4,840,884 generally describes photographic elements employing high dye yield couplers having electrically neutral chromophores, and the contents thereof are incorporated herein by reference. Further, particularly suitable couplers containing a methine dye chromophore are described in an application of Mooberry et al entitled "Photographic Element Containing A High Dye-Yield Coupler With A Methine Dye Chromophore" which is cofiled herewith.

In one embodiment of the invention, when the ClogP is appropriately selected, it is believed that mobility of the -L-DYE or -(T)$_m$-L-DYE fragment is permitted while the linking group is attached to the second dye but, once the linking group is cleaved from the second dye, diffusion of DYE is no longer possible. This result is achieved through the provision that the the second dye has a calculated neutral partition coefficient (ClogP) in the range of 3.5 to 5.5. Thus, when the linking group is cleaved from the second dye, the dye no longer contains the charged highly polar portion represented by the linking group. It follows that the second dye is no longer free to diffuse after the linking group has separated and this provides good stability of the image dye from the standpoint of long term image stability.

The neutral partition coefficient is the ratio of the distribution at equilibrium of a compound between octanol and water. The calculated values are derived using Medchem software, version 3.54, Medical Chemistry Project, Pomona College, Claremont, Calif. For a recent discussion of this method see Albert J. Leo, in "Comprehensive Medicinal Chemistry", edited by C. Hansch, P. G. Sammes, and J. B. Taylor, Pergamon Press, New York, Volume 4, 1990).

The coupler of the invention releases a second dye having an electrically neutral chromophore. By this is meant that the chromophore at its characteristic hue bears no formal electrical charge. The second dye of the invention suitably contains a substituted nitrogen group which is bonded to the linking group. Such dyes may be any of the types disclosed, for example, in the aforementioned U.S. Pat. No. 4,840,884 and may be synthesized as described therein.

The DYE as described includes any releasable, electrically neutral dye that enables dye hue stabilization without mordanting the dye formed. The release mechanism can be initiated by oxidized reducing agent.

In U.S. Pat. No. 4,840,884, the term DYE is defined so that the adjacent nitrogen atom is not a part of DYE while the definition herein does include the nitrogen atom. In either case, the composition of the dye formed by release is the same.

The $R^1$ substituent on $—NR^1—$ can be any substituent that does not adversely affect the coupler. When the $—NR^1—$ is part of an auxochrome, $R^1$ can be, for example, hydrogen or alkyl, such as alkyl containing 1 to 42 carbon atoms, including methyl, ethyl, propyl, n-butyl, t-butyl or eicosyl, or aryl, such as phenyl. When the nitrogen atom attached to L is part of a chromophore, $R^1$ becomes an integral part of the chromophore. Preferred $R^1$ groups are alkyl, such as alkyl containing 1 to 18 carbon atoms when $R^1$ is part of the dye auxochrome. $R^1$ when part of the chromophore is, for example, unsubstituted or substituted aryl, such as phenyl.

The selection of the type and size of the substituents of DYE can be made in order to provide a partition coefficient of DYE which permits the desired degree of diffusion.

Particularly useful classes of DYE moieties are:

I. Azo dye moieties including the $—NR^1—$ group represented by the structure:

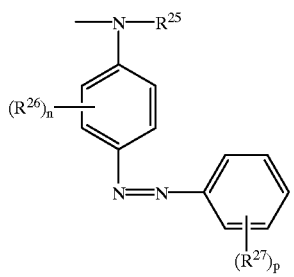

wherein $R^{25}$ is hydrogen or a substituent, such as alkyl and $R^{26}$ and $R^{27}$ independently represent substituents such as alkyl, where n is 0 to 4 and p is 0 to 5.

II. Azamethine dye moieties including the $—NR^1—$ group represented by the structure:

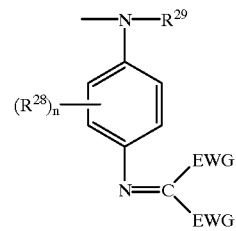

wherein $R^{28}$ is a substituent, such as alkyl where n is 0 to 4; $R^{29}$ is hydrogen or a substituent, such as alkyl; and EWG is an electron withdrawing group.

III. Methine dye moieties including the $—NR^1—$ group represented by the structure:

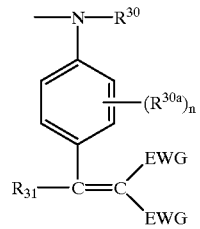

wherein $R^{30}$ and $R^{31}$ are independently hydrogen or a substituent, such as alkyl; $R^{30a}$ is a substituent such as alkyl where n is 0 to 4; and EWG is an electron withdrawing group having a positive Hammett's sigma(para) value.

The term DYE also includes dye precursors wherein the described substituted nitrogen atom is an integral part of the chromophore, also described herein as leuco dye moieties. Such dye precursors include, for example:

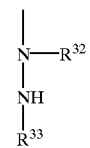

wherein $R^{32}$ is a group that is cleaved during processing to leave NH, N=C, or C=C, and $R^{33}$ is aryl, such as substituted phenyl.

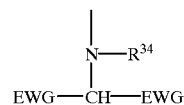

wherein $R^{34}$ is a group that is cleaved during processing to leave NH, N=C, or C=C; and EWG is an electron withdrawing group as defined above.

Examples of cyan, magenta, yellow and leuco dyes are as follows:

A. Cyan

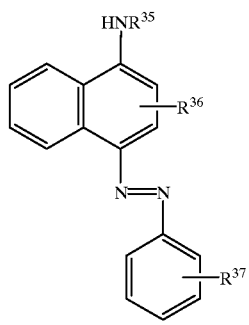

wherein $R^{35}$ is a substituent that does not adversely affect the dye, such as alkyl; $R^{36}$ is a substituent, such as an electron releasing group having a Hammett's sigma(para) value less than 0; and $R^{37}$ is one or more substituents, such as a strong electron withdrawing group having a Hammett's sigma (para) value of at least 0.23.

B. Magenta

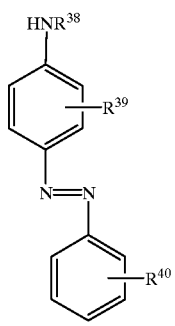

wherein $R^{38}$ is a substituent that does not adversely affect the dye, such as alkyl; $R^{39}$ is a substituent, such as an electron releasing group as defined above; and $R^{40}$ is a substituent, such as a strong electron withdrawing group as defined above.

C. Yellow

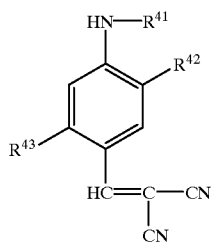

wherein $R^{41}$ is alkyl; $R^{42}$ is alkoxy, alkyl, or H; and $R^{43}$ is alkyl or H; and

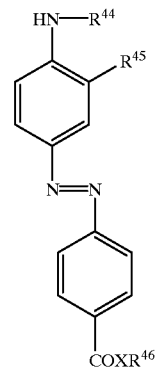

wherein $R^{44}$ is alkyl; $R^{45}$ is alkoxy, alkyl, or H; $R^{46}$ is alkyl or aryl; and X is —O— or —NR*— where R* is H, alkyl, or aryl.

D. Leuco

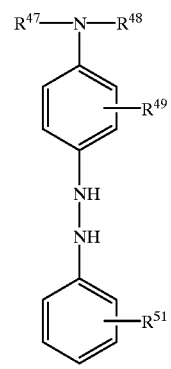

wherein $R^{47}$ and $R^{48}$ are individually hydrogen or alkyl; $R^{49}$ is an electron releasing group as defined above; and $R^{51}$ is a strong electron withdrawing group as defined above.

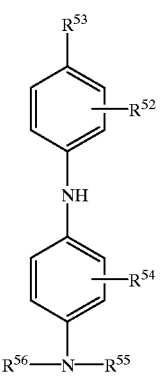

wherein $R^{52}$ and $R^{54}$ are individually hydrogen or a substituent; $R^{53}$ is —NHR$^a$ or —NHSO$_2$R$^a$ wherein R$^a$ is a substituent; and $R^{55}$ and $R^{56}$ are individually hydrogen or a substituent.

The following are examples of suitable high dye yield couplers of the invention:

I-1
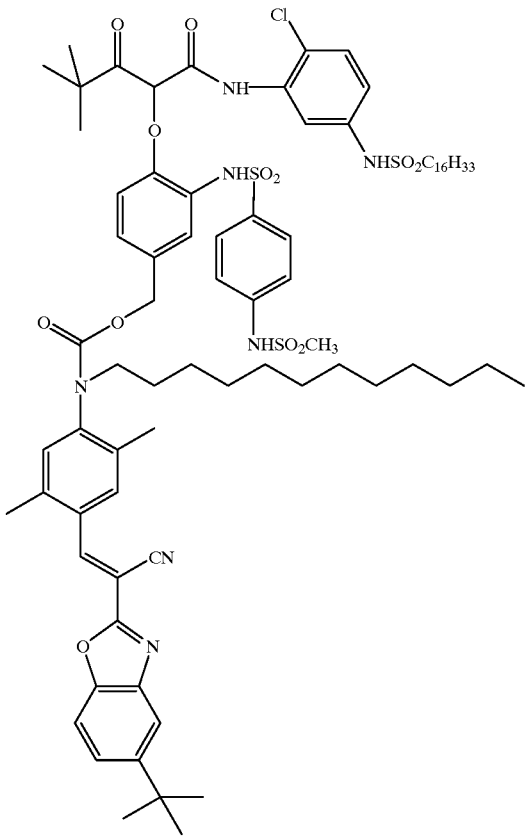
I-2
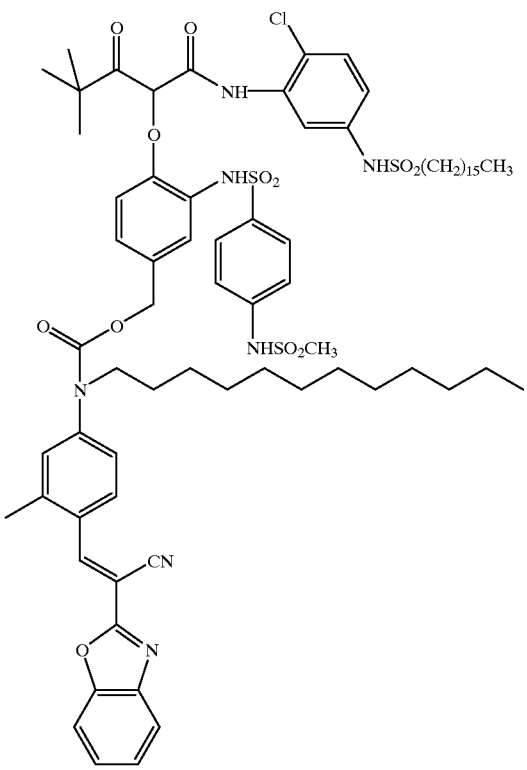

I-3
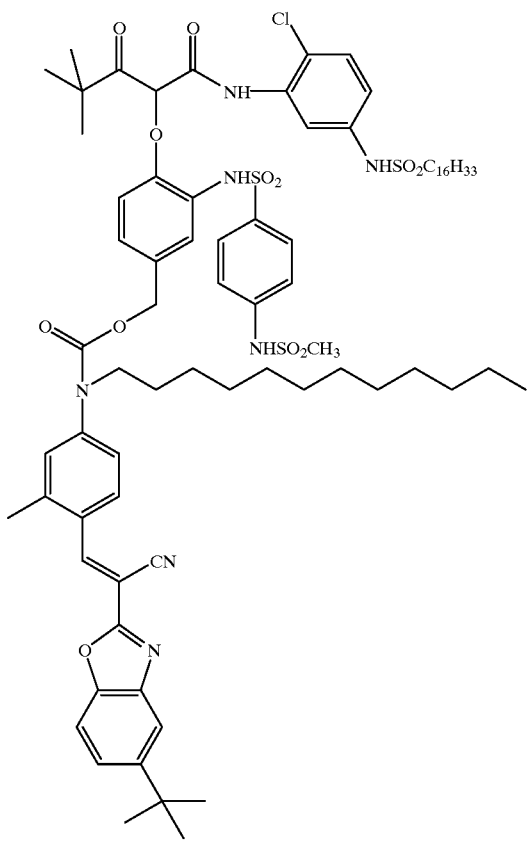
I-4
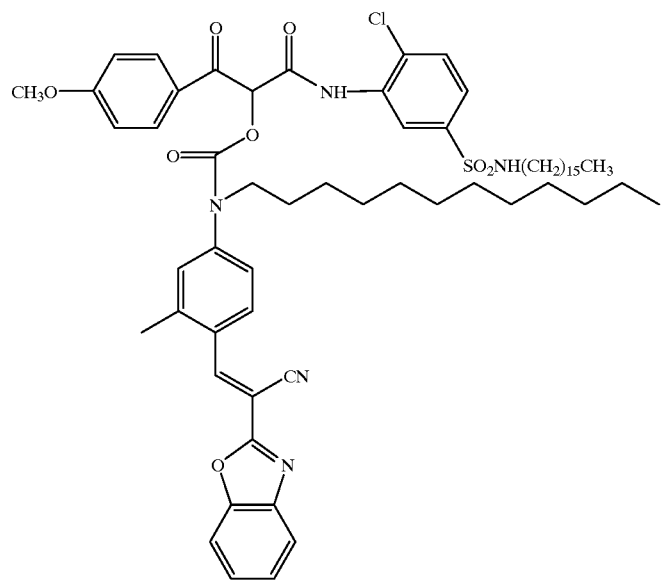

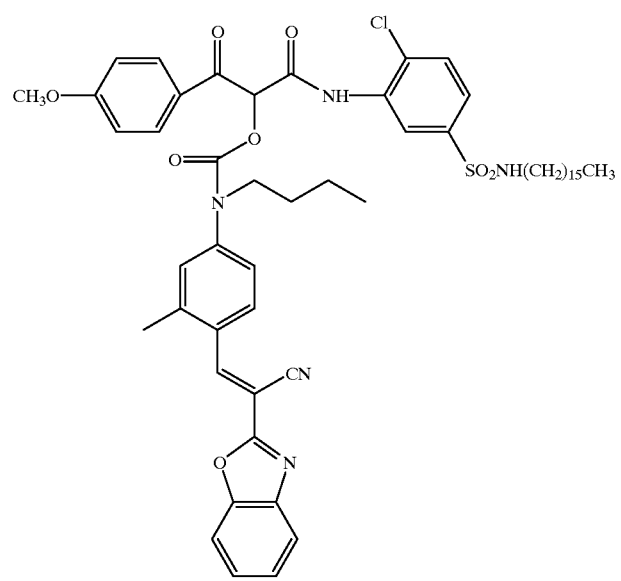
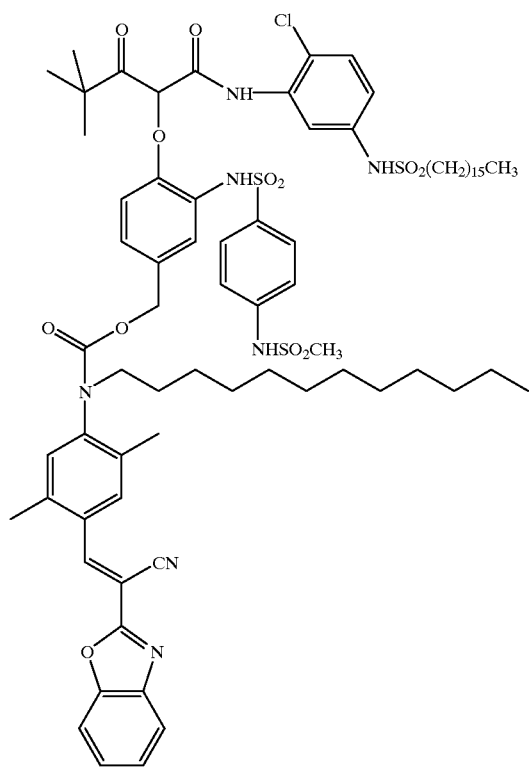
I-5
I-6

-continued
I-7
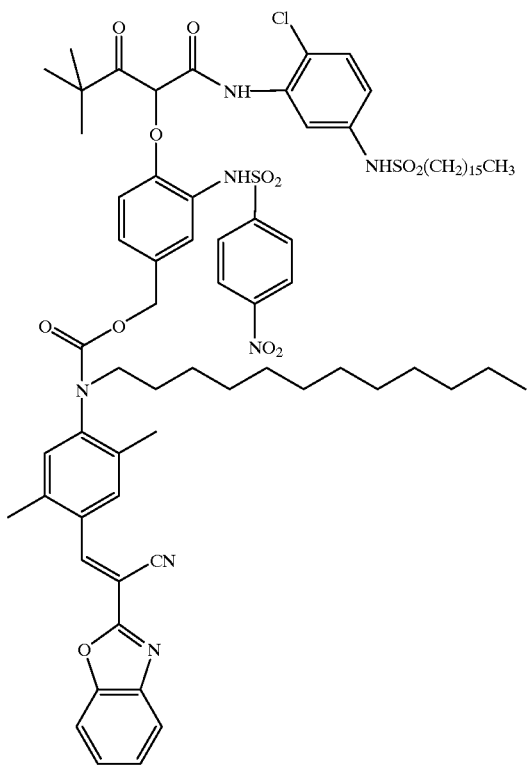
I-8
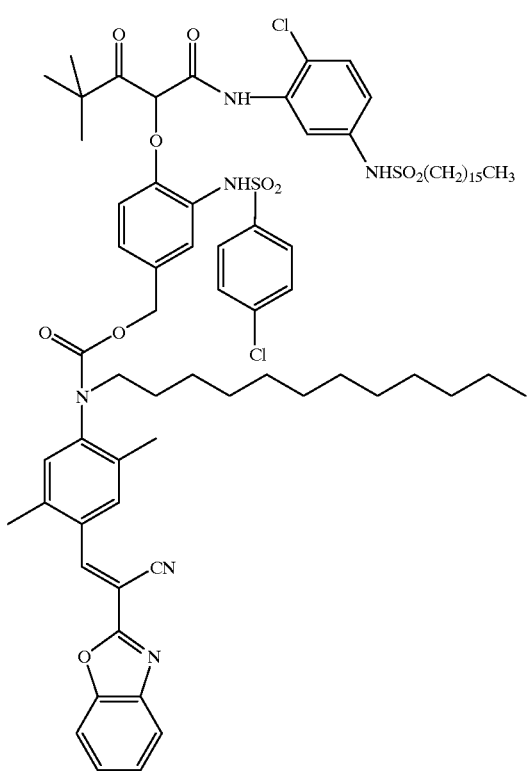

I-9
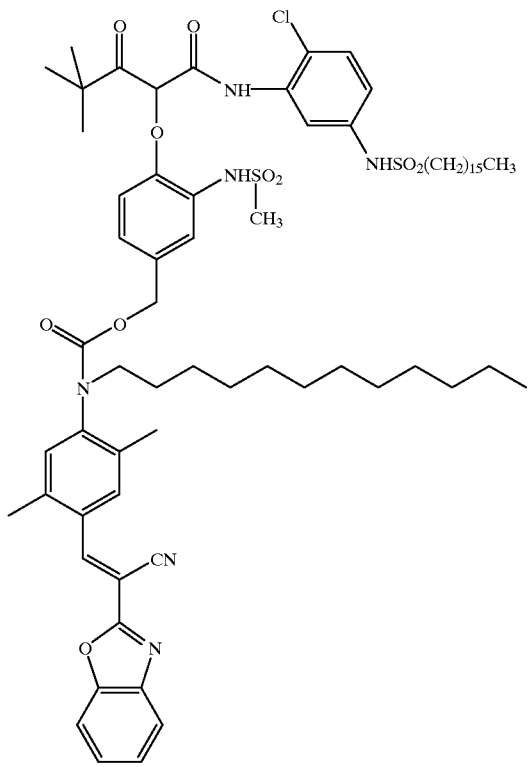
I-10
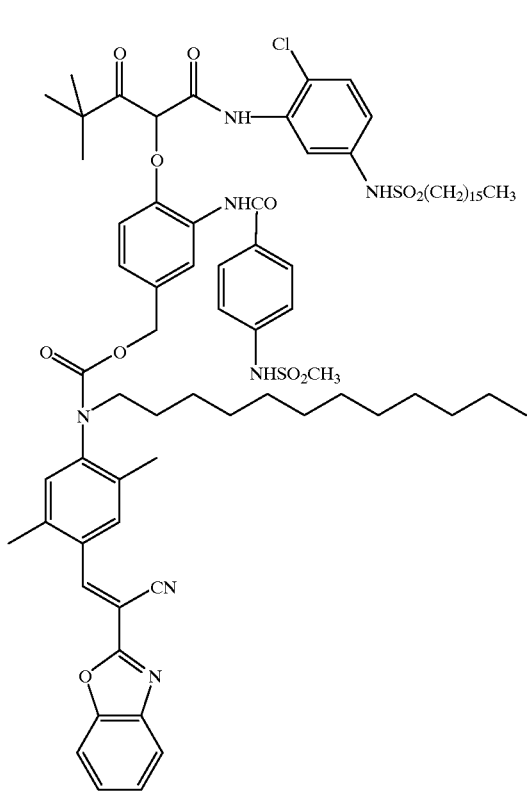

I-11
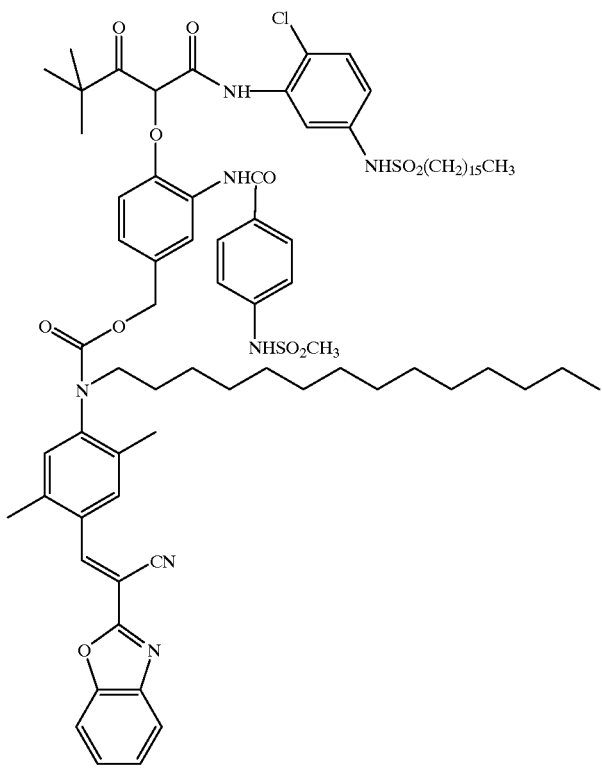
I-12
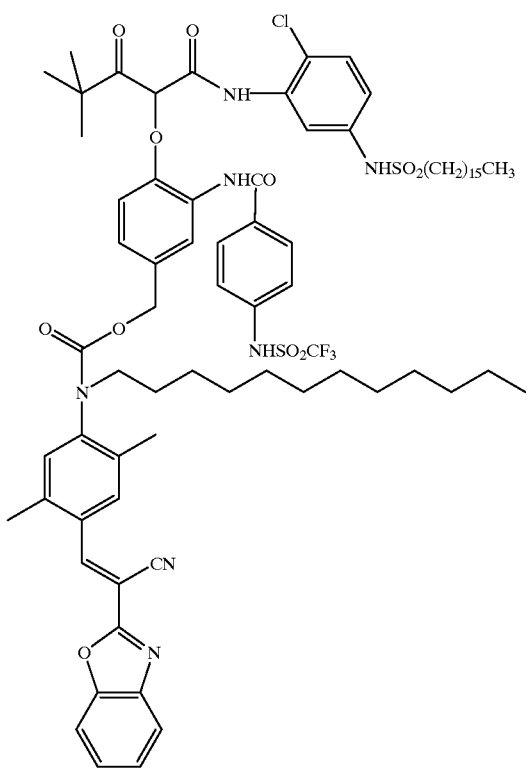

I-13
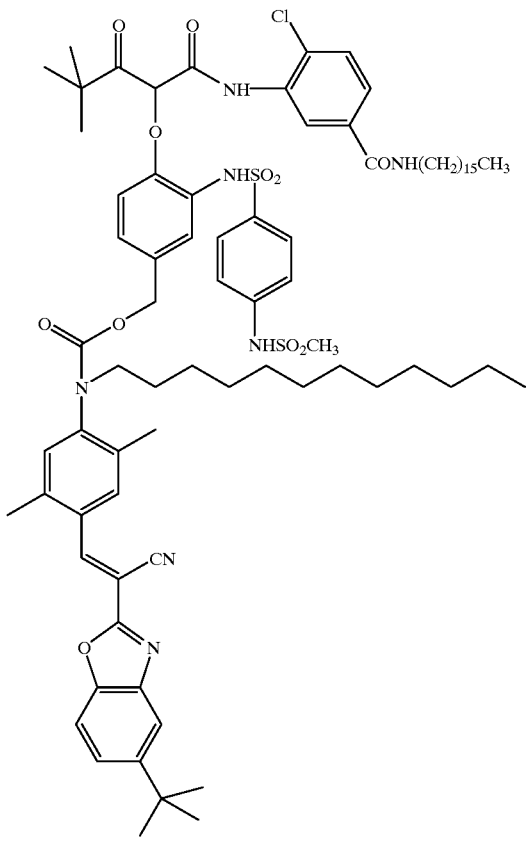

I-14
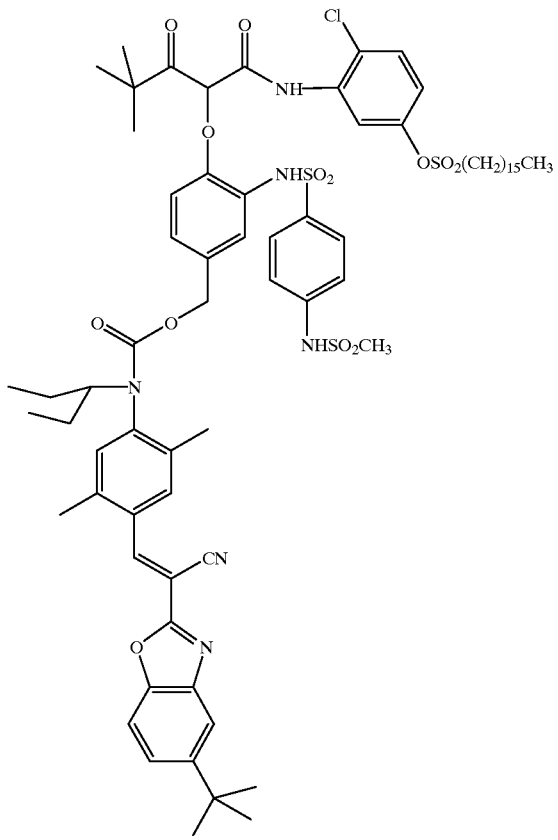

I-15
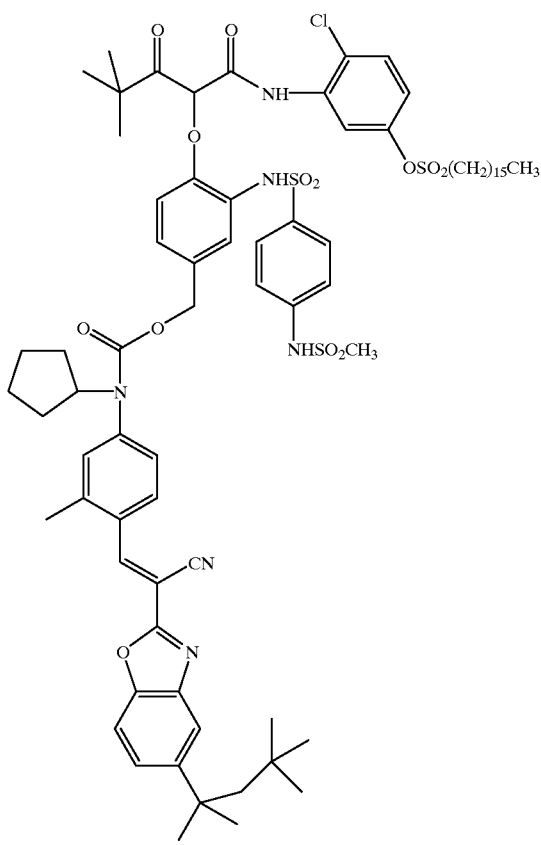
I-16
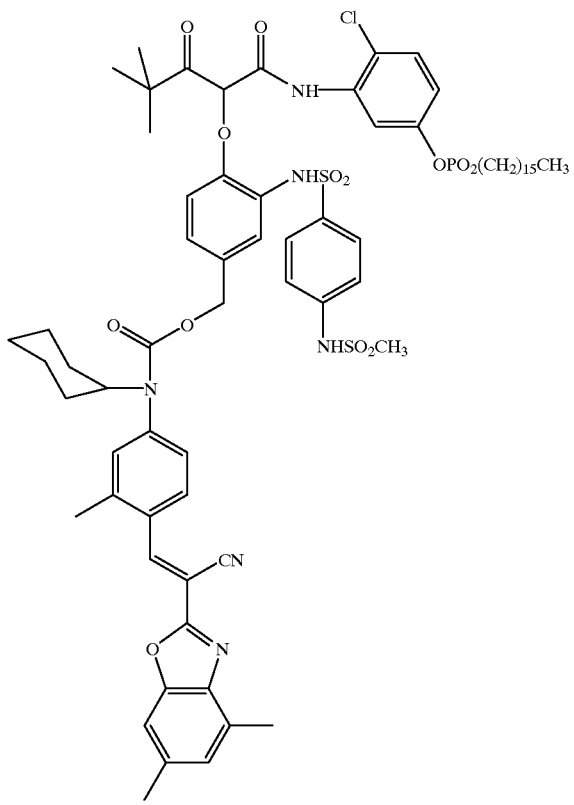

I-17
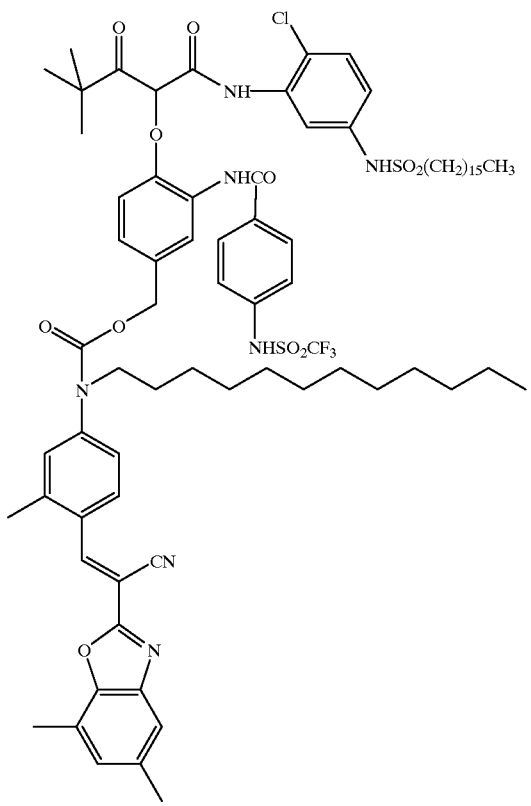
I-18
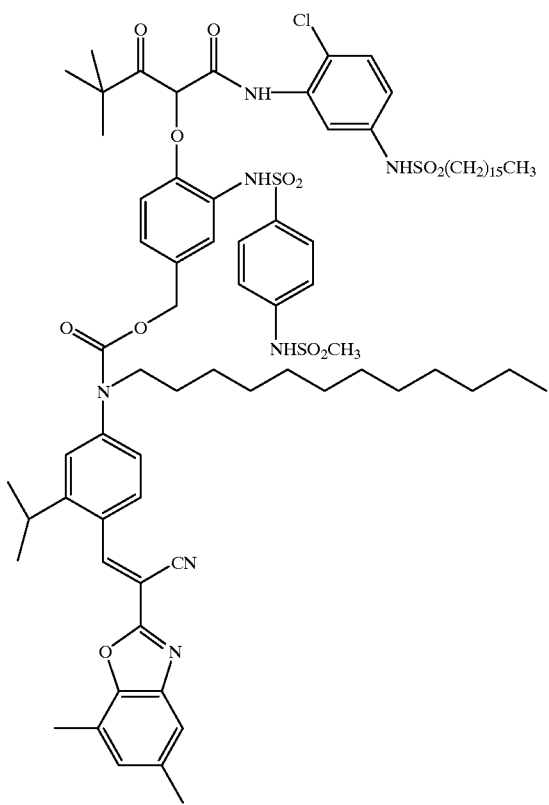

I-19
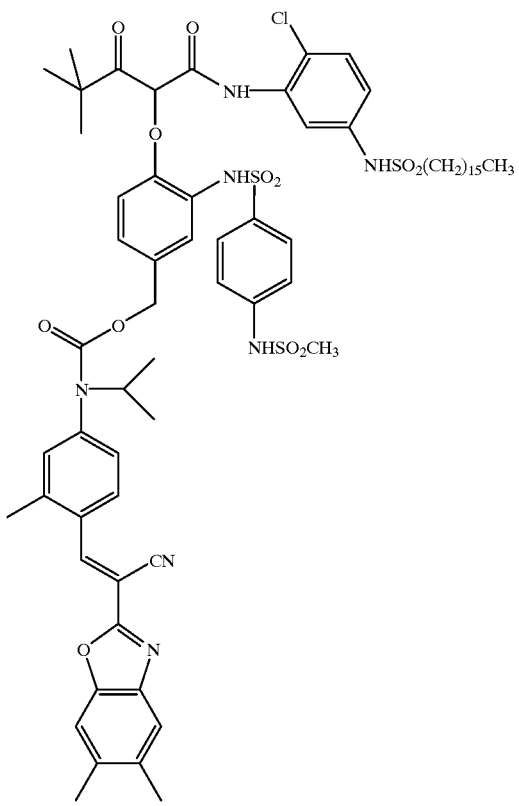
I-20
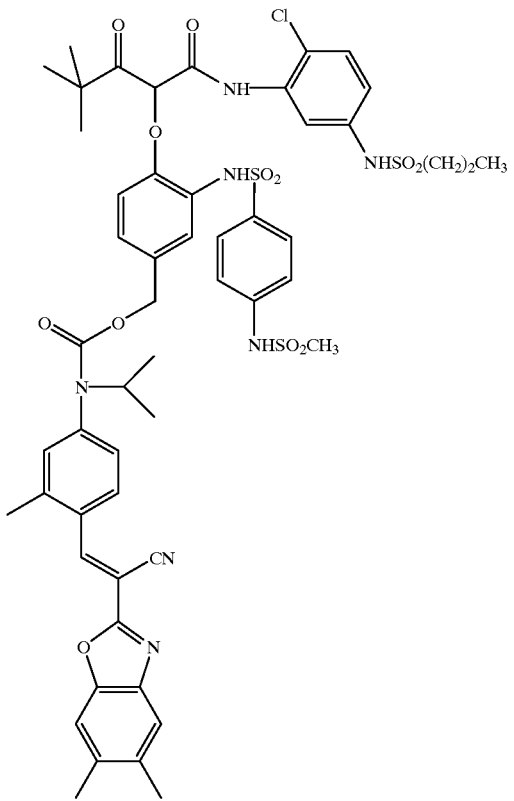

I-21
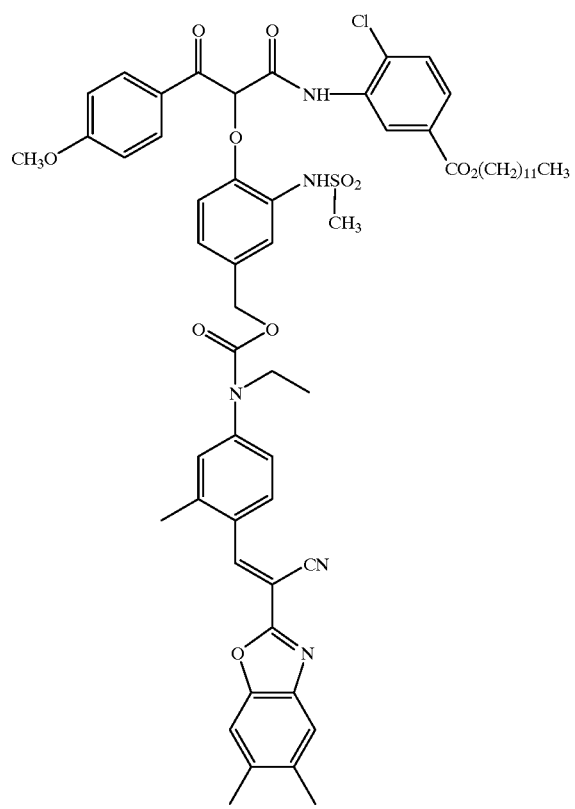
I-22
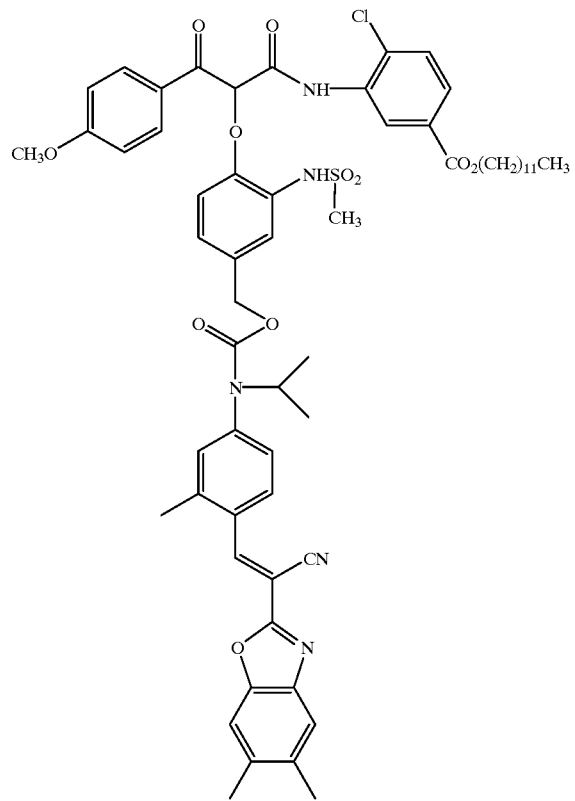

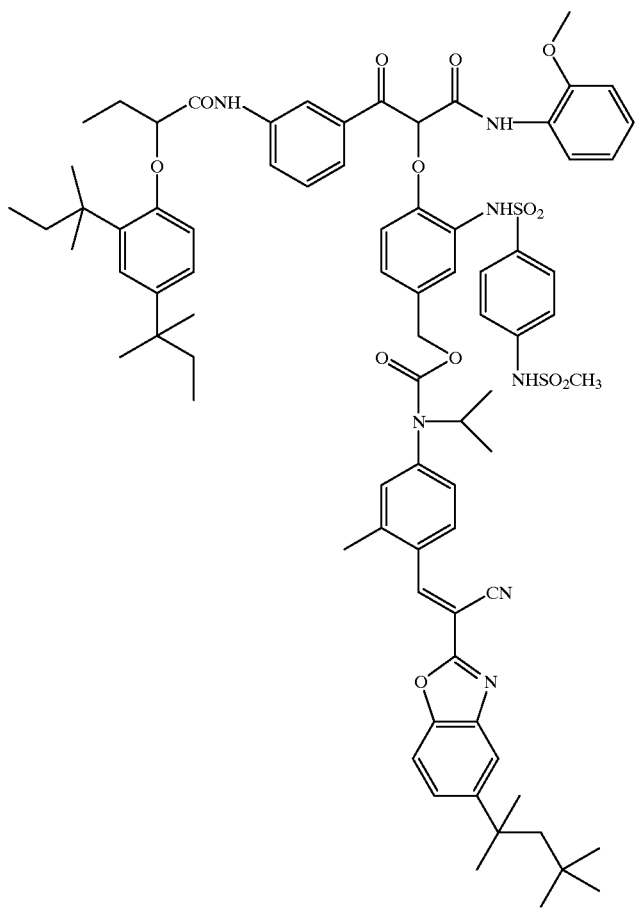
I-23

I-24
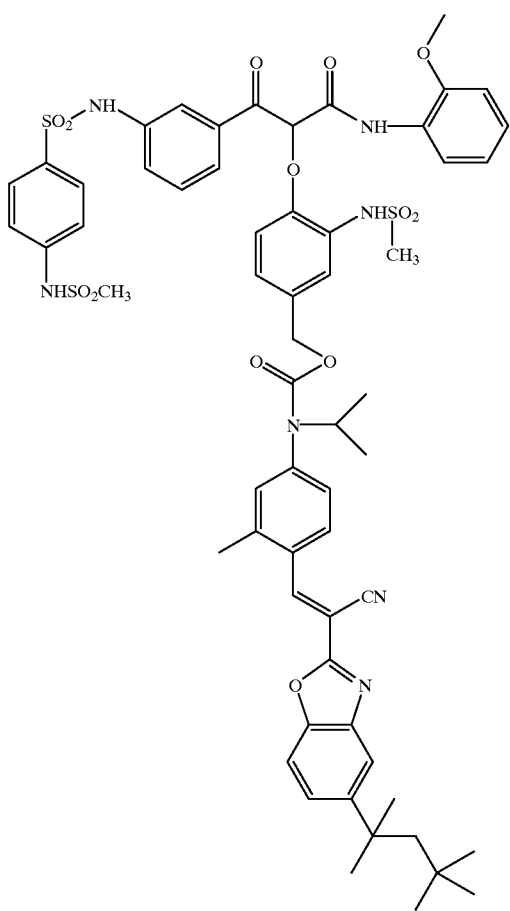
I-25
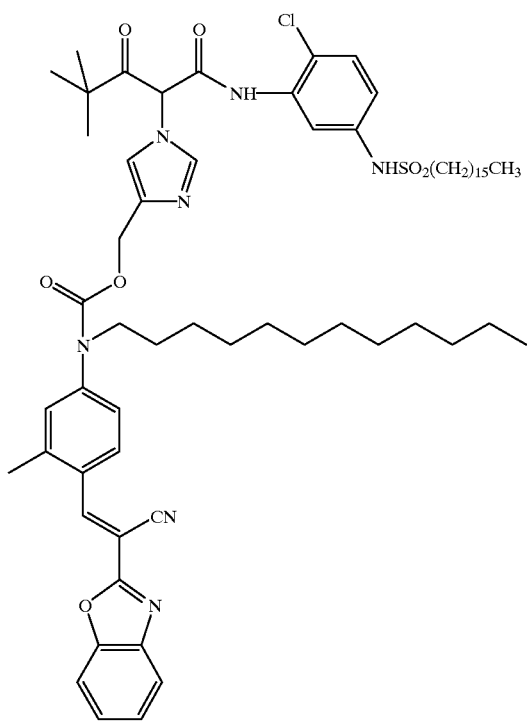

-continued
I-26
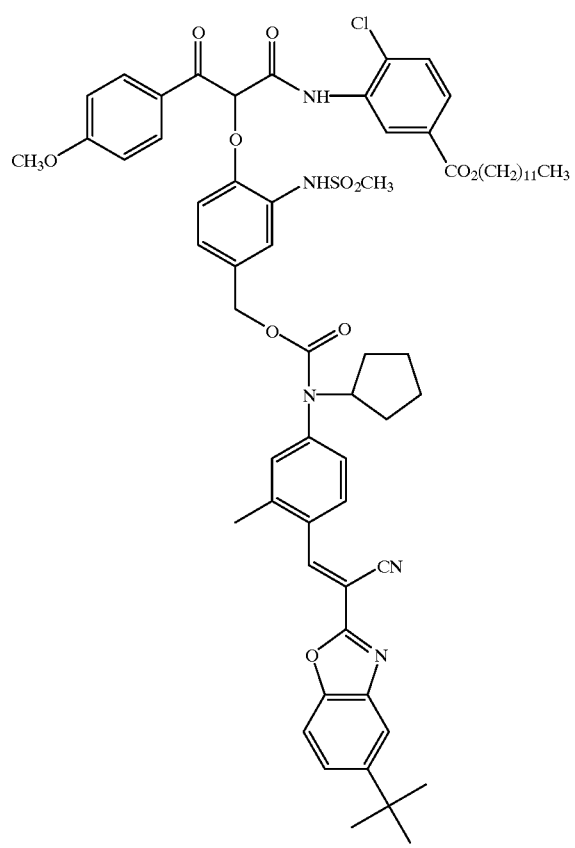
I-27
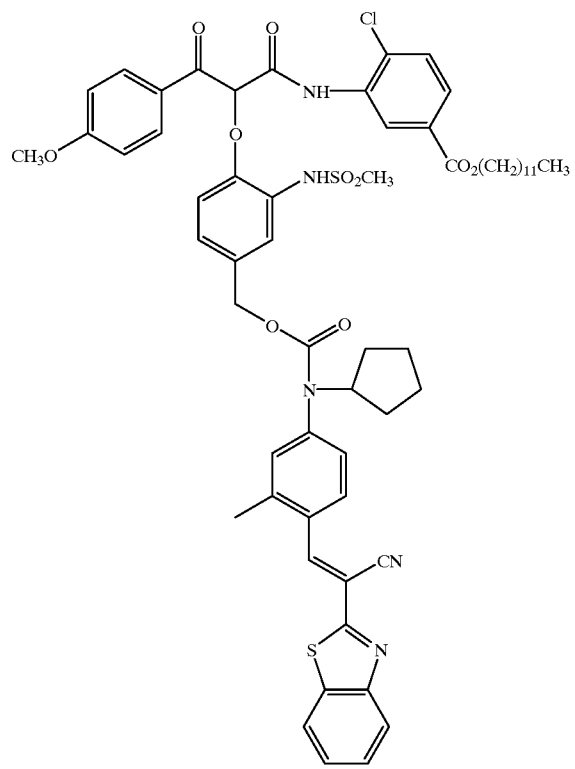

I-28
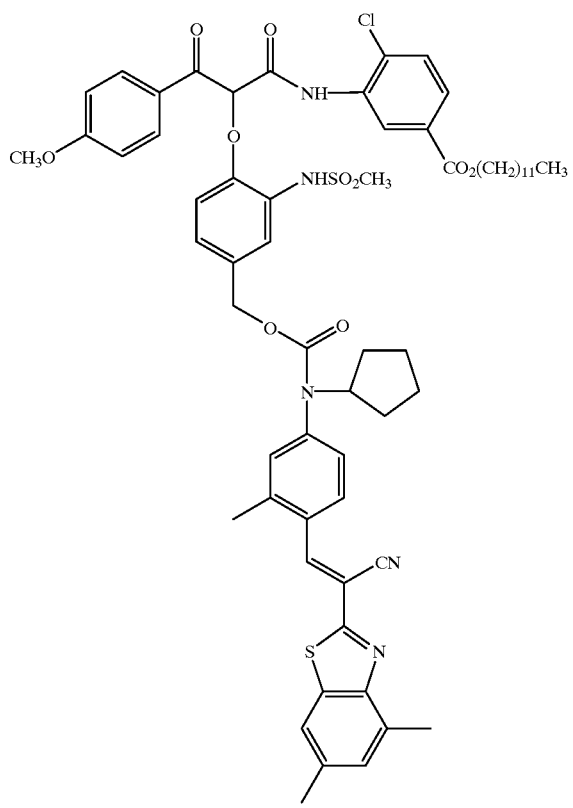
I-29
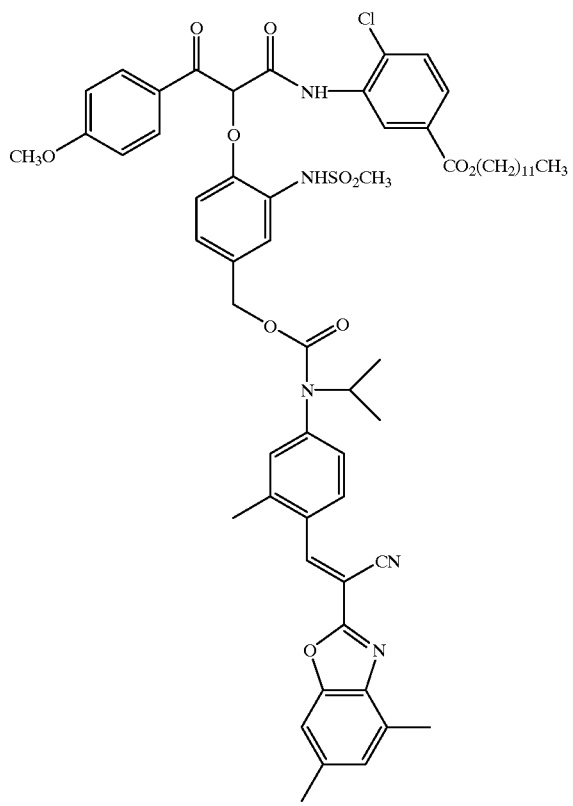

I-30
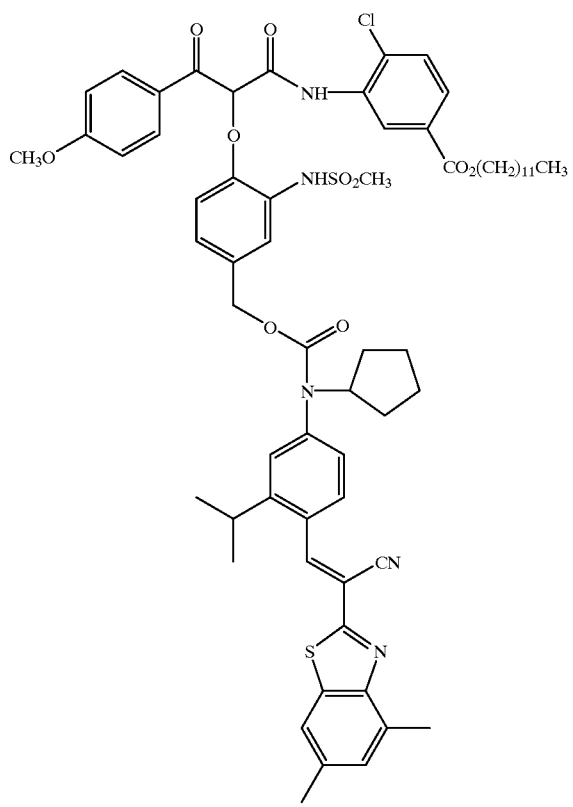
I-31
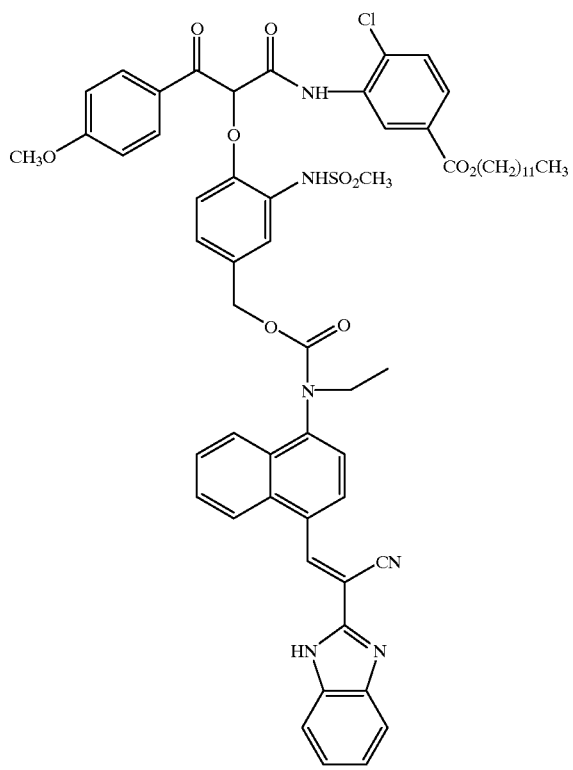

-continued
I-32
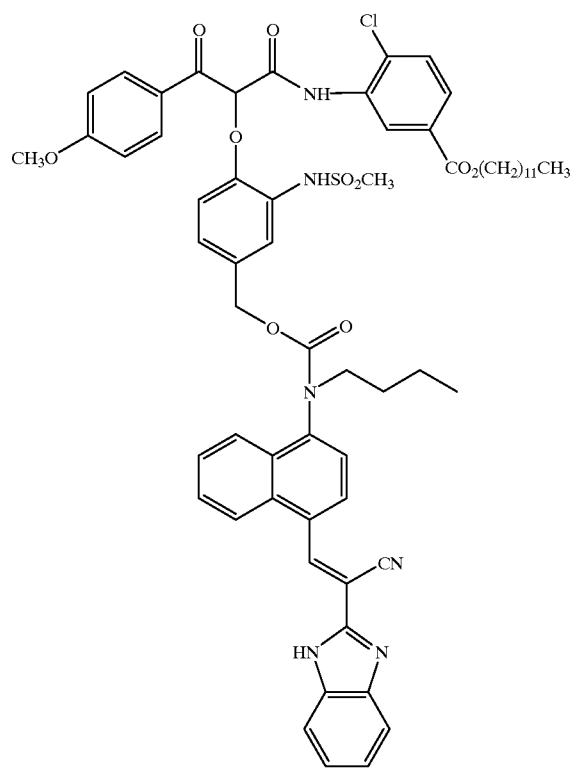
I-33
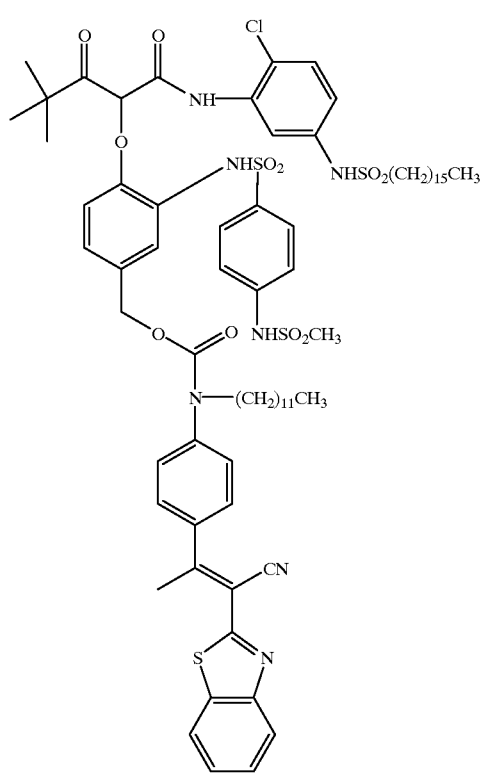

-continued
I-34
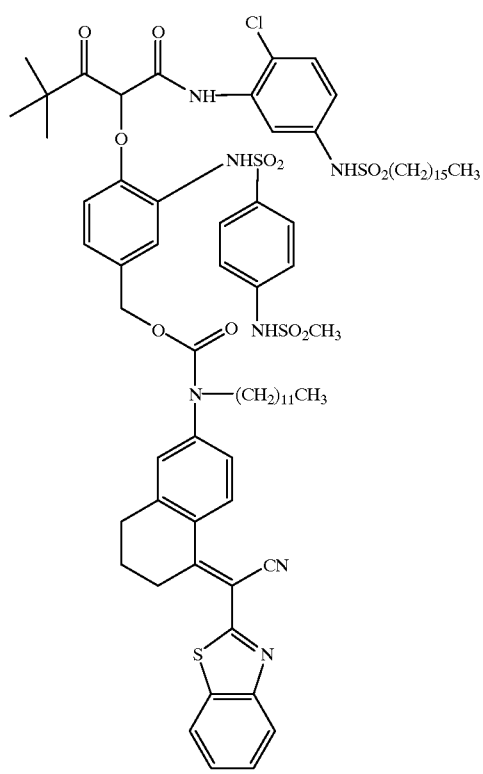
I-35
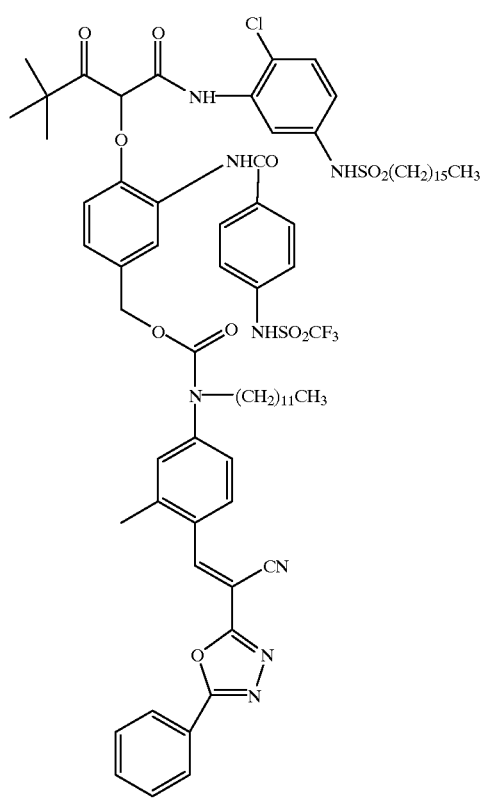

I-36
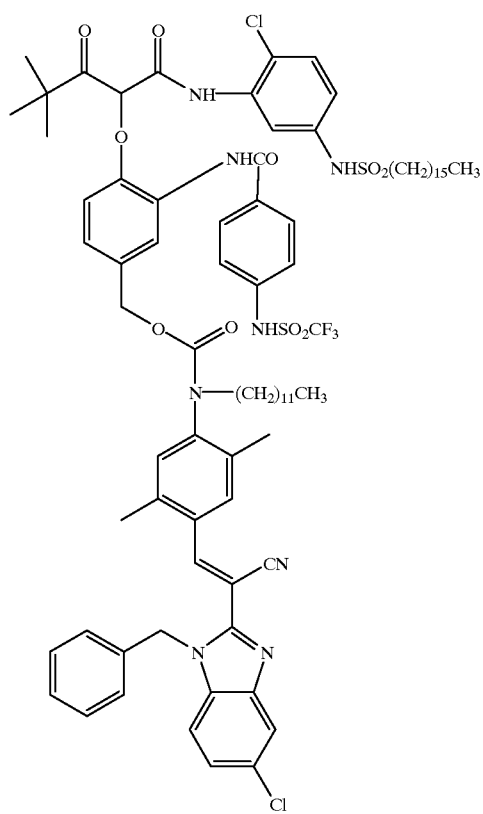
I-37
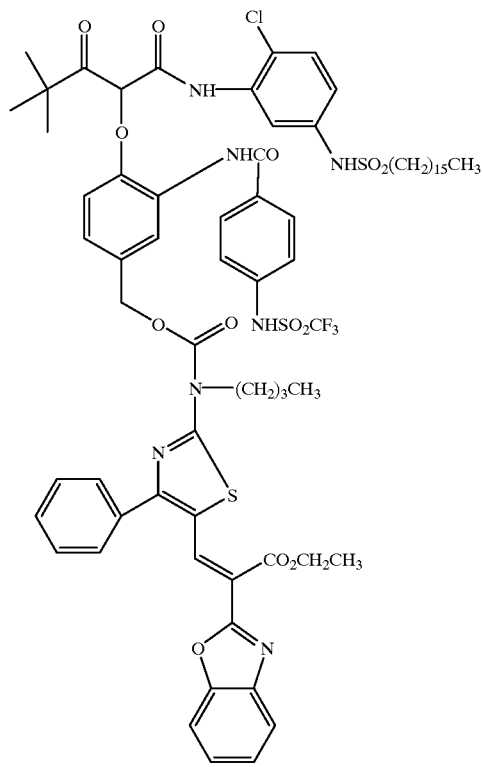

-continued
I-38
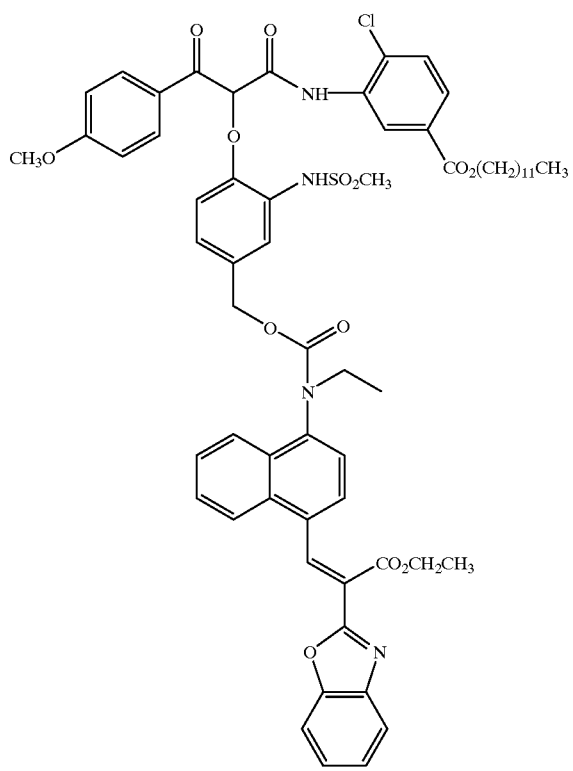
I-39
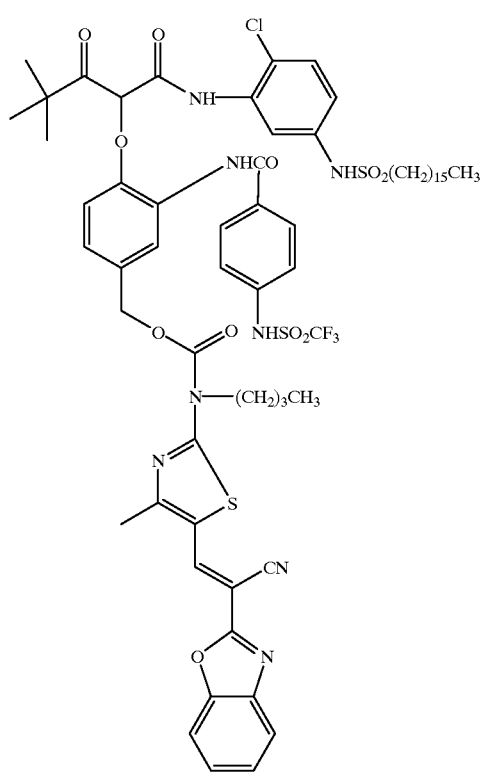

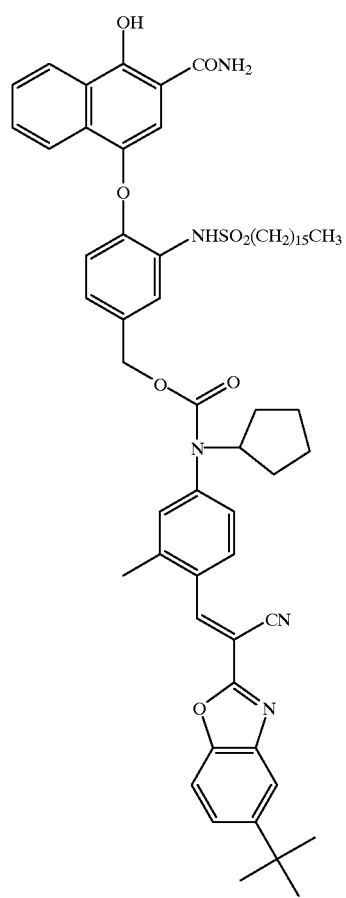
I-40

I-41
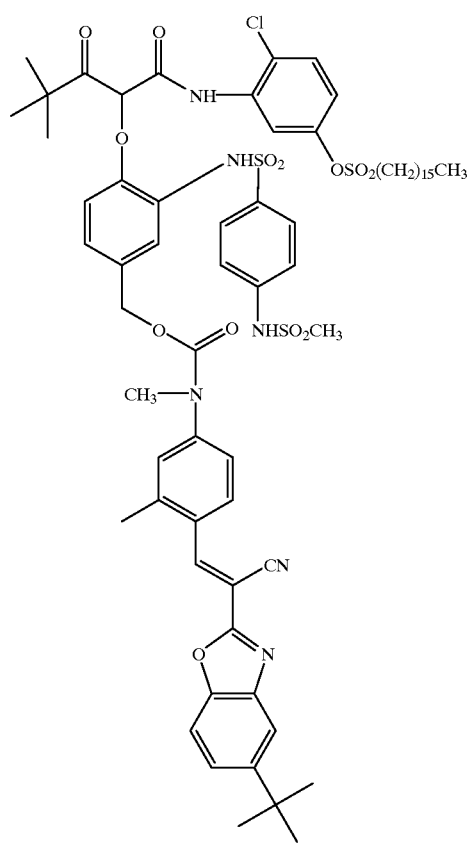
I-42
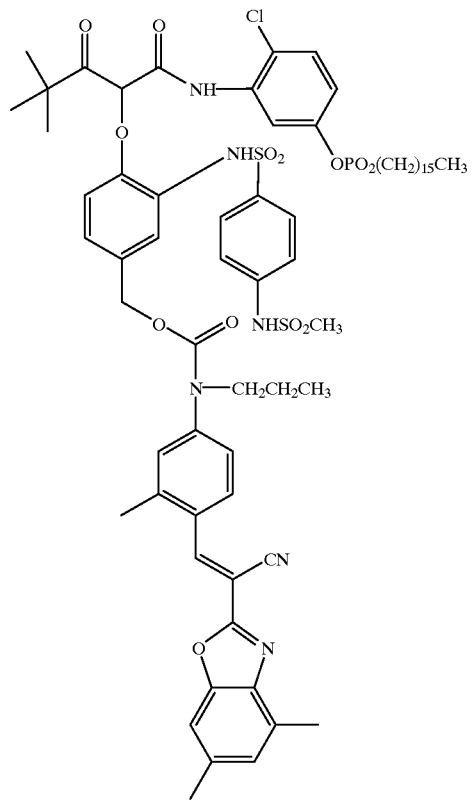

I-43
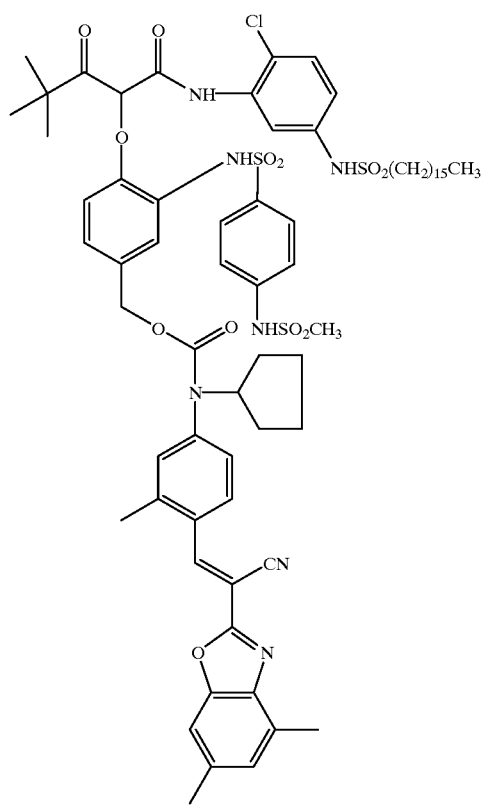
I-44
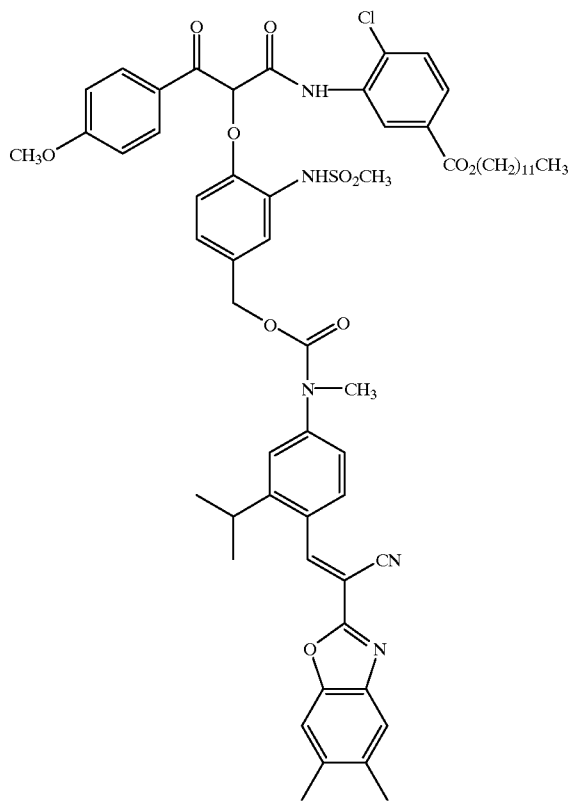

I-45
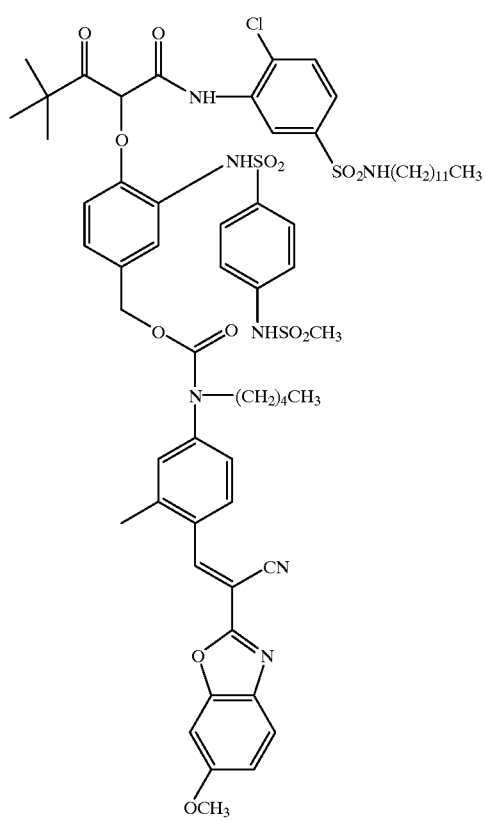
I-46
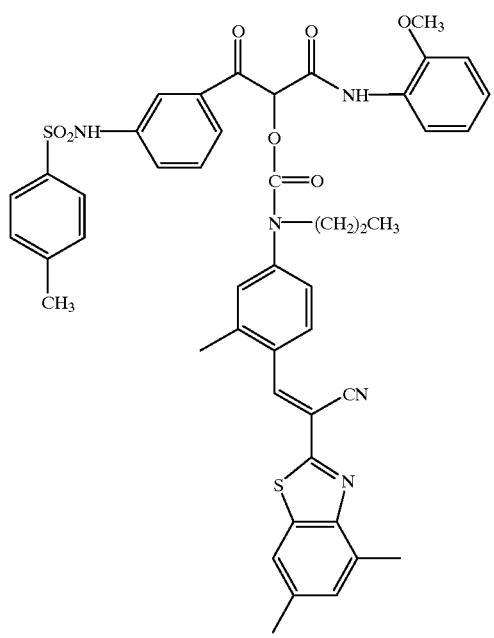

I-47
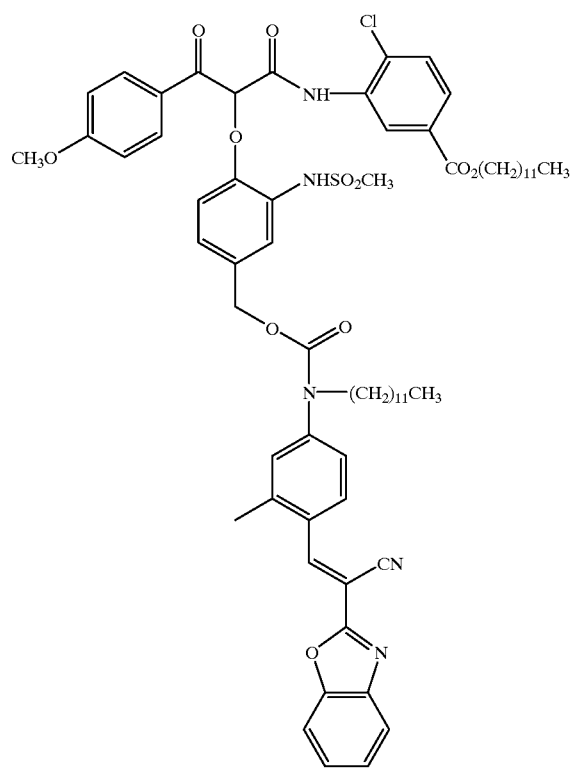
I-48
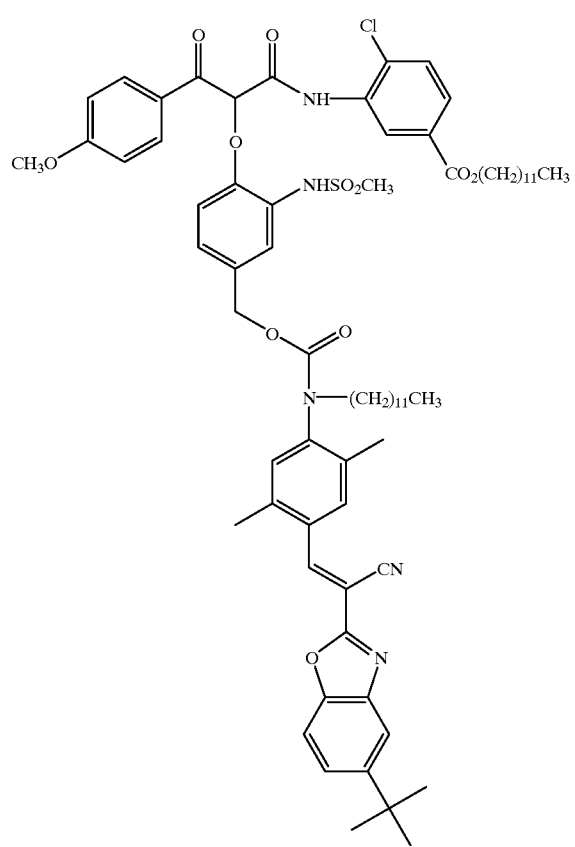

I-49
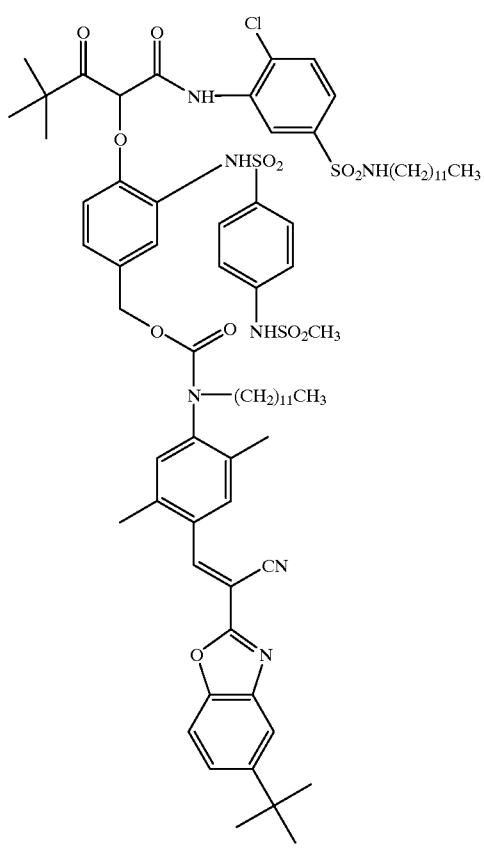

I-50
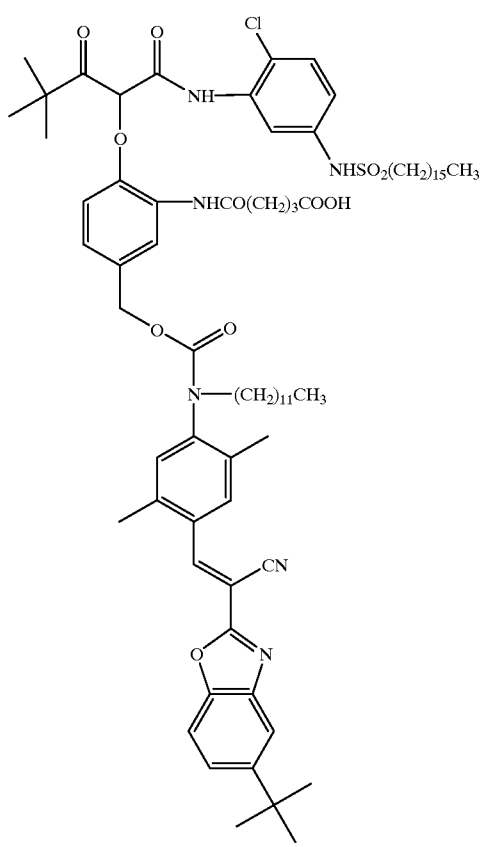
I-51
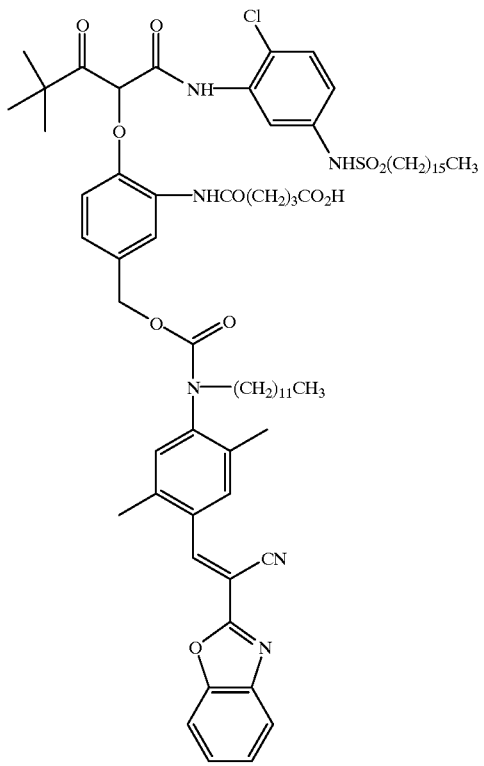

I-52
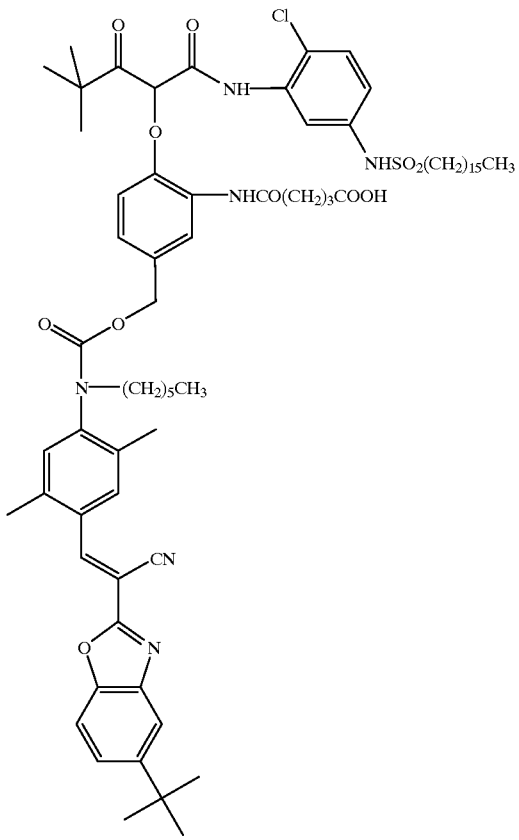
I-53
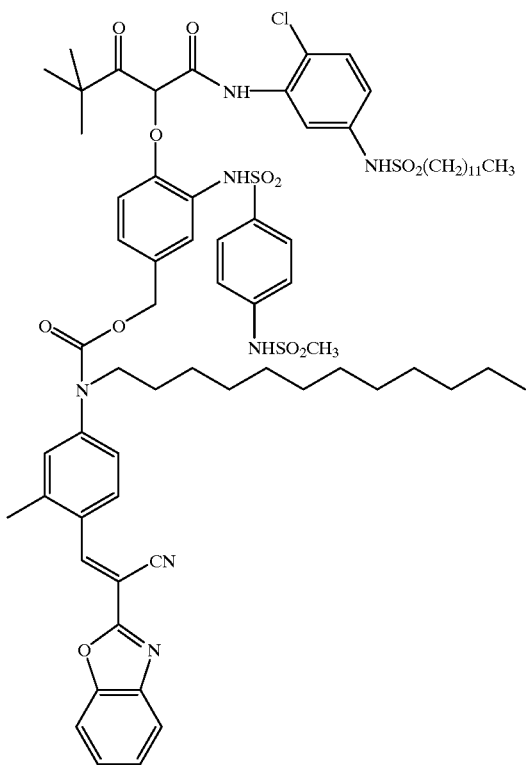

I-54
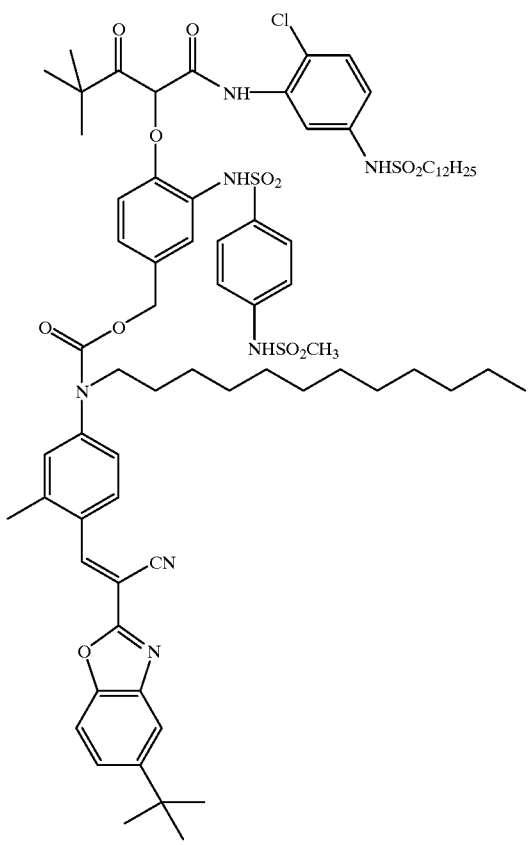

-continued
I-55
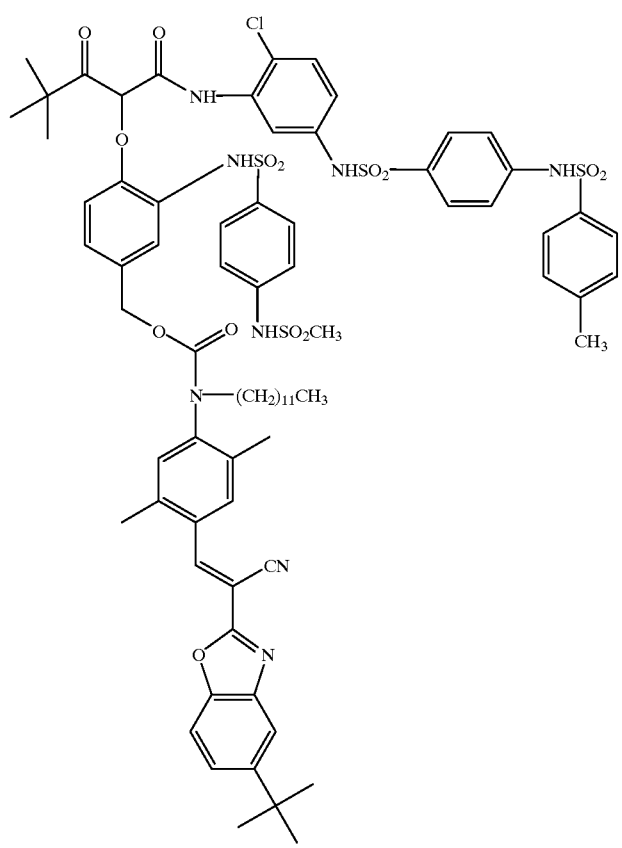

I-56
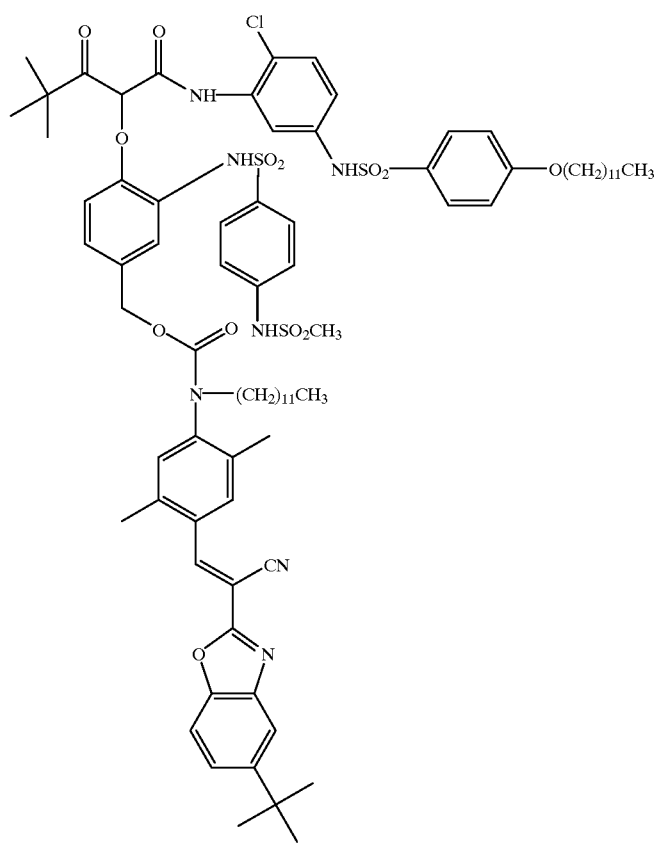

I-57
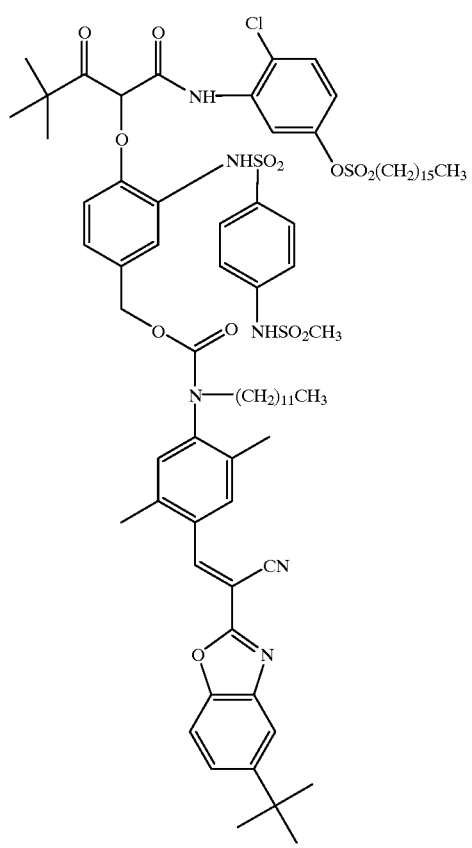

I-58
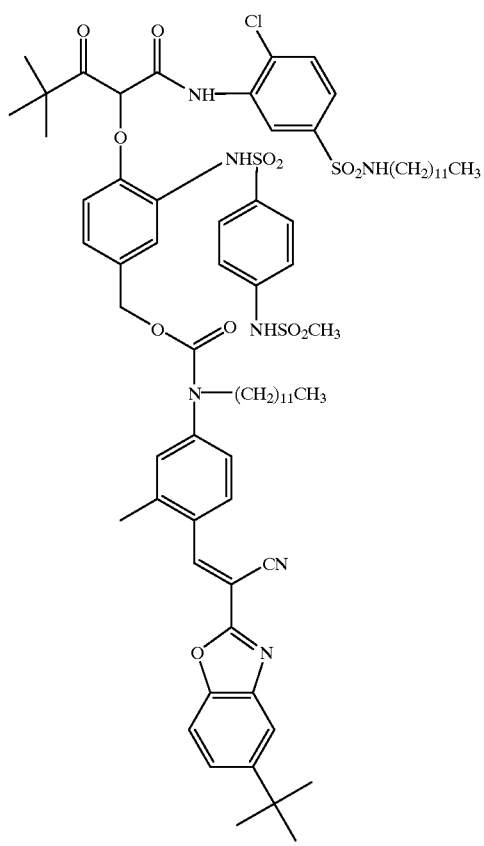

I-59
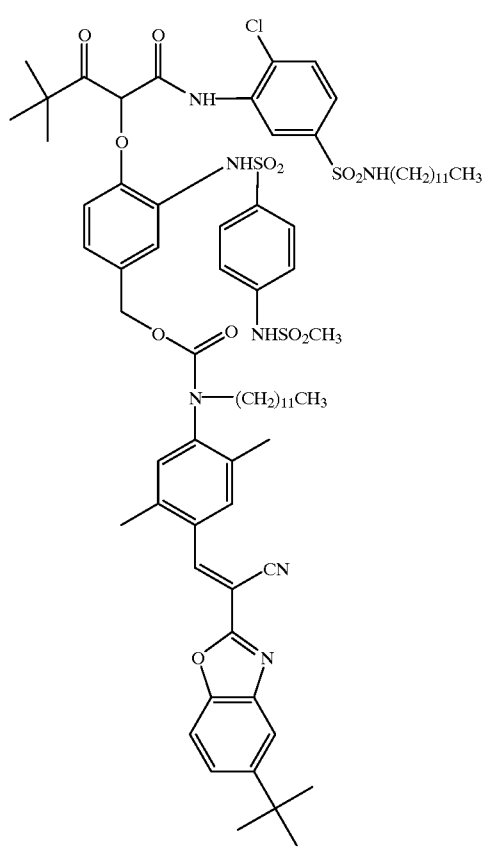
I-60
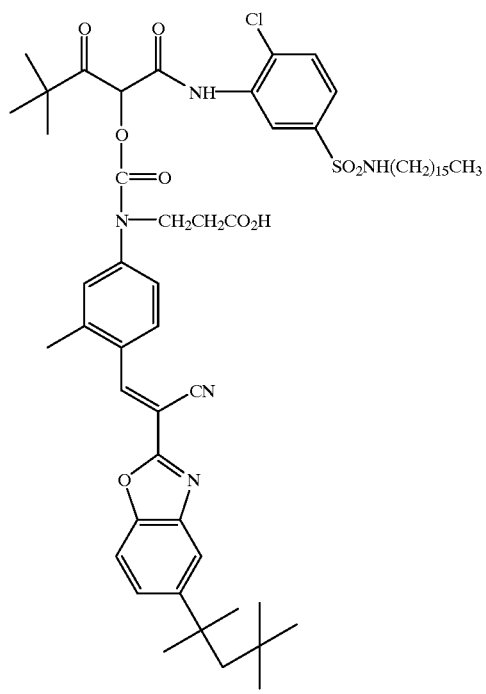

I-61
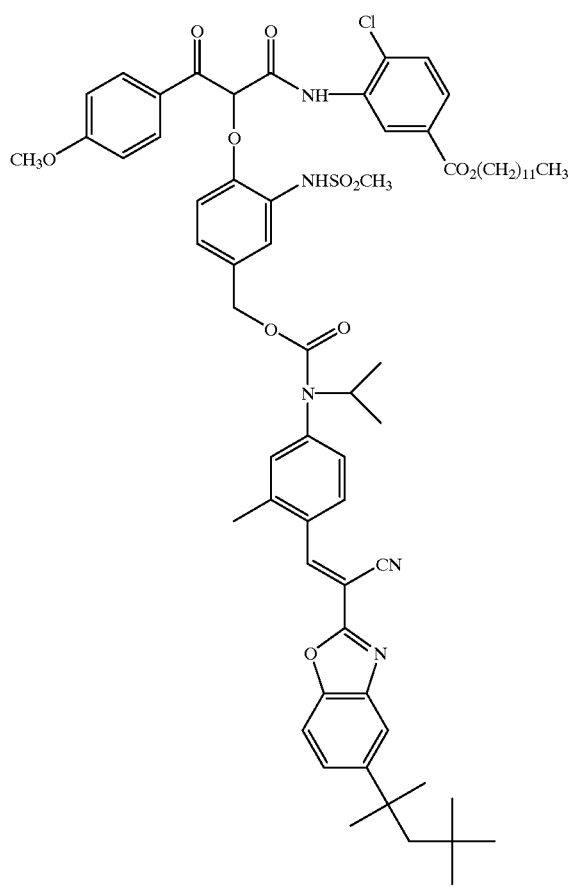
I-62
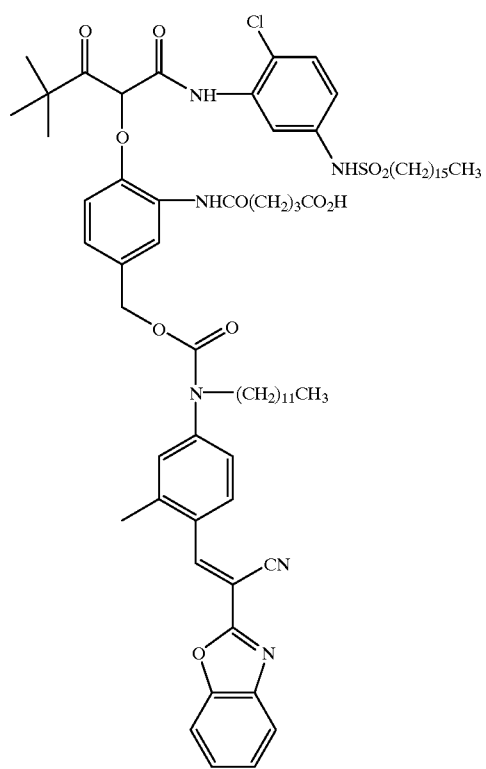

I-63
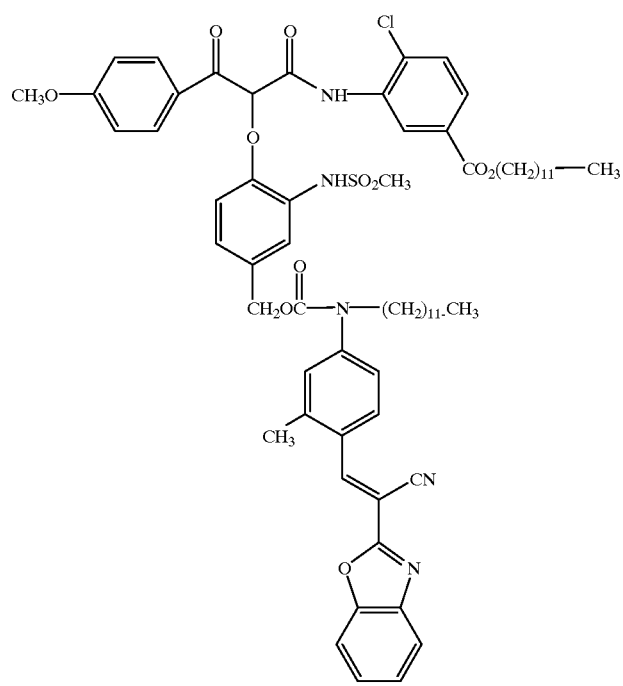
I-64
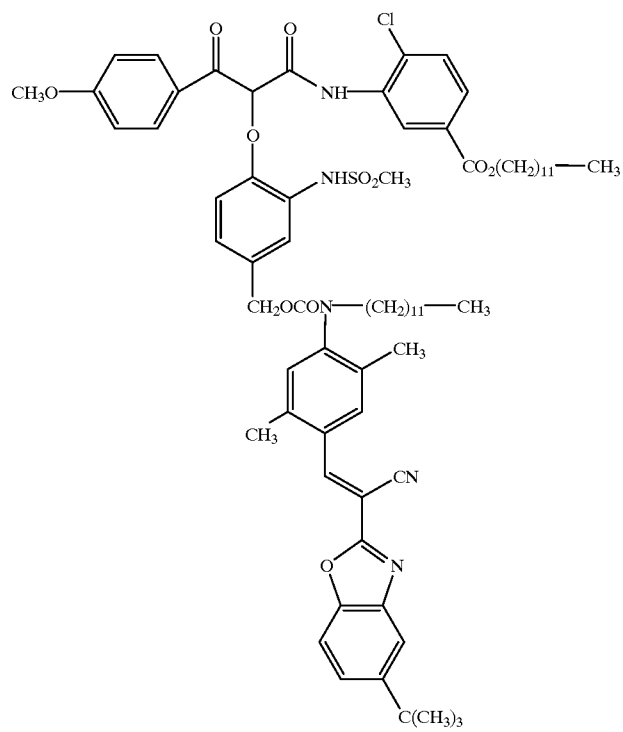

I-65
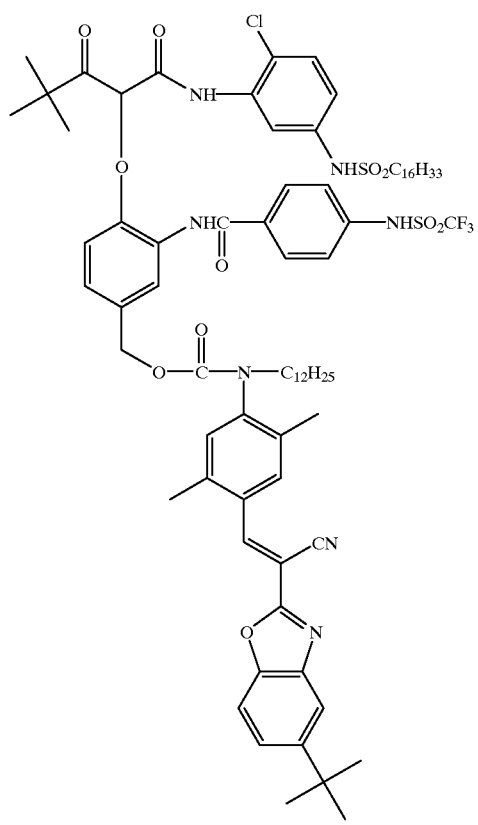
I-66
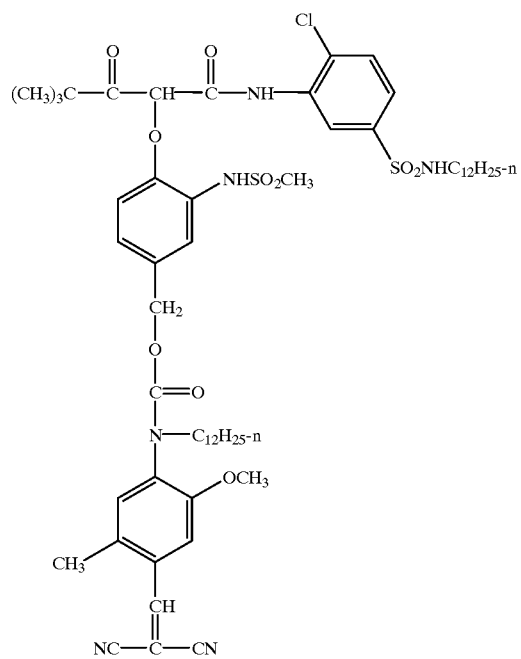

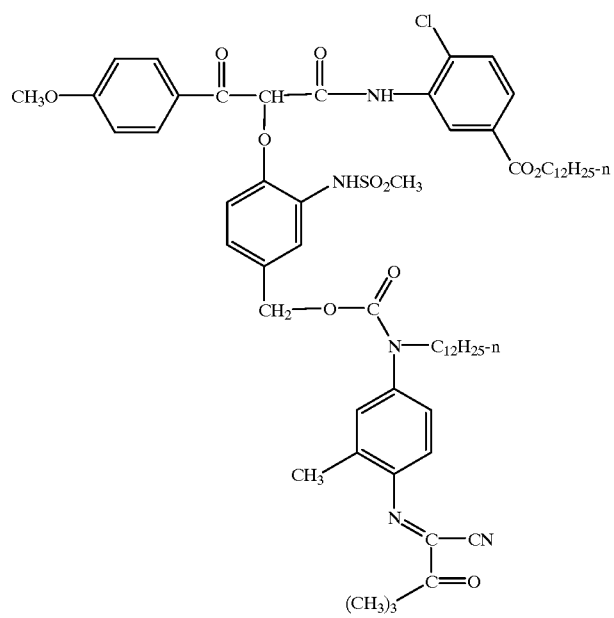
I-67
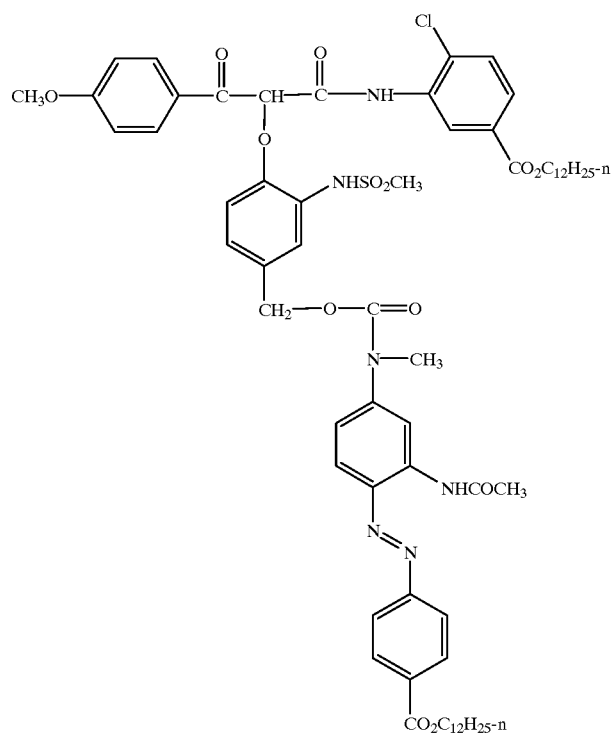
I-68

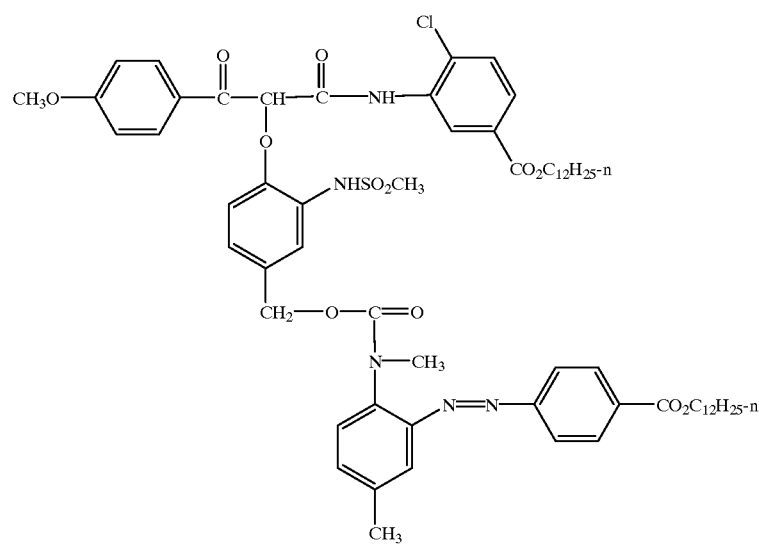
I-69
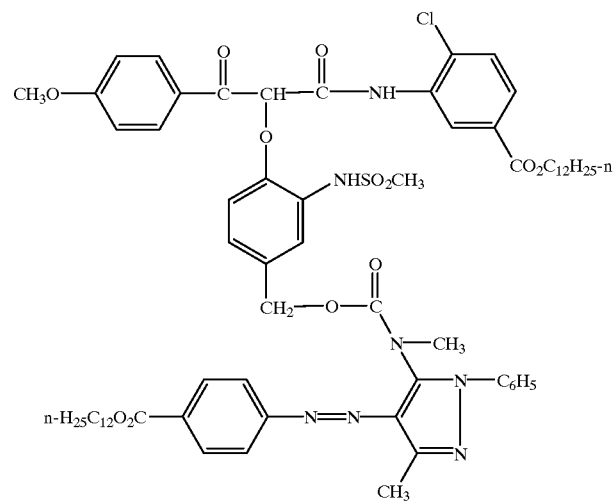
I-70

-continued
I-71
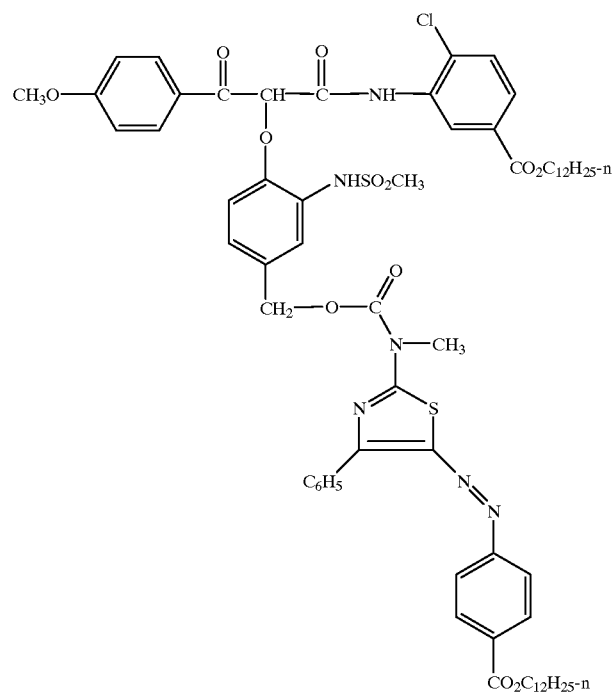
I-72
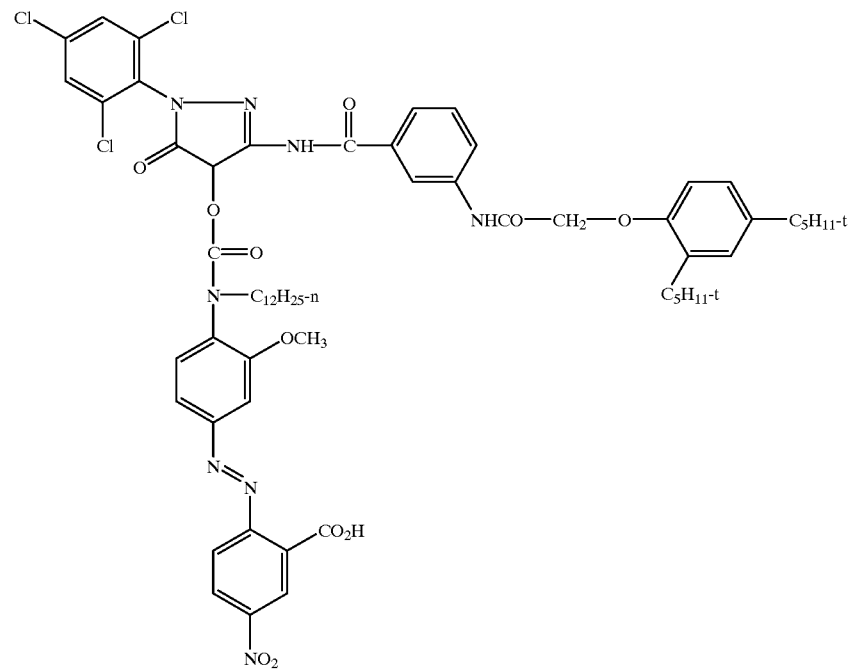

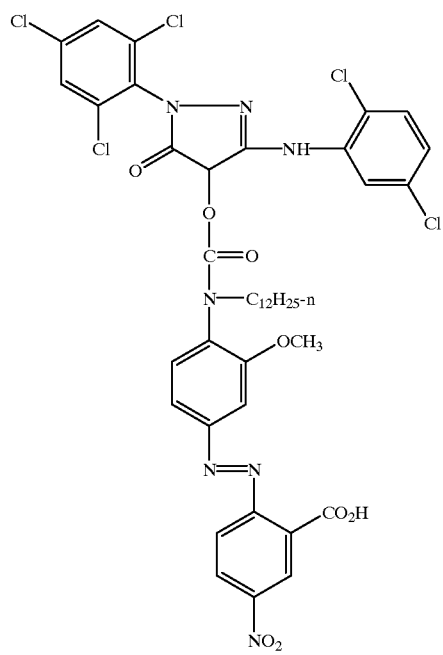
I-73
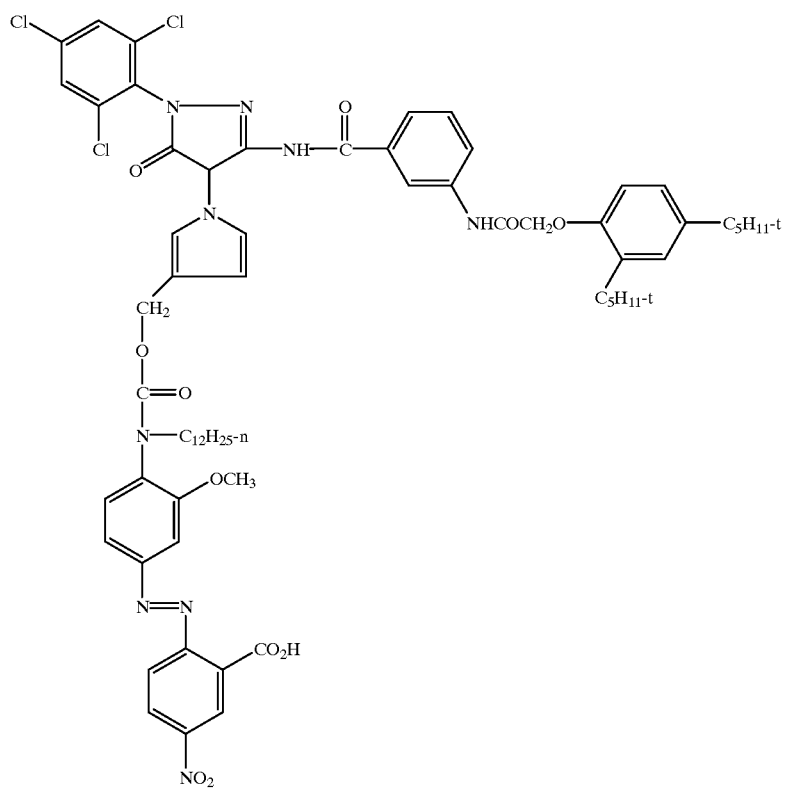
I-74

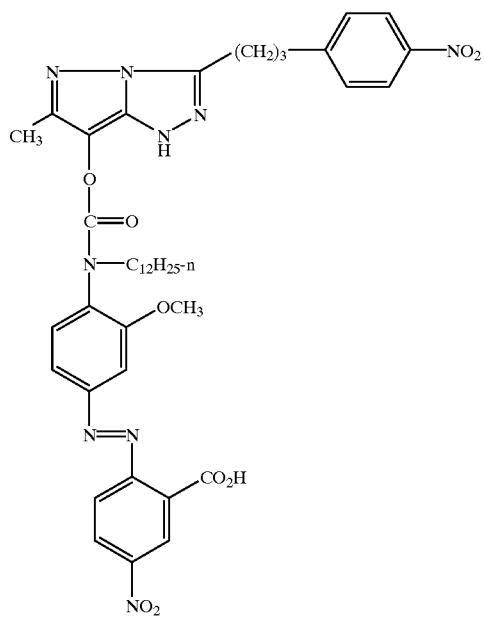
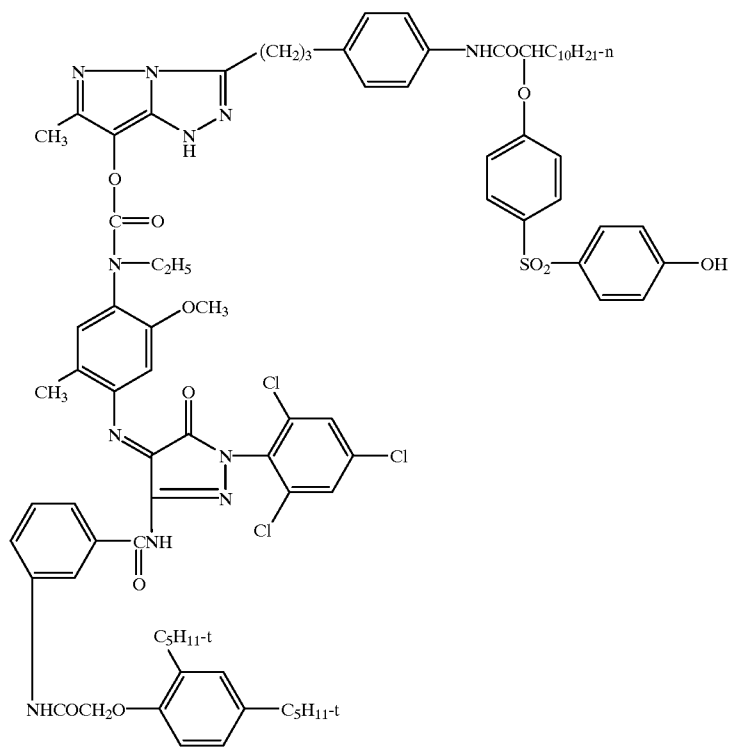
I-75
I-76

I-77
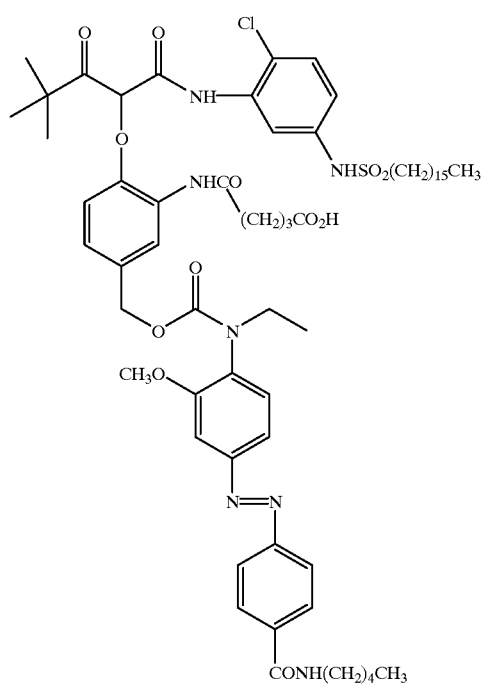
I-78
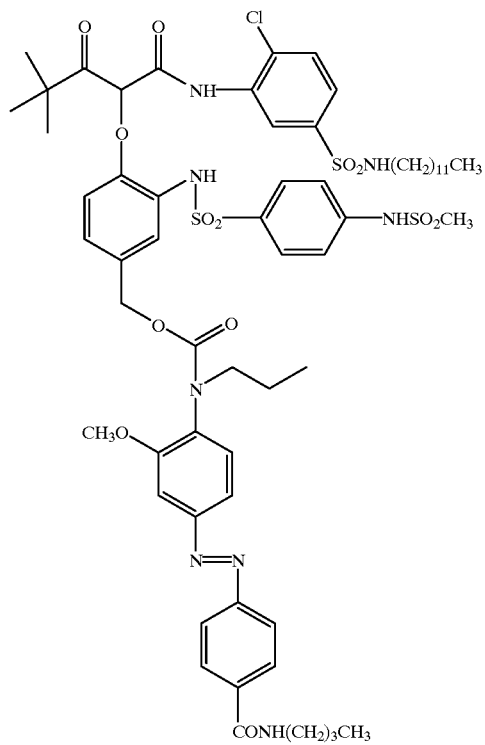

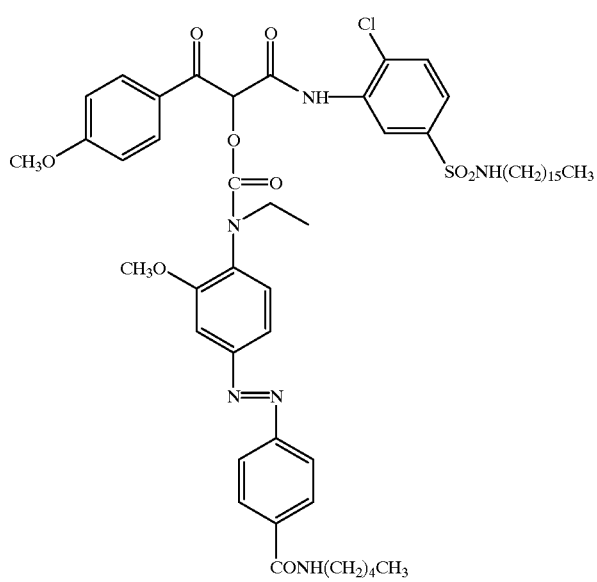
I-79
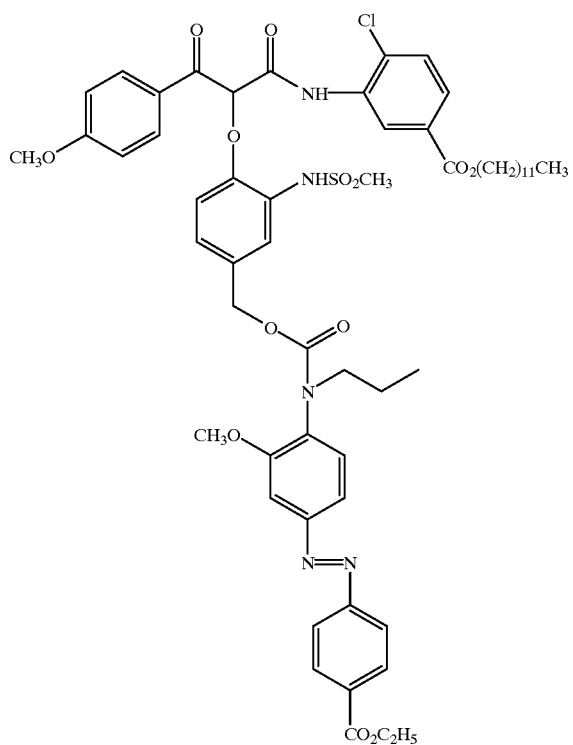
I-80

I-81
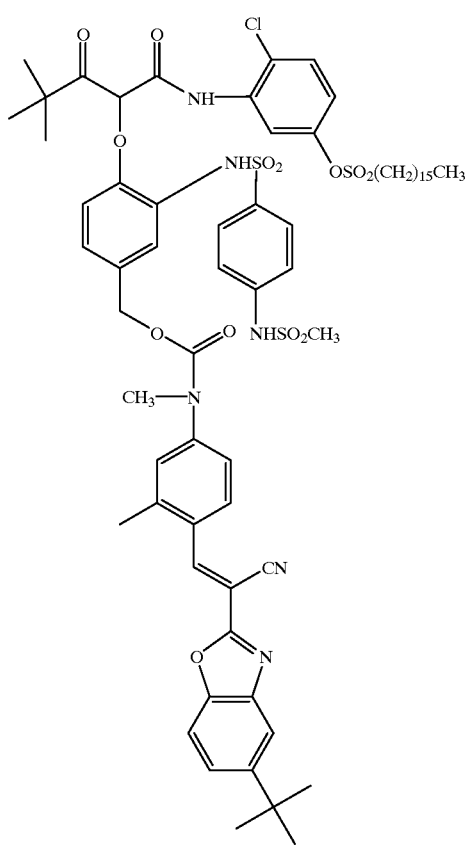
I-82
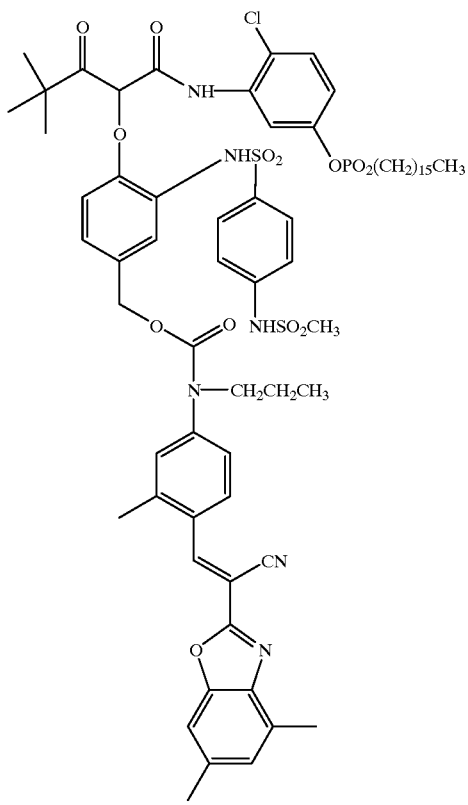

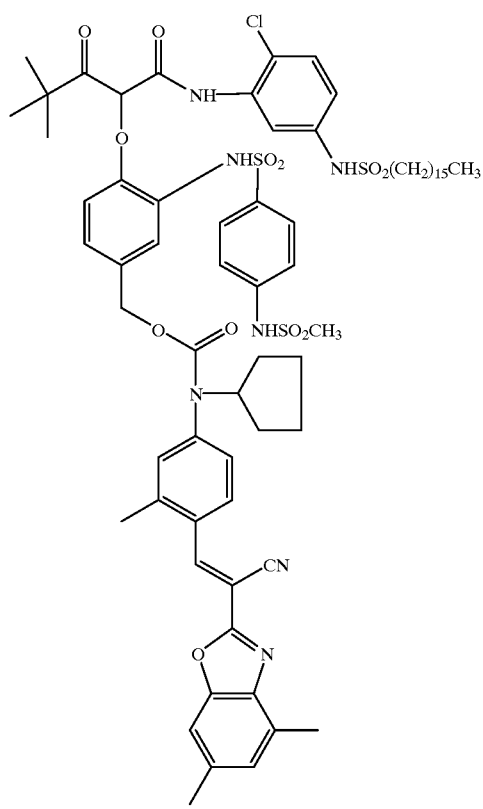
I-83
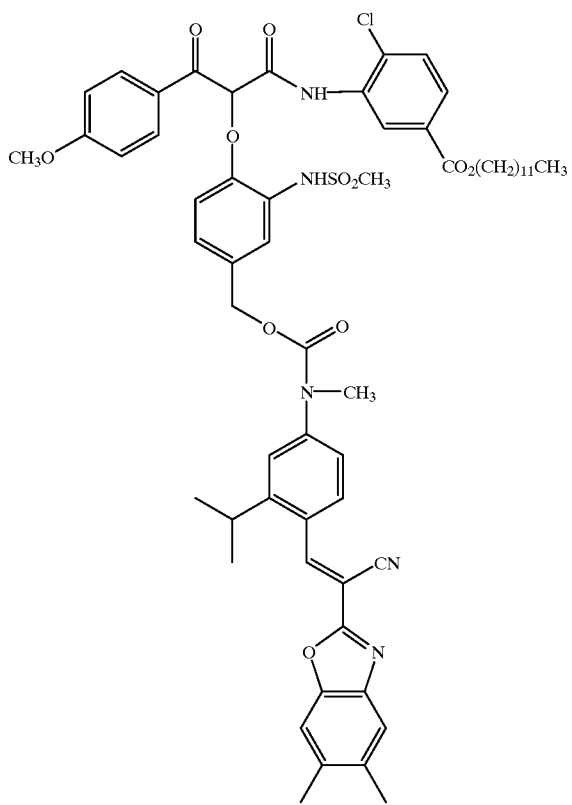
I-84

I-85
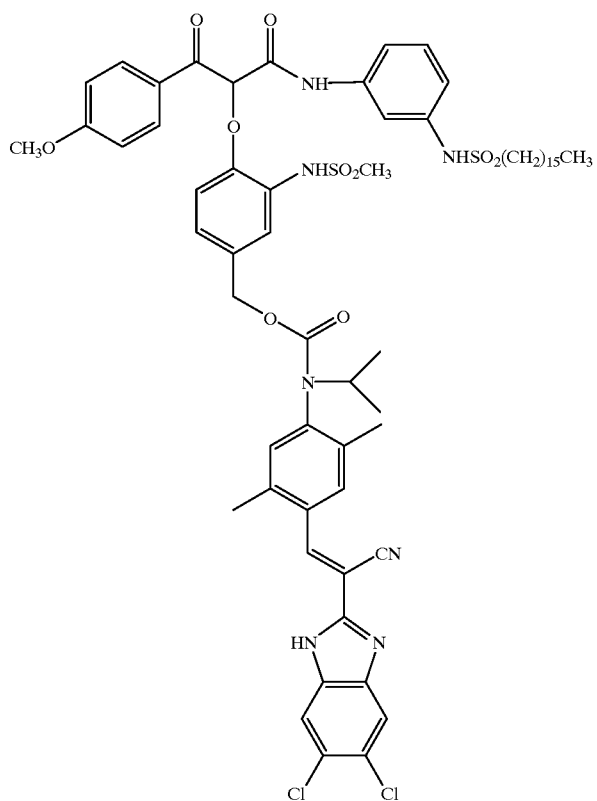
I-86
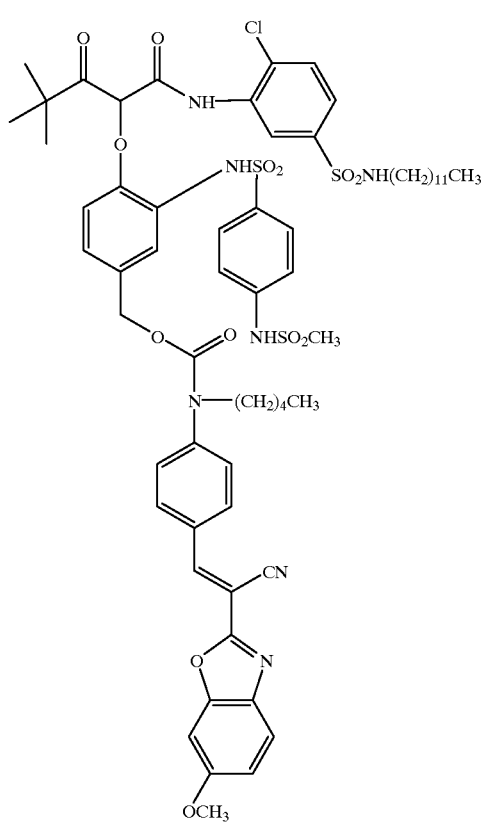

I-87
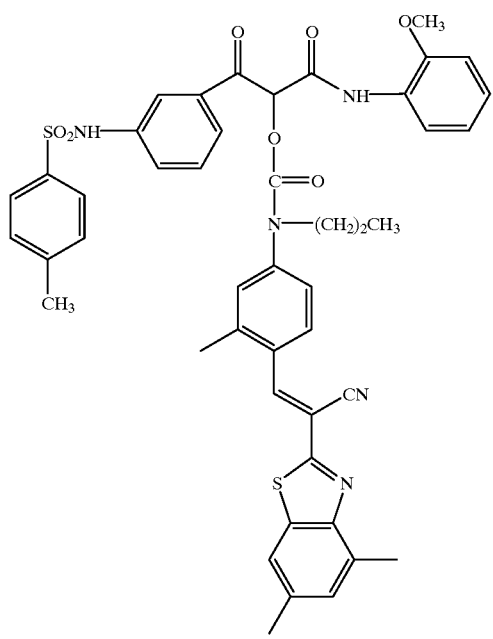
I-88
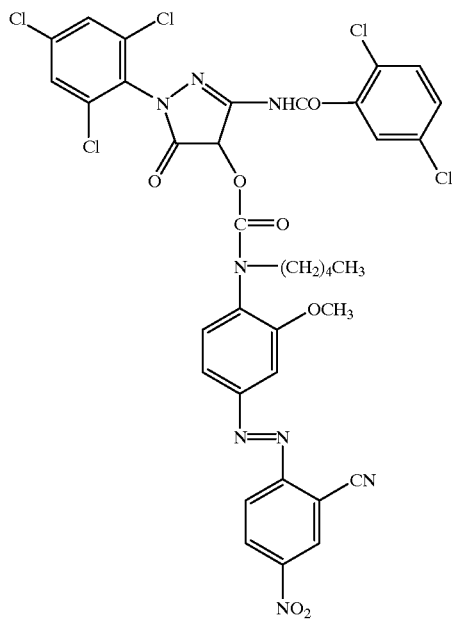

I-89
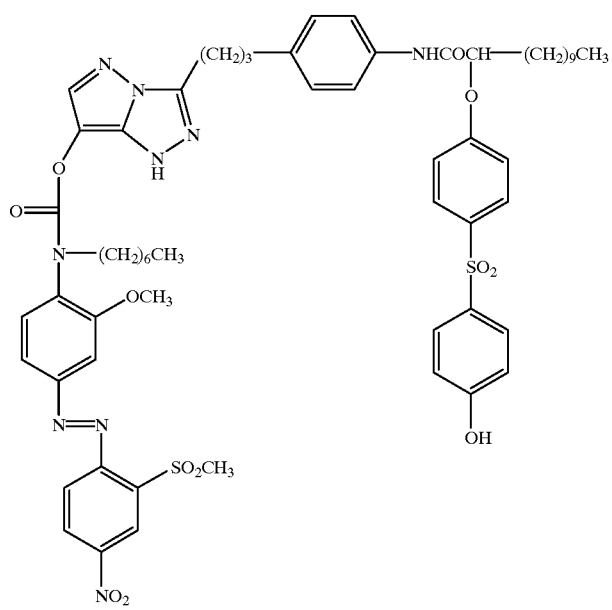
I-90
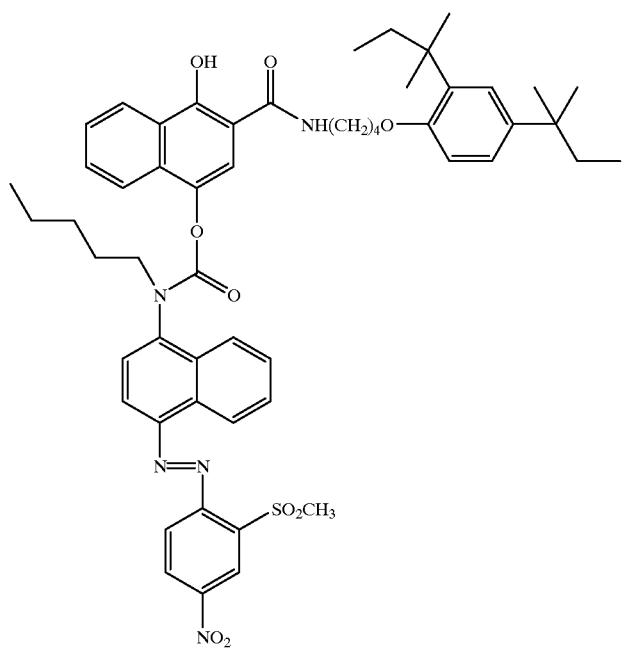

-continued
I-91
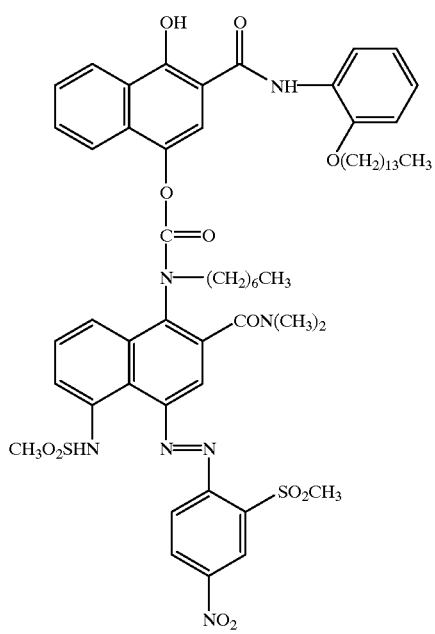
I-92
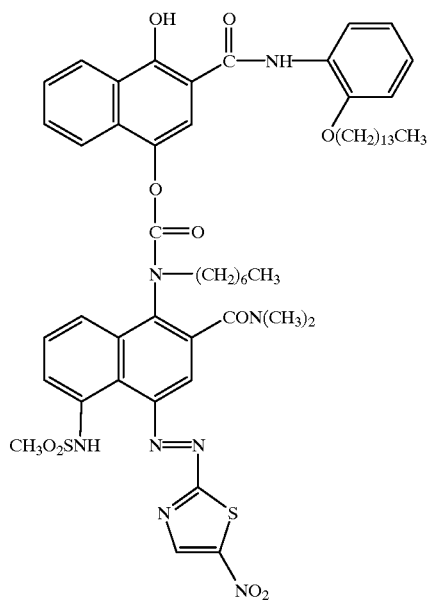

I-93
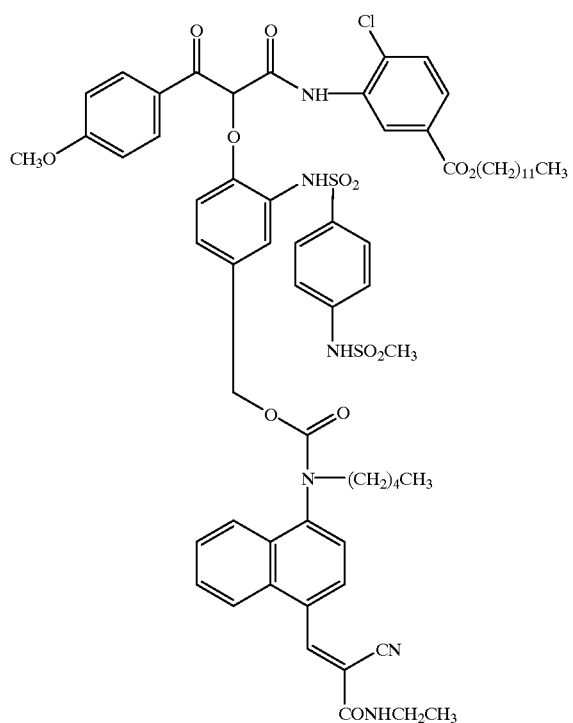
I-94
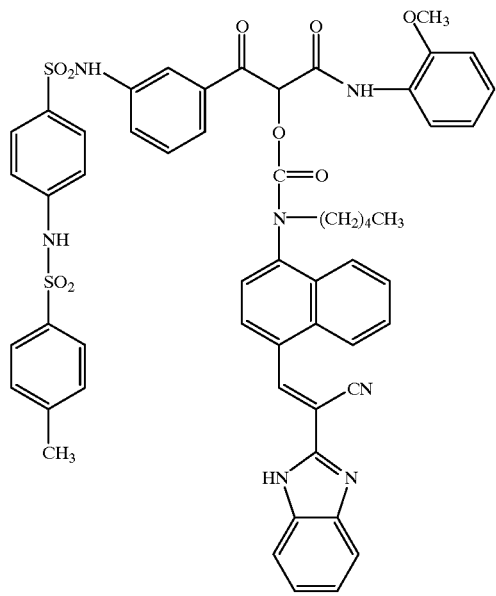

-continued
I-95
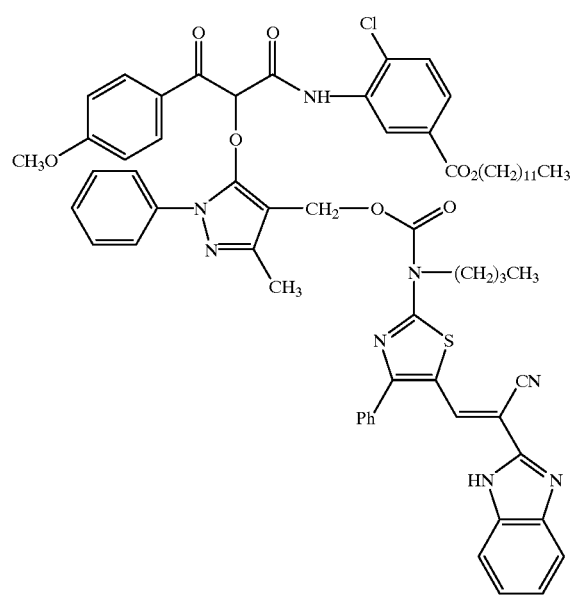
I-96
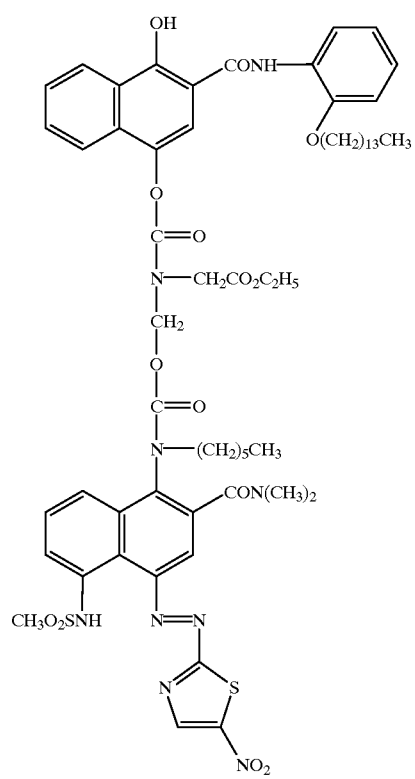

I-97
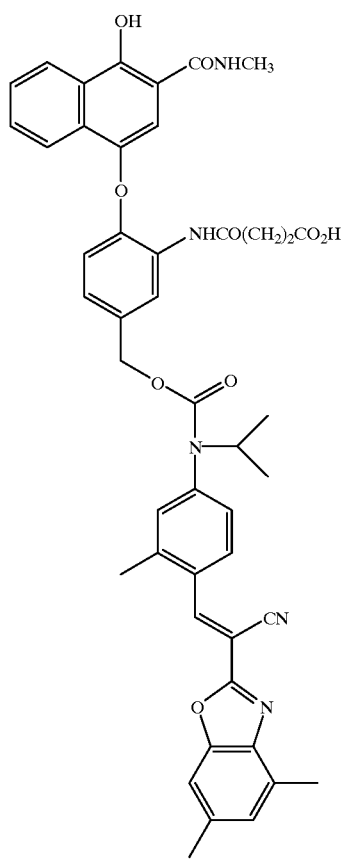
I-98
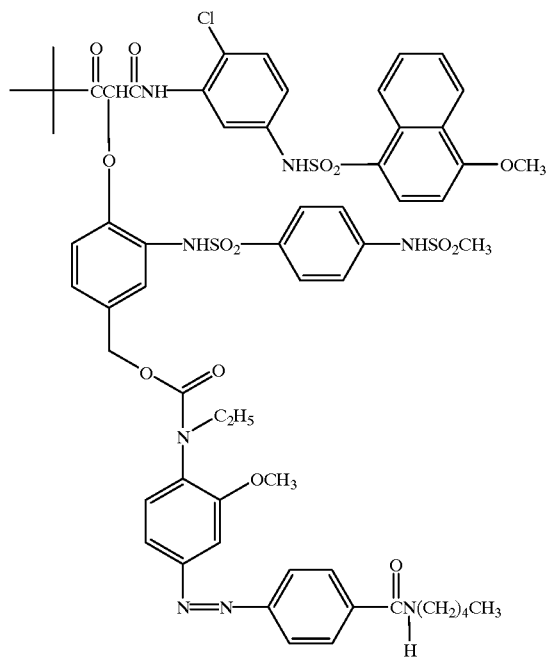

I-99
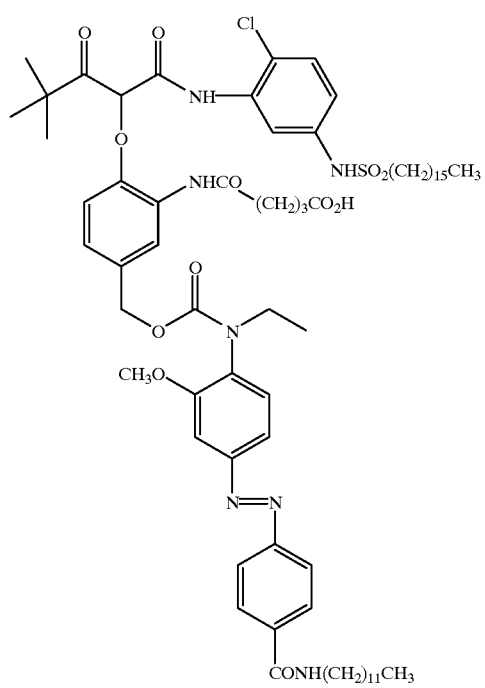
I-100
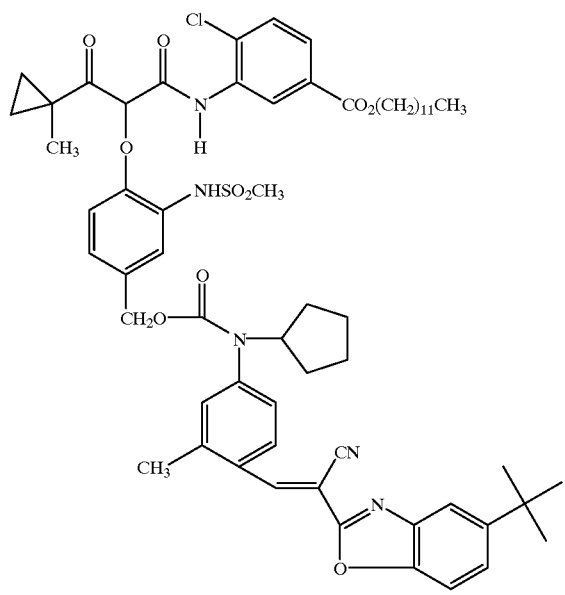

-continued
I-101
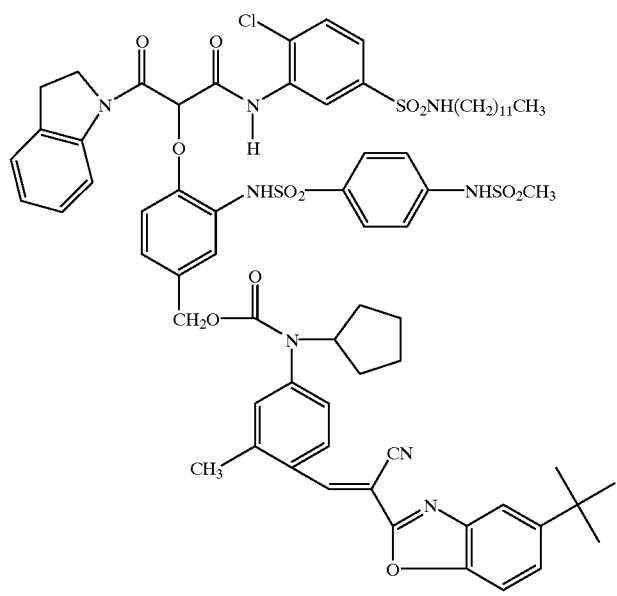
I-102
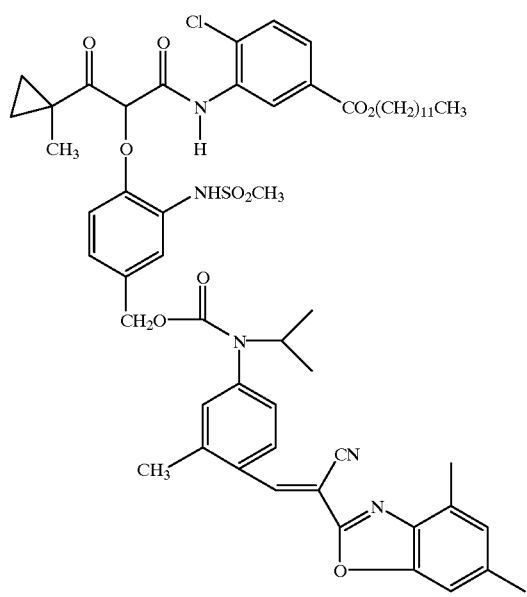

I-103

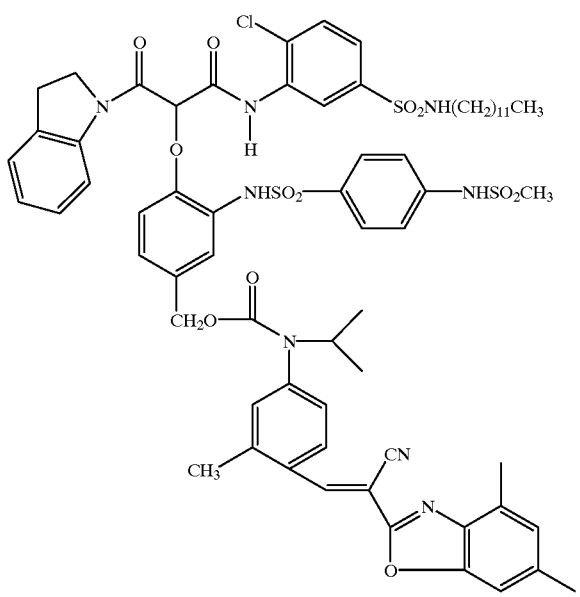

In addition to the foregoing, it may generally desired that the photographic element of the invention contain reduced laydowns of silver and have a low molar ratio of dye theoretically formable from the coupler of the invention to silver present in the layer. More specifically, the element contains less than 90% of the silver typically employed in an element employing conventional couplers and having the same sensitometry. It is not possible to specify the absolute levels of silver that may be employed since the amounts will vary depending on the coupler reactivities and many other components of the element. However, the applicable level of silver required for a conventional coupler to achieve a given aim sensitometry can be reduced significantly, i.e. by 10% to 35% and approaching 50% when the inventive couplers are used.

The present invention provides low silver laydowns in conjunction with low molar ratios of dye theoretically formable from the high dye yield couplers of the invention to silver. This enables not only conservation of the silver and dye required to attain the desired sensitometry, but also provides mass efficiency in the coupler necessary to produce the necessary color image density and contrast.

It is possible to provide a coupler in accordance with the invention so that the first dye is ballasted to be completely immobile or so that it has limited mobility in the developer or other processing solution. It is also within the contemplation of the invention to include in association with the silver halide emulsion of the invention one or more additional couplers that are conventional image couplers or that are PUG releasing couplers, as described more fully herein.

The dyes formed by the coupler of the invention may be within any desired color range. Yellow, cyan and magenta are the ranges most commonly used in color negative today. The first and second dyes of the invention are the same color if they have maximum absorbance in the same range, i.e. 400–500 nm, 500–600 nm, or 600–700 nm. Where the two dyes are the same color they will typically have absorption maxima within 25 nm of each other. Photographic elements which may use the invention include image capture color negative, color print, and reversal to name a few.

In a particularly suitable form of the invention, the silver halide layer of the invention represents at least one layer, preferably the fast or high sensitivity layer, of a multilayered color record. Such a layer is normally above the slower layers of the color record and contains a larger silver halide grain size for speed purposes. Use of the invention with respect to that layer provides significant improvement in granularity while permitting thinning of the layer allowing less degradation of the light image formed in underlying layers. The invention has particular suitability with tabular grains to enable superior grain reduction. It may also be desirable to employ the coupler of the invention in a less sensitive imaging layer of a color record where finer grain emulsions are typically employed.

The method of the invention provides for the exposure of a photographic element of the invention followed by contacting the element with a color developing chemical to form a color image. Color forming chemicals are described more fully hereinafter.

As used herein, the term substituent, unless otherwise specifically stated, has a broad definition. The substituent may be, for example, halogen, such as chlorine, bromine or fluorine; nitro; hydroxyl; cyano; and —$CO_2H$ and its salts; and groups which may be further substituted, such as alkyl, including straight or branched chain alkyl, such as methyl, trifluoromethyl, ethyl, t-butyl, 3-(2,4-di-t-amylphenoxy) propyl, and tetradecyl; alkenyl, such as ethylene, 2-butene; alkoxy, such as methoxy, ethoxy, propoxy, butoxy, 2-methoxyethoxy, sec-butoxy, hexyloxy, 2-ethylhexyloxy, tetradecyloxy 2-(2,4-di-t-pentylphenoxy)ethoxy, and 2-dodecyloxyethoxy; aryl such as phenyl, 4-t-butylphenyl, 2,4,6-trimethylphenyl, naphthyl; aryloxy, such as phenoxy, 2-methylphenoxy, alpha- or beta-naphthyloxy, and 4-tolyloxy; carbonamido, such as acetamido, benzamido, butyramido, tetradecanamido, alpha-(2,4-di-t-pentylphenoxy)acetamido, alpha-(2,4-di-t-pentylphenoxy) butyramido, alpha-(3-pentadecylphenoxy)-hexanamido, alpha-(4-hydroxy-3-t-butylphenoxy)-tetradecanamido, 2-oxo-pyrrolidin-1-yl, 2-oxo-5 -tetradecylpyrrolin-1-yl, N-methyltetradecanamido, N-succinimido, N-phthalimido, 2,5-dioxo-1-oxazolidinyl, 3-dodecyl-2,5-dioxo-1-imidazolyl, and N-acetyl-N-dodecylamino, ethoxycarbonylamino, phenoxycarbonylamino, benzyloxycarbonylamino, hexadecyloxycarbonylamino, 2,4-di-t-butylphenoxycarbonylamino, phenylcarbonylamino, 2,5-(di-t-pentylphenyl) carbonylamino, p-dodecyl-phenylcarbonylamino, p-toluylcarbonylamino, N-methylureido, N,N-dimethylureido, N-methyl-N-dodecylureido, N-hexadecylureido, N,N-dioctadecylureido, N,N-dioctyl-N'-ethylureido, N-phenylureido, N,N-diphenylureido, N-phenyl-N-p-toluylureido, N-(m-hexadecylphenyl)ureido, N,N-(2,5-di-t-pentylphenyl)-N'-ethylureido, and t-butylcarbonamido; sulfonamido, such as methylsulfonamido, benzenesulfonamido, p-toluylsulfonamido, p-dodecylbenzenesulfonamido, N-methyltetradecylsulfonamido, N,N-dipropylsulfamoylamino, and hexadecylsulfonamido; sulfamoyl, such as N-methylsulfamoyl, N-ethylsulfamoyl, N,N-dipropylsulfamoyl, N-hexadecylsulfamoyl, N,N-dimethylsulfamoyl; N-[3-(dodecyloxy)propyl]sulfamoyl, N-[4-(2,4-di-t-pentylphenoxy)butyl]sulfamoyl, N-methyl-N-tetradecylsulfamoyl, and N-dodecylsulfamoyl; carbamoyl, such as N-methylcarbamoyl, N,N-dibutylcarbamoyl, N-octadecylcarbamoyl, N-[4-(2,4-di-t-pentylphenoxy)butyl]carbamoyl, N-methyl-N-tetradecylcarbamoyl, and N,N-dioctylcarbamoyl; acyl, such as acetyl, (2,4-di-t-amylphenoxy)acetyl, phenoxycarbonyl, p-dodecyloxyphenoxycarbonyl methoxycarbonyl, butoxycarbonyl, tetradecyloxycarbonyl, ethoxycarbonyl, benzyloxycarbonyl, 3-pentadecyloxycarbonyl, and dodecyloxycarbonyl; sulfonyl, such as methoxysulfonyl, octyloxysulfonyl, tetradecyloxysulfonyl, 2-ethylhexyloxysulfonyl, phenoxysulfonyl, 2,4-di-t-pentylphenoxysulfonyl, methylsulfonyl, octylsulfonyl, 2-ethylhexylsulfonyl, dodecylsulfonyl, hexadecylsulfonyl, phenylsulfonyl, 4-nonylphenylsulfonyl, and p-toluylsulfonyl; sulfonyloxy, such as dodecylsulfonyloxy, and hexadecylsulfonyloxy; sulfinyl, such as methylsulfinyl, octylsulfinyl, 2-ethylhexylsulfinyl, dodecylsulfinyl, hexadecylsulfinyl, phenylsulfinyl, 4-nonylphenylsulfinyl, and p-toluylsulfinyl; thio, such as ethylthio, octylthio, benzylthio, tetradecylthio, 2-(2,4-di-t-pentylphenoxy) ethylthio, phenylthio, 2-butoxy-5-t-octylphenylthio, and p-tolylthio; acyloxy, such as acetyloxy, benzoyloxy, octadecanoyloxy, p-dodecylamidobenzoyloxy, N-phenylcarbamoyloxy, N-ethylcarbamoyloxy, and cyclohexylcarbonyloxy; amine, such as phenylanilino, 2-chloroanilino, diethylamine, dodecylamine; imino, such as 1 (N-phenylimido)ethyl, N-succinimido or 3-benzylhydantoinyl; phosphate, such as dimethylphosphate and ethylbutylphosphate; phosphite, such as diethyl and dihexylphosphite; a heterocyclic group, a heterocyclic oxy group or a heterocyclic thio group, each of which may be substituted and which contain a 3 to 7 membered heterocyclic ring composed of carbon atoms and at least one hetero atom selected from the group consisting of oxygen, nitrogen and sulfur, such as 2-furyl, 2-thienyl, 2-benzimidazolyloxy or 2-benzothiazolyl; and silyloxy, such as trimethylsilyloxy.

The particular substituents used may be selected to attain the desired photographic properties for a specific application and can include, for example, hydrophobic groups, solubilizing groups, etc. Generally, the above groups and substituents thereof may typically include those having 1 to 42 carbon atoms and usually less than 24 carbon atoms, but greater numbers are possible depending on the particular substituents selected. Moreover, as indicated, the substituents may themselves be suitably substituted with any of the above groups.

The materials of the invention can be used in any of the ways and in any of the combinations known in the art. Typically, the invention materials are combined with a silver halide emulsion and the mixture is coated as a layer on a support to form part of a photographic element. Alternatively, they can be incorporated at a location adjacent to the silver halide emulsion layer where, during development, they will be in reactive association with development products such as oxidized color developing agent. Thus, as used herein, the term "associated" signifies that the compound is in the silver halide emulsion layer or in an adjacent location where, during processing, it is capable of reacting with silver halide development products.

Typically, the total quantity of high dye-yield coupler incorporated in any single layer of an element according to this invention will be less than about 1 gram per square meter. It is generally preferred that the total quantity of high dye-yield coupler in any single layer of an element of this invention will be less than about 0.7 grams per square meter, while a total quantity of less than about 0.4 grams per square meter is even more preferred. In a similar vein, the total quantity of gelatin in the same layer as a high dye-yield coupler of this invention will generally be less than about 2.5 grams per square meter, with a gelatin quantity of less than about 1.5 grams, being more preferred and a total gelatin quantity of less than about 1 gram per square meter being even more preferred. The total quantity of light sensitive silver halide in the same layer as a high dye-yield coupler according to this invention will generally be less than about 1 gram per square meter, preferably less than about 0.8 grams per square meter and more preferably less than about 0.5 grams per square meter. Limit on total quantity of high dye-yield coupler and associated light sensitive silver and gelatin aids in maintaining the range of total coated thicknesses desired for multilayer multicolor photographic elements useful in the practice of this invention, when such factors as coating strength, integrity, emulsion developability and such are considered.

It may be desirable to include a high molecular weight hydrophobe or "ballast" group in the component molecule to control the migration of various components. Representative ballast groups include substituted or unsubstituted alkyl or aryl groups containing 8 to 42 carbon atoms. Representative substituents on such groups include alkyl, aryl, alkoxy, aryloxy, alkylthio, hydroxy, halogen, alkoxycarbonyl, aryloxycarbonyl, carboxy, acyl, acyloxy, amino, anilino, carbonamido, carbamoyl, alkylsulfonyl, arysulfonyl, sulfonamido, and sulfamoyl groups wherein the substituents typically contain 1 to 42 carbon atoms. Such substituents can also be further substituted.

The photographic elements can be single color elements or multicolor elements. Multicolor elements contain image dye-forming units sensitive to each of the three primary regions of the spectrum. Each unit can comprise a single emulsion layer or multiple emulsion layers sensitive to a given region of the spectrum. The layers of the element, including the layers of the image-forming units, can be arranged in various orders as known in the art. In an alternative format, the emulsions sensitive to each of the three primary regions of the spectrum can be disposed as a single segmented layer.

A typical multicolor photographic element comprises a support bearing a cyan dye image-forming unit comprised of at least one red-sensitive silver halide emulsion layer having associated therewith at least one cyan dye-forming coupler, a magenta dye image-forming unit comprising at least one green-sensitive silver halide emulsion layer having associated therewith at least one magenta dye-forming coupler, and a yellow dye image-forming unit comprising at least one blue-sensitive silver halide emulsion layer having associated therewith at least one yellow dye-forming coupler. The element can contain additional layers, such as filter layers, interlayers, overcoat layers, subbing layers, and the like.

It is generally preferred to minimize the thickness of the element above the support so as to improve sharpness and improve access of processing solutions to the components of the element. For this reason, thicknesses of less than 30 micrometers are preferred and thicknesses of between about 10 and 25 micrometers are even more preferred. These lowered thicknesses can be especially enabled at manufacture by use of surfactants and coatings aids as known in the art so as to control viscosity and shear. Both sharpness and ease of processing may be further improved by minimizing the quantity of incorporated silver in the element. While any useful quantity of light sensitive silver may be employed in the elements of this invention, total silver quantities of between about 0.1 and 12 grams per square meter are contemplated and total silver of less than about 7 grams per square meter are preferred. Total silver of between about 1.5 and about 5 grams per square meter are even more preferred for color negative and color reversal applications. Total silver of between about 0.1 and 0.9 grams is even more preferred for color paper applications. Sharpness and color rendition in color images is further improved by complete removal of silver and silver halide from the element on processing. Since more swellable elements enable better access of components of processing solutions to the elements of this invention, swell ratios above 1.25 are preferred, with swell ratios of between 1.4 and 6 being more preferred and swell ratios of between 1.7 and 3 being most preferred. The balance of total thickness, total silver and swell ratio most suitable for an element intended for a specific purpose being readily derived from the image structure, color reproduction, sensitivity and physical integrity and photographic resistance to pressure required for that purpose as known in the art.

If desired, the photographic element can be used in conjunction with an applied magnetic layer as described in *Research Disclosure,* November 1992, Item 34390 published by Kenneth Mason Publications, Ltd., Dudley Annex, 12a North Street, Emsworth, Hampshire P010 7DQ, ENGLAND; and in U.S. Pat. Nos. 5,252,441; 5,254,449; and 5,254,446; the contents of which are incorporated herein by reference.

Color negative films employing such layers can be employed, in combination with cameras that can record and cause to be stored on such a layer, various useful information related to the use and history of the film. Specific examples include exposure information on a per scene and per roll basis. These films can then be processed in automated processing apparatus that can retrieve film characteristic information as well as film exposure and use information, and optionallly modify the processing to ensure optimal performance and optionally record the details of processing of the magentic layer. The films can then be printed using automated printers that can retrieve both film and process history information and optionally alter, based on the information, exposure characteristics chosen from printing time, printing light intensity, printing light color balance, printing light color temperature, printing magnification or printing lens adjustment, exposure, or printing time, and the color filters so as to enable production of well-balanced display prints from various color originating materials. These layers can be located on the same side of the support as light sensitive layers or arranged so that the support is between the magnetic layer and the light sensitive layers. This information is useful in altering film processing and printing conditions so as to aid in producing a pleasing image.

It is specifically contemplated to employ supports bearing magnetic layers as described.

The supports employed in this invention are flexible supports. Typical flexible supports include films of cellulose nitrate, cellulose acetate, polyvinylacetal, polyethylene terephthalate, polycarbonate and related resinous and polymeric materials as well as paper. Paper supports can be coated with baryta and/or an alpha-olefin containing 2 to 10 carbon atoms such as polyethylene, polypropylene, ethylene-butene copolymers and the like.

These supports can be of any suitable thickness and will preferably be less than about 150 micrometers thick, more preferably between about 50 and 130 micrometers thick and most preferably between about 75 and 110 micrometers thick.

When the light sensitive elements of this invention are color negative or color reversal materials, it is generally intended that they be supplied on spools or in cartridge form generally as known in the art. When the element is supplied in spool form it may be wrapped about a core and enclosed in a removable housing with an exposed film leader as known in the art. When the element is supplied in cartridge form, the cartridge may enclose a light sensitive photographic element in roll form and a housing surrounding the film to form a cartridge receptacle for protecting the film from exposure and an opening for withdrawing the film from the cartridge receptacle. It is further intended that such materials be supplied in a length which results in the element being forced to assume a radius of curvature of less than about 12,000 micrometers, and preferably a radius of curvature less than about 9,000 or 6,500 or even 6,000 micrometers or even less.

In another embodiment, the element may be supplied on similar or even less demanding spools and forced by a camera mechanism or the like through a constricted radius of curvature as small as 1,400 or even 1,000 microns. This severe curvature may occur in a consumer loadable camera or in a preloaded camera as known in the art. These cameras can provide specific features as known in the art such as shutter means, film advance means, waterproof housings, single or multiple lenses, lens selection means, variable aperture, focus or focal length lenses, means for monitoring lighting conditions, means for altering shutter times or lens characteristics based on lighting conditions or user provided instructions, and means for recording use conditions directly on the film. When the element is supplied in a preloaded camera, the camera may comprise a lens, a shutter, the element in roll form, means for holding the element in roll form prior to exposure, means for mounting a portion of the element for exposure through the lens, means for receiving portions of the element from the mounting means, and a housing for mounting the lens and shutter and for restricting light access to the film to that entering the camera through the lens.

In the following discussion of suitable materials for use in the emulsions and elements of this invention, reference will be made to *Research Disclosure,* December 1989, Item 308119, available as described above, which will be identified hereafter by the term "Research Disclosure." The contents of the Research Disclosure, including the patents and publications referenced therein, are incorporated herein by reference, and the Sections hereafter referred to are Sections of the Research Disclosure. The materials of the invention may also be used in conjunction with the materials described in *Koukai Gihou No.* 94-6023, Hatsumei Kyoukai, March 1994, available from the Japanese Patent Office, which is incorporated herein by reference.

The silver halide emulsions employed in the elements of this invention can be either negative-working or positive-working. Suitable emulsions and their preparation as well as methods of chemical and spectral sensitization are described in Sections I through IV. Color materials and development modifiers are described in Sections VII and XXI. Vehicles are described in Section IX, and various additives such as brighteners, antifoggants, stabilizers, light absorbing and scattering materials, hardeners, coating aids, plasticizers, lubricants and matting agents are described, for example, in Sections V, VI, VIII, X, XI, XII, and XVI. Manufacturing methods are described in Sections XIV and XV, other layers and supports in Sections XIII and XVII, processing methods and agents in Sections XIX and XX, and exposure alternatives in Section XVIII.

Coupling-off groups are well known in the art. Such groups can determine the chemical equivalency of a coupler, i.e., whether it is a 2-equivalent or a 4-equivalent coupler, or modify the reactivity of the coupler. Such groups can advantageously affect the layer in which the coupler is coated, or other layers in the photographic recording material, by performing, after release from the coupler, functions such as dye formation, dye hue adjustment, development acceleration or inhibition, bleach acceleration or inhibition, electron transfer facilitation, color correction and the like.

The presence of hydrogen at the coupling site provides a 4-equivalent coupler, and the presence of another coupling-off group usually provides a 2-equivalent coupler. Representative classes of such coupling-off groups include, for example, chloro, alkoxy, aryloxy, hetero-oxy, sulfonyloxy, acyloxy, acyl, heterocyclyl, sulfonamido, mercaptotetrazole, benzothiazole, mercaptopropionic acid, phosphonyloxy, arylthio, and arylazo. These coupling-off groups are described in the art, for example, in U.S. Pat. Nos. 2,455, 169, 3,227,551, 3,432,521, 3,476,563, 3,617,291, 3,880,661, 4,052,212 and 4,134,766; and in U.K. Patents and published application Nos. 1,466,728, 1,531,927, 1,533,039, 2,006, 755A and 2,017,704A, the disclosures of which are incorporated herein by reference.

It may be useful to use a combination of couplers any of which may contain known ballasts or coupling-off groups such as those described in U.S. Pat. No. 4,301,235; U.S. Pat. No. 4,853,319 and U.S. Pat. No. 4,351,897. The coupler may contain solubilizing groups such as described in U.S. Pat. No. 4,482,629. The coupler may also be used in association with "wrong" colored couplers (e.g. to adjust levels of interlayer correction) and, in color negative applications, with masking couplers such as those described in EP 213.490; Japanese Published Application 58-172,647; U.S. Pat. Nos. 2,983,608; 4,070,191; and 4,273,861; German Applications DE 2,706,117 and DE 2,643,965; U.K. Patent 1,530,272; and Japanese Application A-113935. The masking couplers may be shifted or blocked, if desired.

For example, in a color negative element, the materials of the invention may replace or supplement the materials of an element comprising a support bearing the following layers from top to bottom:

(1) one or more overcoat layers containing ultraviolet absorber(s);
(2) a two-coat yellow pack with a fast yellow layer containing "Coupler 1": Benzoic acid, 4-chloro-3-((2-(4-ethoxy-2,5-dioxo-3-(phenylmethyl)-1-imidazolidinyl)-3-(4-methoxyphenyl)-1,3 dioxopropyl)amino)-, dodecyl ester and a slow yellow layer containing the same compound together with "Coupler 2": Propanoic acid, 2-[[5-[[4-[2-[[[2,4-bis(1, 1-dimethylpropyl)phenoxy]acetyl]amino]-5-[(2,2,3,3, 4,4,4-heptafluoro-1-oxobutyl)amino]-4-hydroxyphenoxy]-2,3-dihydroxy-6-[(propylamino) carbonyl]phenyl]thio]-1,3,4-thiadiazol-2-yl]thio]-, methyl ester and "Coupler 3": 1-((dodecyloxy) carbonyl) ethyl(3-chloro-4-((3-(2-chloro-4-((1-tridecanoylethoxy) carbonyl)anilino)-3-oxo-2-((4)(5) (6)-(phenoxycarbonyl)-1H-benzotriazol-1-yl) propanoyl)amino))benzoate;
(3) an interlayer containing fine metallic silver;
(4) a triple-coat magenta pack with a fast magenta layer containing "Coupler 4": Benzamide, 3-((2-(2,4-bis(1, 1-dimethylpropyl)phenoxy)-1-oxobutyl)amino)-N-(4, 5-dihydro-5-oxo-1-(2,4,6-trichlorophenyl)-1H-pyrazol-3-yl)-, "Coupler 5": Benzamide, 3-((2-(2,4-bis (1,1-dimethylpropyl)phenoxy)-1-oxobutyl)amino)-N-(4',5'-dihydro-5'-oxo-1'-(2,4,6-trichlorophenyl) (1,4'-bi-1H-pyrazol)-3'-yl)-, "Coupler 6": Carbamic acid, (6 -(((3-(dodecyloxy)propyl) amino)carbonyl)-5-hydroxy-1-naphthalenyl)-, 2-methylpropyl ester , "Coupler 7": Acetic acid, ((2-((3-(((3-(dodecyloxy) propyl)amino) carbonyl)-4-hydroxy-8-(((2-methylpropoxy)carbonyl) amino)-1-naphthalenyl)oxy )ethyl)thio)-, and "Coupler 8" Benzamide, 3-((2-(2,4-bis(1,1-dimethylpropyl) phenoxy)-1-oxobutyl)amino)-N-(4,5-dihydro-4-((4-methoxyphenyl) azo)-5-oxo-1-(2,4,6-trichlorophenyl)-1H-pyrazol-3-yl)-; a mid-magenta layer and a slow magenta layer each containing "Coupler 9": a ternary copolymer containing by weight in the ratio 1:1:2 2-Propenoic acid butyl ester, styrene, and N-[1-(2,4,6-trichlorophenyl)-4,5-dihydro-5-oxo-1H-pyrazol-3-yl]-2-methyl-2-propenamide; and "Coupler 10": Tetradecanamide, N-(4-chloro-3-.((4-((4-((2,2-dimethyl-1-oxopropyl) amino)phenyl)azo)-4,5-dihydro-5-oxo-1-(2,4,6-trichlorophenyl)-1H-pyrazol-3-yl)amino)phenyl)-, in addition to Couplers 3 and 8;
(5) an interlayer;
(6) a triple-coat cyan pack with a fast cyan layer containing Couplers 6 and 7; a mid-cyan containing Coupler 6 and "Coupler 11": 2,7-Naphthalenedisulfonic acid, 5-(acetylamino)-3-((4-(2-((3-(((3-(2,4-bis(1,1-dimethylpropyl)phenoxy) propyl)amino)carbonyl)-4-hydroxy-1-naphthalenyl) oxy)ethoxy)phenyl)azo)-4-hydroxy-, disodium salt; and a slow cyan layer containing Couplers 2 and 6;
(7) an undercoat layer containing Coupler 8; and
(8) an antihalation layer.

In a color paper format, the materials of the invention may replace or supplement the materials of an element comprising a support bearing the following layers from top to bottom:
(1) one or more overcoats;
(2) a cyan layer containing "Coupler 1": Butanamide, 2-(2,4-bis(1,1-dimethylpropyl)phenoxy)-N-(3,5-dichloro-2-hydroxy-4-methylphenyl)-, "Coupler 2": Acetamide, 2-(2,4-bis(1,1-dimethylpropyl)phenoxy)-N-(3,5-dichloro-2-hydroxy-4-, and UV Stabilizers: Phenol, 2-(5-chloro-2H-benzotriazol-2-yl)-4,6-bis(1,1-dimethylethyl)-;Phenol, 2-(2H-benzotriazol-2-yl)-4-(1, 1-dimethylethyl)-;Phenol, 2-(2H-benzotriazol-2-yl)-4-(1,1-dimethylethyl)-6-(1-methylpropyl)-; and Phenol, 2-(2H-benzotriazol-2-yl)-4,6-bis(1,1-dimethylpropyl)- and a poly(t-butylacrylamide) dye stabilizer;

(3) an interlayer;

(4) a magenta layer containing "Coupler 3": Octanamide, 2-[2,4-bis(1,1-dimethylpropyl)phenoxy]-N-[2-(7-chloro-6-methyl-1H-pyrazolo[1,5-b][1,2,4]triazol-2-yl)propyl]- together with 1,1'-Spirobi(1H-indene), 2,2', 3,3'-tetrahydro-3,3,3',3'-tetramethyl-5,5',6,6'-tetrapropoxy-;

(5) an interlayer; and (6) a yellow layer sontaining "Coupler 4": 1-Imidazolidineacetamide, N-(5-((2-(2,4-bis(1,1-dimethylpropyl)phenoxy)-1-oxobutyl)amino)-2-chlorophenyl)-.alpha.-(2,2-dimethyl-1-oxopropyl)-4-ethoxy-2,5-dioxo-3-(phenylmethyl)-.

In a reversal format, the materials of the invention may replace or supplement the materials of an element comprising a support bearing the following layers from top to bottom:

(1) one or more overcoat layers;

(2) a nonsensitized silver halide containing layer;

(3) a triple-coat yellow layer pack with a fast yellow layer containing "Coupler 1": Benzoic acid, 4-(1-(((2-chloro-5-((dodecylsulfonyl)amino)phenyl) amino) carbonyl)-3,3-dimethyl-2-oxobutoxy)-, 1 -methylethyl ester; a mid yellow layer containing Coupler 1 and "Coupler 2": Benzoic acid, 4-chloro-3-[[2-[4-ethoxy-2,5-dioxo-3-(phenylmethyl)-1-imidazolidinyl]-4,4-dimethyl-1,3-dioxopentyl]amino]-, dodecylester; and a slow yellow layer also containing Coupler 2;

(4) an interlayer;

(5) a layer of fine-grained silver;

(6) an interlayer;

(7) a triple-coated magenta pack with a fast and mid magenta layer containing "Coupler 3": 2-Propenoic acid, butyl ester, polymer with N-[1-(2,5-dichlorophenyl)-4,5-dihydro-5-oxo-1H-pyrazol-3-yl]-2-methyl-2-propenamide; "Coupler 4": Benzamide, 3-((2-(2,4-bis(1,1-dimethylpropyl)phenoxy)-1-oxobutyl)amino)-N-(4,5-dihydro-5-oxo-1-(2,4,6-trichlorophenyl)-1H-pyrazol-3-yl)-; and "Coupler 5": Benzamide, 3-(((2,4-bis(1,1-dimethylpropyl)phenoxy) acetyl)amino)-N-(4,5-dihydro-5-oxo-1-(2,4,6-trichlorophenyl)-1H-pyrazol-3-yl)-; and containing the stabilizer 1,1'-Spirobi(1H-indene), 2,2',3,3'-tetrahydro-3,3,3',3'-tetramethyl-5,5',6,6'-tetrapropoxy-; and in the slow magenta layer Couplers 4 and 5 with the same stabilizer;

(8) one or more interlayers possibly including fine-grained nonsensitized silver halide;

(9) a triple-coated cyan pack with a fast cyan layer containing "Coupler 6": Tetradecanamide, 2-(2-cyanophenoxy)-N-(4-((2,2,3,3,4,4,4-heptafluoro-1-oxobutyl)amino)-3-hydroxyphenyl)-; a mid cyan containing "Coupler 7": Butanamide, N-(4-((2-(2,4-bis(1, 1-dimethylpropyl)phenoxy)-1-oxobutyl)amino)-2-hydroxyphenyl)-2,2,3,3,4,4,4-heptafluoro- and "Coupler 8": Hexanamide, 2-(2,4-bis(1,1-dimethylpropyl)phenoxy)-N-(4-((2,2,3,3,4,4,4-heptafluoro-1-oxobutyl)amino)-3-hydroxyphenyl)-; and a slow cyan layer containing Couplers 6, 7, and 8;

(10) one or more interlayers possibly including fine-grained nonsensitized silver halide; and

(11) an antihalation layer.

The inventive materials may be used in association with materials that accelerate or otherwise modify the processing steps e.g. of bleaching or fixing to improve the quality of the image. Bleach accelerator releasing couplers such as those described in EP 193,389; EP 301,477; U.S. Pat. No. 4,163,669; U.S. Pat. No. 4,865,956; and U.S. Pat. No. 4,923,784, may be useful. Also contemplated is use of the compositions in association with nucleating agents, development accelerators or their precursors (UK Patent 2,097,140; U.K. Patent 2,131,188); electron transfer agents (U.S. Pat. No. 4,859,578; U.S. Pat. No. 4,912,025); antifogging and anti color-mixing agents such as derivatives of hydroquinones, aminophenols, amines, gallic acid; catechol; ascorbic acid; hydrazides; sulfonamidophenols; and non color-forming couplers.

The invention materials may also be used in combination with filter dye layers comprising colloidal silver sol or yellow, cyan, and/or magenta filter dyes, either as oil-in-water dispersions, latex dispersions or as solid particle dispersions. Additionally, they may be used with "smearing" couplers (e.g. as described in U.S. Pat. No. 4,366,237; EP 96,570; U.S. Pat. No. 4,420,556; and U.S. Pat. No. 4,543,323.) Also, the compositions may be blocked or coated in protected form as described, for example, in Japanese Application 61/258,249 or U.S. Pat. No. 5,019,492.

The invention materials may further be used in combination with image-modifying compounds such as "Developer Inhibitor-Releasing" compounds (DIR's). DIR's useful in conjunction with the compositions of the invention are known in the art and examples are described in U.S. Pat. Nos. 3,137,578; 3,148,022; 3,148,062; 3,227,554; 3,384, 657; 3,379,529; 3,615,506; 3,617,291; 3,620,746; 3,701, 783; 3,733,201; 4,049,455; 4,095,984; 4,126,459; 4,149, 886; 4,150,228; 4,211,562; 4,248,962; 4,259,437; 4,362, 878; 4,409,323; 4,477,563; 4,782,012; 4,962,018; 4,500, 634; 4,579,816; 4,607,004; 4,618,571; 4,678,739; 4,746, 600; 4,746,601; 4,791,049; 4,857,447; 4,865,959; 4,880, 342; 4,886,736; 4,937,179; 4,946,767; 4,948,716; 4,952, 485; 4,956,269; 4,959,299; 4,966,835; 4,985,336 as well as in patent publications GB 1,560,240; GB 2,007,662; GB 2,032,914; GB 2,099,167; DE 2,842,063, DE 2,937,127; DE 3,636,824; DE 3,644,416 as well as the following European Patent Publications: 272,573; 335,319; 336,411; 346, 899; 362, 870; 365,252; 365,346; 373,382; 376,212; 377,463; 378,236; 384,670; 396,486; 401,612; 401,613.

Such compounds are also disclosed in "Developer-Inhibitor-Releasing (DIR) Couplers for Color Photography," C. R. Barr, J. R. Thirtle and P. W. Vittum in *Photographic Science and Engineering,* Vol. 13, p. 174 (1969), incorporated herein by reference. Generally, the developer inhibitor-releasing (DIR) couplers include a coupler moiety and an inhibitor coupling-off moiety (IN). The inhibitor-releasing couplers may be of the time-delayed type (DIAR couplers) which also include a timing moiety or chemical switch which produces a delayed release of inhibitor. Examples of typical inhibitor moieties are: oxazoles, thiazoles, diazoles, triazoles, oxadiazoles, thiadiazoles, oxathiazoles, thiatriazoles, benzotriazoles, tetrazoles, benzimidazoles, indazoles, isoindazoles, mercaptotetrazoles, selenotetrazoles, mercaptobenzothiazoles, selenobenzothiazoles, mercaptobenzoxazoles, selenobenzoxazoles, mercaptobenzimidazoles, selenobenzimidazoles, benzodiazoles, mercaptooxazoles, mercaptothiadiazoles, mercaptothiazoles, mercaptotriazoles, mercaptooxadiazoles, mercaptodiazoles, mercaptooxathiazoles, tellurotetrazoles or benzisodiazoles. In a preferred embodiment, the inhibitor moiety or group is selected from the following formulas:

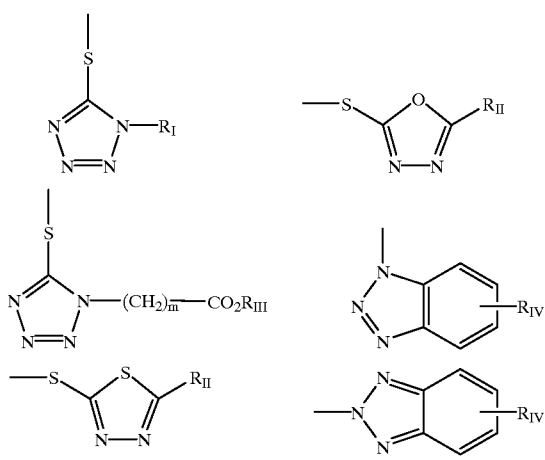

wherein $R_I$ is selected from the group consisting of straight and branched alkyls of from 1 to about 8 carbon atoms, benzyl, phenyl, and alkoxy groups and such groups containing none, one or more than one such substituent; $R_{II}$ is selected from $R_I$ and $-SR_I$; $R_{III}$ is a straight or branched alkyl group of from 1 to about 5 carbon atoms and m is from 1 to 3; and $R_{IV}$ is selected from the group consisting of hydrogen, halogens and alkoxy, phenyl and carbonamido groups, $-COOR_V$ and $-NHCOOR_V$ wherein $R_V$ is selected from substituted and unsubstituted alkyl and aryl groups.

Although it is typical that the coupler moiety included in the developer inhibitor-releasing coupler forms an image dye corresponding to the layer in which it is located, it may also form a different color as one associated with a different film layer. It may also be useful that the coupler moiety included in the developer inhibitor-releasing coupler forms colorless products and/or products that wash out of the photographic material during processing (so-called "universal" couplers).

As mentioned, the developer inhibitor-releasing coupler may include a timing group, which groups have been described earlier with respect to the high dye-yield coupler of the invention. Suitable developer inhibitor-releasing couplers for use in the present invention include, but are not limited to, the following:

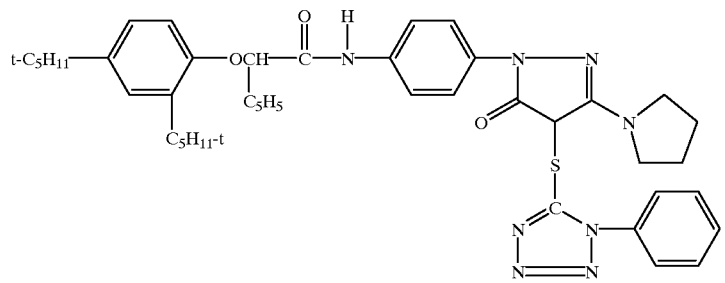

D1

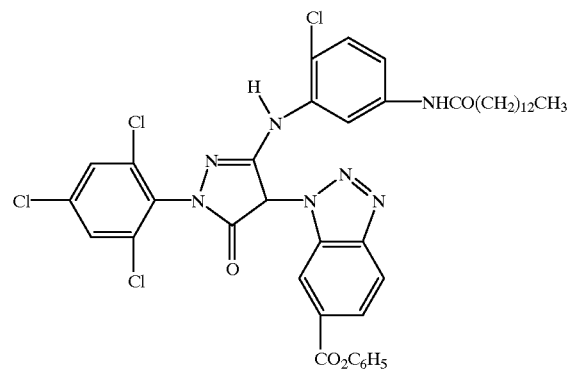

D2

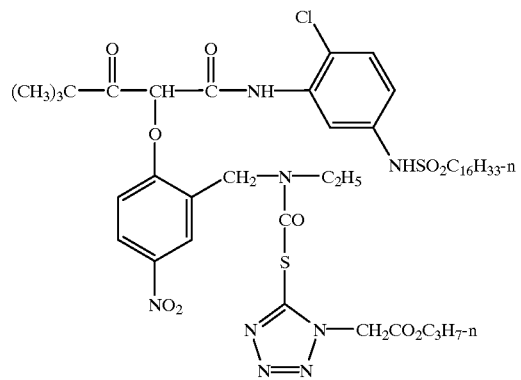

D3

D4
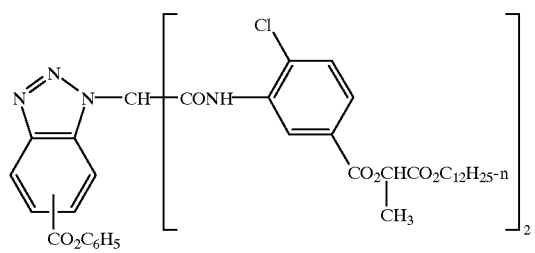
D5
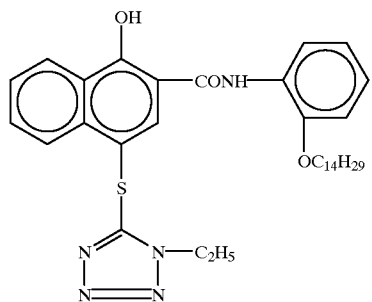
D6
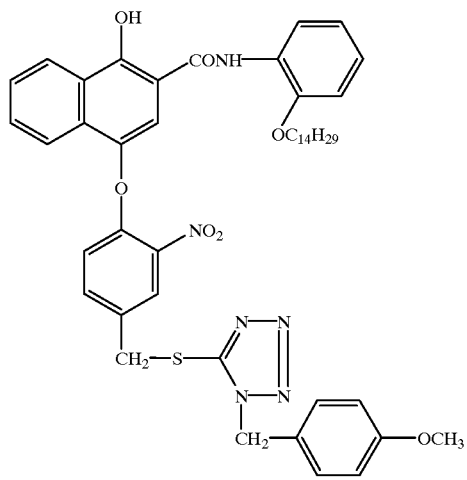
D7
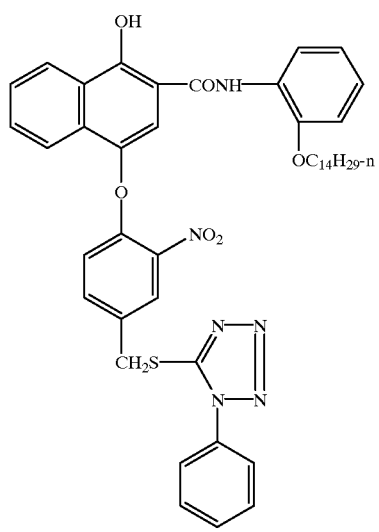

D8

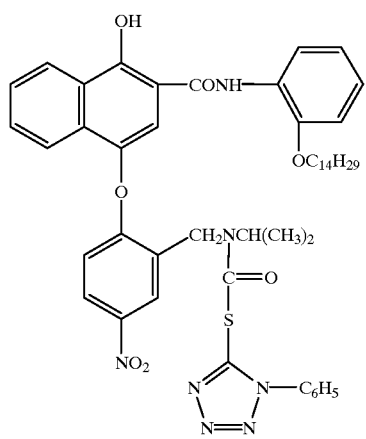

D9

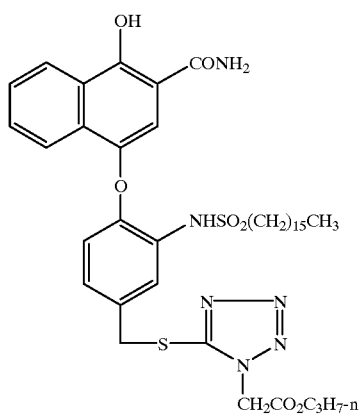

D10

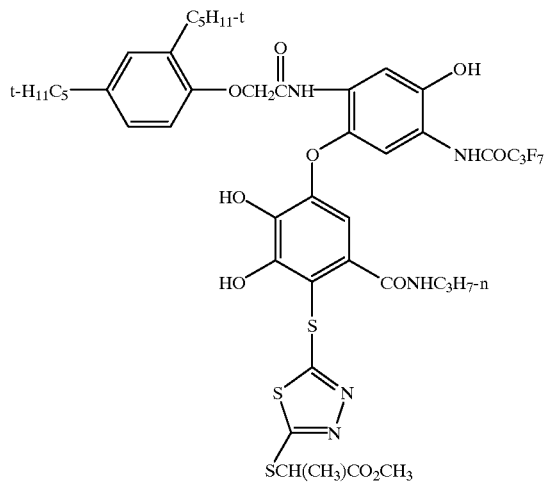

It is also contemplated that the concepts of the present invention may be employed to obtain reflection color prints as described in Research Disclosure, November 1979, Item 18716, available from Kenneth Mason Publications, Ltd, Dudley Annex, 12a North Street, Emsworth, Hampshire P0101 7DQ, England, incorporated herein by reference. Materials of the invention may be coated on pH adjusted support as described in U.S. Pat. No. 4,917,994; on a support with reduced oxygen permeability (EP 553,339); with epoxy solvents (EP 164,961); with nickel complex stabilizers (U.S. Pat. No. 4,346,165; U.S. Pat. No. 4,540,653 and U.S. Pat. No. 4,906,559 for example); with ballasted chelating agents such as those in U.S. Pat. No. 4,994,359 to reduce sensitivity to polyvalent cations such as calcium; and with stain reducing compounds such as described in U.S. Pat. No. 5,068,171. Other compounds useful in combination with the invention are disclosed in Japanese Published Applications described in Derwent Abstracts having accession numbers as follows: 90-072,629, 90-072,630; 90-072,631; 90-072,632; 90-072, 633; 90-072,634; 90-077,822; 90-078,229; 90-078,230; 90-079,336; 90-079,337; 90-079,338; 90-079,690; 90-079, 691; 90-080,487; 90-080,488; 90-080,489; 90-080,490; 90-080,491; 90-080,492; 90-080,494; 90-085,928; 90-086, 669; 90-086,670; 90-087,360; 90-087,361; 90-087,362;

90-087,363; 90-087,364; 90-088,097; 90-093,662; 90-093,663; 90-093,664; 90-093,665; 90-093,666; 90-093,668; 90-094,055; 90-094,056; 90-103,409; 83-62,586; 83-09,959.

Especially useful in this invention are tabular grain silver halide emulsions. Specifically contemplated tabular grain emulsions are those in which greater than 50 percent of the total projected area of the emulsion grains are accounted for by tabular grains having a thickness of less than 0.3 micron (0.5 micron for blue sensitive emulsion) and an average tabularity (T) of greater than 25 (preferably greater than 100), where the term "tabularity" is employed in its art recognized usage as $$T=ECD/t^2$$

where

ECD is the average equivalent circular diameter of the tabular grains in micrometers and t is the average thickness in micrometers of the tabular grains.

The average useful ECD of photographic emulsions can range up to about 10 micrometers, although in practice emulsion ECD's seldom exceed about 4 micrometers. Since both photographic speed and granularity increase with increasing ECD's, it is generally preferred to employ the smallest tabular grain ECD's compatible with achieving aim speed requirements.

Emulsion tabularity increases markedly with reductions in tabular grain thickness. It is generally preferred that aim tabular grain projected areas be satisfied by thin (t<0.2 micrometer) tabular grains. To achieve the lowest levels of granularity it is preferred that aim tabular grain projected areas be satisfied with ultrathin (t<0.06 micrometer) tabular grains. Tabular grain thicknesses typically range down to about 0.02 micrometer. However, still lower tabular grain thicknesses are contemplated. For example, Daubendiek et al U.S. Pat. No. 4,672,027 reports a 3 mole percent iodide tabular grain silver bromoiodide emulsion having a grain thickness of 0.017 micrometer. Ultrathin tabular grain high chloride emulsions are disclosed by Maskasky U.S. Pat. No. 5,217,858.

As noted above tabular grains of less than the specified thickness account for at least 50 percent of the total grain projected area of the emulsion. To maximize the advantages of high tabularity it is generally preferred that tabular grains satisfying the stated thickness criterion account for the highest conveniently attainable percentage of the total grain projected area of the emulsion. For example, in preferred emulsions, tabular grains satisfying the stated thickness criteria above account for at least 70 percent of the total grain projected area. In the highest performance tabular grain emulsions, tabular grains satisfying the thickness criteria above account for at least 90 percent of total grain projected area.

Suitable tabular grain emulsions can be selected from among a variety of conventional teachings, such as those of the following: Research Disclosure, Item 22534, January 1983, published by Kenneth Mason Publications, Ltd., Emsworth, Hampshire P010 7DD, England; U.S. Pat. Nos. 4,439,520; 4,414,310; 4,433,048; 4,643,966; 4,647,528; 4,665,012; 4,672,027; 4,678,745; 4,693,964; 4,713,320; 4,722,886; 4,755,456; 4,775,617; 4,797,354; 4,801,522; 4,806,461; 4,835,095; 4,853,322; 4,914,014; 4,962,015; 4,985,350; 5,061,069 and 5,061,616.

Silver chloride tabular grains useful in this invention include those having {100} major faces. These grains are both morphologically stable and capable of being readily sensitized with a variety of sensitizing dyes. Silver chloride emulsions characterized by at least 50 percent of the grain population projected area being accounted for by tabular grains (1) bounded by {100} major faces having adjacent edge ratios of less than 10 and (2) each having an aspect ratio of at least 2, as described by House et al in allowed U.S. application Ser. No. 112,489 and by Maskasky in U.S. Pat. No. 5,264,337 and allowed U.S. Ser. No. 035,349 the disclosures of which are incorporated herein by reference, are suitable for the invention.

The emulsions can be surface-sensitive emulsions, i.e., emulsions that form latent images primarily on the surfaces of the silver halide grains, or the emulsions can form internal latent images predominantly in the interior of the silver halide grains. The emulsions can be negative-working emulsions, such as surface-sensitive emulsions or unfogged internal latent image-forming emulsions, or direct-positive emulsions of the unfogged, internal latent image-forming type, which are positive-working when development is conducted with uniform light exposure or in the presence of a nucleating agent.

Photographic elements can be exposed to actinic radiation, typically in the visible region of the spectrum, to form a latent image and can then be processed to form a visible dye image. Processing to form a visible dye image includes the step of contacting the element with a color developing agent to reduce developable silver halide and oxidize the color developing agent. Oxidized color developing agent in turn reacts with the coupler to yield a dye.

With negative-working silver halide, the processing step described above provides a negative image. The described elements can be processed in the known C-41 color process as described in The British Journal of Photography Annual of 1988, pages 191–198. Where applicable, the element may be processed in accordance with color print processes such a the RA-4 process of Eastman Kodak Company as described in the British Journal of Photography Annual of 1988, Pp 198–199. To provide a positive (or reversal) image, the color development step can be preceded by development with a non-chromogenic developing agent to develop exposed silver halide, but not form dye, and followed by uniformly fogging the element to render unexposed silver halide developable. Alternatively, a direct positive emulsion can be employed to obtain a positive image.

Preferred color developing agents are p-phenylenediamines such as:

4-amino-N,N-diethylaniline hydrochloride, 4-amino-3-methyl-N,N-diethylaniline hydrochloride, 4-amino-3-methyl-N-ethyl-N-(β-(methanesulfonamido) ethyl) aniline sesquisulfate hydrate, 4-amino-3-methyl-N-ethyl-N-(β-hydroxyethyl)aniline sulfate, 4-amino-3-β-(methanesulfonamido)ethyl-N,N-diethylaniline hydrochloride and 4-amino-N-ethyl-N-(2-methoxyethyl)-m-toluidine di-p-toluene sulfonic acid.

Development is usually followed by the conventional steps of bleaching, fixing, or bleach-fixing, to remove silver or silver halide, washing, and drying.

It is understood throughout this specification and claims that any reference to a substituent by the identification of a group containing a substitutable hydrogen (e.g. alkyl, amine, aryl, alkoxy, heterocyclic, etc.), unless otherwise specifically stated, shall encompass not only the substituent's unsubstituted form, but also its form further substituted with any photographically useful substituents. Usually the further substituent will have less than 30 carbon atoms and typically less than 20 carbon atoms.

The invention disclosed herein can be used in combination with one or more of the inventions disclosed in applications cofiled herewith under Ser. No. 08/250,258, now abandoned, Ser. No. 08/250,742, now abandoned, Ser. No. 08/250,744, now U.S. Pat. No. 5,457,004, and Ser. No. 08/250,416, now U.S. Pat. No. 5,447,819, the contents of which are incorporated herein in their entirety.

The couplers of the invention can be prepared by methods known in the organic synthesis art including those methods described in U.S. Pat. No. 4,840,884.

Coupler Synthesis
Preparation of Coupler Having the Formula:

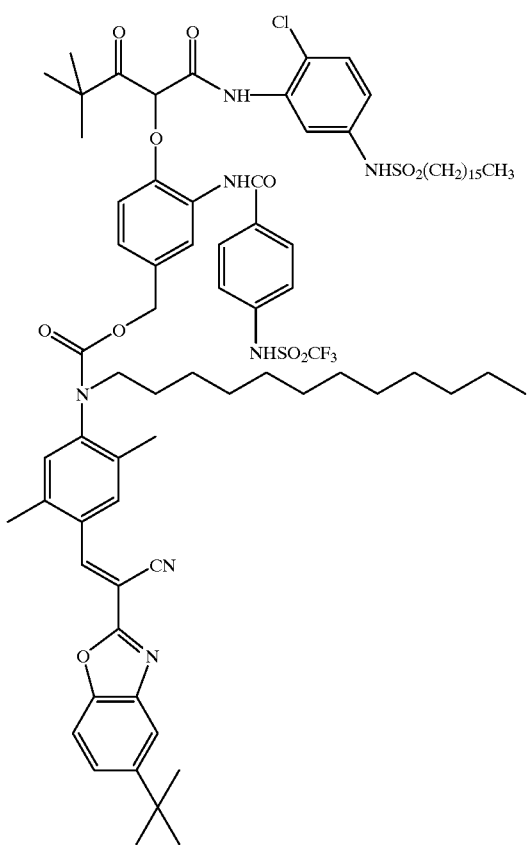

The overall scheme for the synthesis of the coupler is illustrated in Scheme I. The linking group intermediate 10 was prepared in four steps. Commercially available methyl-p-amino benzoate (78.6 g, 0.52 mole) was dissolved in about 500 mL of methylene chloride containing 2,6-lutidine (56 g, 0.52 mole, 60.7 mL), cooled in an ice bath, and treated with trifluoromethane sulfonic anhydride (146 g, 0.52 mole/l in 50 mL of methylene chloride) dropwise over 5 min. The reaction mixture was warmed to room temperature over 30 min before washing with excess 2N HCl. The organic phase was then washed four times with 250 mL portions of 1N NaHCO$_3$. The aqueous washes were acidified with 12N HCl to precipitate a creamy solid which was collected, washed with water, and air dried to yield 86 g of the trifluoromethylsulfonamide (methyl-p-trifluoromethyl-sulfonamido benzoate). This trifluoromethylsulfonamide (86 g, 0.3 mole) was added to a stirred solution of NaOH (55 g, 1.38 mole) in 660 mL of water. The mixture was stirred for about 15 min before acidifying with excess 2N HCl to yield a precipitate that was collected, washed with water, and air dried to yield 72 g of the saponified benzoic acid. This benzoic acid (74.9 g, 0.278 mole) was converted to acid chloride by stirring in a mixture of 350 mL ethyl acetate, 3 drops of DMF, and 53 g (0.417 mole) oxalyl chloride for 3 hr. Solvents were distilled off under vacuum and residual oxalyl chloride was chased three times with a mixture of 150 mL methylene chloride and 50 mL heptane. The crude oil was mixed with 25 mL of heptane and placed in a refrigerator overnight. The crystals that formed were slurried in about 200 mL of heptane and air dried to yield 57.6 g of the acid chloride. This acid chloride (57.6 g, 0.198 mole, in 100 mL tetrahydrofuran) was added dropwise over 10 min with good stirring to a solution of 3-amino-4-hydroxy benzyl alcohol (27.5 g, 0.198 mole) in 100 mL of pyridine cooled to 5° C. in a 3-neck round-bottomed flask fitted with mechanical stirrer. After 30 min at room temperature, the reaction mixture was diluted with 300 mL of ethyl acetate and washed with excess 2N HCl and water. The organic layer was dried over MgSO$_4$ and stripped to a crude oil that crystallized rapidly with addition of 200 ml heptane. The crystals were collected and air dried to yield 69 g of the linking group 10. This linking group 10 was attached to coupler 11 by combining 32 g (0.082 mole) of 10 and 48.5 g (0.082 mole) of 11 with 200 mL of DMF and treating with tetramethylguanidine (18.8 g, 0.164 mole). The reaction mixture was stirred for 2 hr and then diluted with ethyl acetate and washed with excess 1N HCl and water. The organic layer was dried over MgSO$_4$ and concentrated to an oil. The oil was dissolved in 2 parts of ethyl acetate and diluted with 8 parts heptane. The solvents were evaporated with stirring to yield brown crystals. These crystals were slurried in heptane, collected, and air dried to yield about 60 g of coupler the target coupler.

The dye intermediate 13 was prepared according to Scheme II, illustrated below. Commercially available 2,5-dimethylaniline (50 g, 0.413 mole) was added to formic acid (46 g, 1 mole, 38 mL) in a round-bottomed flask fitted with a condenser and heating mantle. The mixture was heated to reflux for 2 hr and then cooled to room temperature before pouring into 2 L of cold water with good stirring. The resulting precipitate was collected and air dried to yield 61 g of the formamide (2,5-dimethylformanilide). This formamide (59.6 g, 0.4 mole) and bromodecane (104.6 g, 0.4 mole) were mixed with 40 mL t-butanol and 400 mL THF in a 3-neck round-bottomed flask fitted with a reflux condenser, heating mantle, and nitrogen purge. The mixture was treated with potassium t-butoxide (49.2 g), heated to reflux for 12 hr, cooled to room temperature, and diluted with ethyl acetate. The mixture was then washed with excess 1N HCl and water. The organic layer was dried over MgSO$_4$ and concentrated to yield about 120 g of crude alkylated formamide. Alkylated formamide (120 g, 0.38 mole) was dissolved in 420 mL acetic acid and 120 mL 12N HCl and heated to reflux for 16 hr. The solvents were distilled off under vacuum, and the resulting solid was collected and air dried to yield 107 g of the corresponding amine hydrochloride (2,5-dimethyl-N-dodecyl aniline hydrochloride). This amine hydrochloride (34.2 g, 0.105 mole) was mixed with 250 mL acetic acid, 20 mL 12N HCl, and 20 mL formaldehyde in a large mouth 3-L round-bottomed flask fitted with a mechanical stirrer and a heating mantle. The mixture was heated to about 80° C. before removing the heat and treating with N,N-dimethylnitrosoaniline (22.5 g, 0.15 mole) in portions over a 10-min interval with good stirring. The solvents were distilled off under vacuum and the resulting oil was dissolved in 300 mL of ethyl acetate and excess 2N HCl. The aqueous phase was washed an additional three times with 300 mL portions of ethyl acetate. These ethyl acetate extracts were passed through a pad of silica gel before removing solvent under vacuum to yield a slurry that crystallized with the addition of 500 mL of heptane. The crystals were collected and air dried to yield 17 g of the aldehyde (2,5-dimethyl-4-dodecylamino-benzaldehyde; DMBA).

Commercially available 4-t-butyl phenol (30 g, 0.2 mole) was dissolved in 200 mL ethyl acetate in a 600-mL round-bottomed flask fitted with a mechanical stirrer, and cooled to 0° C. The mixture was treated with nitric acid (13 mL, in 13 mL water) dropwise over 10 min and then a catalytic amount of $NaNO_2$. After 45 min the reaction was washed with excess 1N HCl and the organic layer was dried over $MgSO_4$ and stripped to yield 37 g of 2-nitro-4-t-butyl phenol. This nitrophenol (37 g, 0.19 mole) was dissolved in 100 mL ethyl acetate and placed into a Parr bottle with a teaspoon of 10% Pd/C. The mixture was placed on a hydrogenator under 50 psi hydrogen with agitation for 1 hr. The catalyst was filtered off through celite, and the ethyl acetate was stripped off under vacuum. The material crystallized with the addition of about 200 mL heptane to give 25.6 g of the corresponding amine (2-amino-4-t-butyl phenol).

Malononitrile (39.6 g, 0.6 mole) was dissolved in methanol (38 g, 1.2 mole, 48 mL) and 200 mL of methyl formate in a 1-L, 3-neck round-bottomed flask with an ice bath and addition funnel. The mixture was cooled to 10° C. and treated dropwise over 5 min with thionyl chloride (55 g, 0.46 mole, 33.6 mL). A precipitate formed after 30 min and an additional 100 mL of methyl formate was added. After 1 hr the precipitate was collected and air dried for 20 min to yield 52 g of the corresponding imine salt intermediate 14. This salt was stored in an air-tight bottle purged with nitrogen. This imine salt (10.7 g, 0.08 mole) and 2-amino-4-t-butyl phenol (6.6 g, 0.04 mole) were heated with 100 mL methanol at 60° C. for 10 min before diluting with 200 mL of ethyl acetate and excess water. The organic layer was dried over $MgSO_4$ and stripped to yield 8.6 g of the benzoxazole 15. This oil (4.5 g, 0.02 mole) and aldehyde DMBA (6.7 g, 0.02 mole) in 80 mL acetic acid and 3 drops of triethylamine were heated to 80° C. for 15 min and then stirred overnight at room temperature to give a slurry of crystals. The crystals were collected and washed with 100 mL methanol to give two crops yielding about 7 g of the methine dye 16. This dye (3.5 g, 0.0068 mole) was dissolved in about 25 mL methylene chloride and 2,6-lutidine (1.9 g, 0.017 mole). The mixture was treated with phosgene (1.93 M in toluene, 0.014 mole, 7.2 mL) over a 1 min interval. After 10 min the mixture was washed in a separatory funnel with excess cold 1N HCl, and then with cold water. The organic phase was dried over $MgSO_4$ and stripped to yield 3.7 g of the carbamoyl chloride 13. After scale-up, this carbamoyl chloride (17.9 g, 0.031 mole) was reacted with coupler 12 (29.3 g, 0.131 mole) in a 1-L, 3-neck round-bottomed flask fitted with nitrogen purge and containing dimethylamino pyridine (3.8 g, 0.031 mole) and 150 mL methylene chloride. The mixture was treated with DBU (14.1 g, 0.093 mole), stirred for 4 hr, diluted with ethyl acetate, and washed with excess 1N HCl and water. The organic layer was dried over $MgSO_4$ and concentrated to a crude oil that was chromatographed on silica gel using methylene chloride/heptane/ethyl acetate (5/3/2) as the eluent. About 20.5 g of the inventive coupler was obtained as a foam.

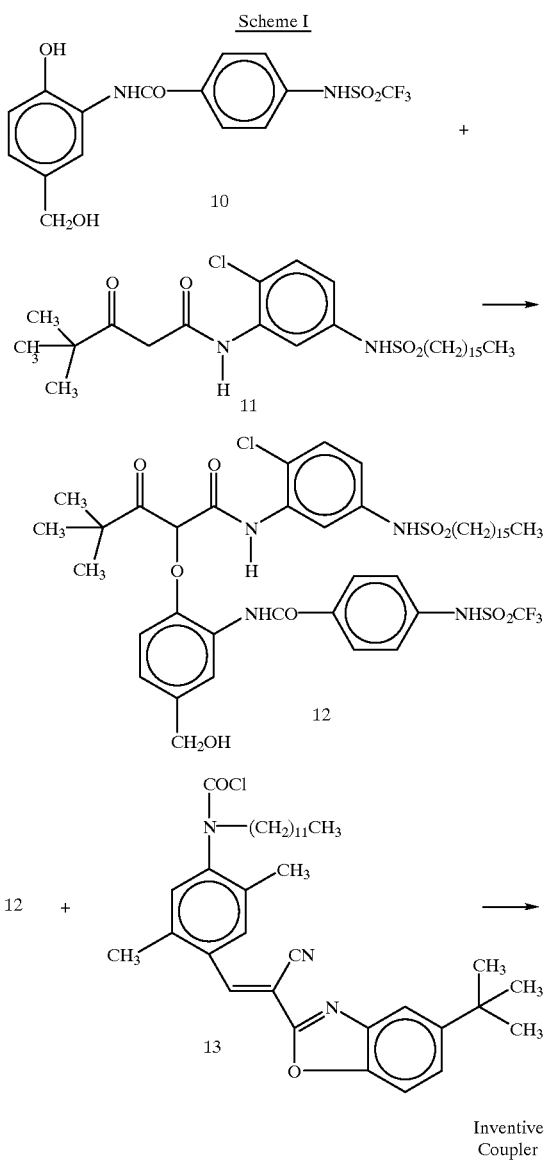

Scheme I

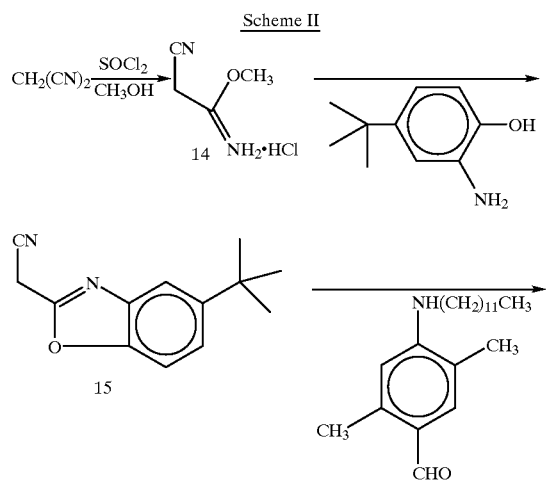

Scheme II

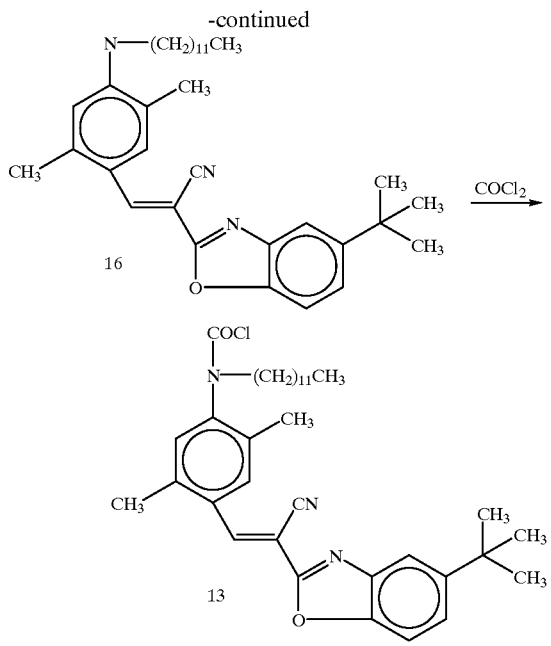

PHOTOGRAPHIC EXAMPLE

The following example serves to illustrate the invention:

Coating Format

A full multilayer coating was prepared in which all layers except those detailed below were common. Changes were made only to the interlayer below the fast yellow layer, and to the fast yellow layer. The interlayer was either present or was removed. Coupler and blue light sensitive silver halide emulsion level changes were made. The emulsion in this layer was a 1.3×0.13 micron, tabular silver bromoiodide emulsion. The relevant parts of the experiment are shown below.

| PART | Layer 13<br>FAST YELLOW | Layer 12<br>INTERLAYER |
|------|-------------------------|------------------------|
| 1 | Emulsion-0.39 g/m² <br> Gelatin-0.86 g/m² <br> Comp-1-0.13 g/m² <br> Y-1-0.04 g/m² <br> C-1-0.005 g/m² | Gelatin- <br> 1.07 g/m² |
| 2 | As Part 1 except remove <br> Comp-1. Add I-77-0.10 g/m² <br> Emulsion-0.19 g/m² | As Part 1 |
| 3 | As Part 2 except remove <br> I-77. Add I-99-0.11 g/m² <br> Emulsion-0.19 g/m² | As Part 1 |
| 4 | As Part 1 except <br> Emulsion-0.19 g/m² | As Part 1 |
| 5 | As Part 4 | Absent |
| 6 | As Part 3 | Absent |
| 7 | As Part 2 | Absent |

Comp-1 was coated at 16 micromole/m²; I-77 and I-99 were coated at 8 micromole/m².

The color photographic recording material for color negative development was prepared by applying the following layers in the given sequence to a transparent support of cellulose triacetate. The quantities of silver halide are given in g of silver per m². The quantities of other materials are given in g per m². All silver halide emulsions were stabilized with 2 grams of 4-hydroxy-6-methyl-1,3,3a,7-tetraazaindene per mole of silver. Formulas for the compounds employed are provided following the example.

Compounds M-1, M-2 and M-3 were used as emulsions containing tricresylphosphate; compounds C-1, C-2, Y-1 and C-4 were used as emulsions comprising di-n-butyl phthalate; compound C-6 was used as an emulsion comprising N-n-butyl acetanalide; while compounds UV-1 and UV-2 were used as 1:1 emulsions comprising 1,4-cyclohexylenedimethylene bis-(2-ethoxyhexanoate).

Layer 1 (Antihalation Layer) Black colloidal silver sol containing 0.323 g of silver with 4.8 g gelatin.

Layer 2 (Interlayer) Dye UV-1 at 0.075 g, dye M-4 at 0.022 g, M-5 at 0.097 g, scavenger S-1 at 0.11 g with 1.08 g gelatin.

Layer 3 (First Red-Sensitive Layer) Red sensitized silver iodobromide emulsion (3.8 mol % iodide, average grain diameter 0.4 microns, average grain thickness 0.1 micron) at 0.25 g, Coupler C-1 at 0.032 g, cyan dye-forming image coupler C-2 at 0.68 g, cyan dye-forming masking coupler C-4 at 0.043 g with gelatin at 1.29 g.

Layer 4 (Second Red-Sensitive Layer) Red sensitized silver iodobromide emulsion (4 mol % iodide, average grain diameter 0.56 microns, average grain thickness 0.14 micron) at 0.43 g, cyan dye-forming image coupler C-3 at 0.16 g, DIR compound C-5 at 0.022, cyan dye-forming masking coupler C-4 at 0.027 g with gelatin at 1.29 g.

Layer 5 (Third Red-Sensitive Layer) Red sensitized silver iodobromide emulsion (4 mol % iodide, average grain diameter 1 microns, average grain thickness 0.12 microns) at 0.41 g, cyan dye-forming image coupler C-3 at 0.11 g, DIR compound C-5 at 0.016 g, cyan dye-forming masking coupler C-4 at 0.005 g with gelatin at 1.18 g.

Layer 6 (Interlayer) Oxidized developer scavenger S-1 at 0.11 g and 1.08 g of gelatin.

Layer 7 (First Green-Sensitive Layer) Green sensitized silver iodobromide emulsion (4 mol % iodide, average grain diameter 0.4 microns, average thickness 0.1 microns) at 0.12 g, magenta dye-forming image coupler M-1 at 0.086 g, magenta dye-forming image coupler M-2 at 0.13 g, DIR compound C-6 at 0.006 g, magenta dye-forming masking coupler M-5 at 0.043 g with gelatin at 0.86 g.

Layer 8 (Second Green-Sensitive Layer) Green sensitized silver iodobromide emulsion (4 mol % iodide, average grain diameter 0.56 microns, average thickness 0.14 microns) at 0.94 g, magenta dye-forming image coupler M-1 at 0.09 g, magenta dye-forming image coupler M-2 at 0.054 g, DIR compound C-6 at 0.008 g, DIR compound M-3 at 0.008 g, magenta dye-forming masking coupler M-5 at 0.054 g, with gelatin at 1.88 g.

Layer 9 (Third Green-Sensitive Layer) Green sensitized silver iodobromide emulsion (4 mol % iodide, average grain diameter 1 microns, average grain thickness 0.12 microns) at 0.38 g, magenta dye-forming image coupler M-1 at 0.032 g, magenta dye-forming image coupler M-2 at 0.022 g, magenta dye-forming masking coupler M-5 at 0.011 g, DIR compound M-3 at 0.003 g, DIR compound Y-2 at 0.01 g, with gelatin at 1.13 g.

Layer 10 (Interlayer) Oxidized developer scavenger S-1 at 0.11 g, dye Y-3 at 0.15 g with 1.08 g of gelatin.

Layer 11 (First Blue-Sensitive Layer) Blue sensitized silver iodobromide emulsion (3.6 mol % iodide, average grain diameter 0.5 microns, average grain thickness 0.08 micron) at 0.15 g, blue sensitized silver iodobromide emulsion (3.6 mol % iodide, average grain diameter 1.05 microns, average grain thickness 0.12 micron) at 0.29 g, yellow dye-forming image coupler COMP-1 at 1.08 g, DIR compound Y-1 at 0.065 g, Coupler C-1 at 0.0054 with gelatin at 1.72 g.

Layer 12 (Interlayer) 1.07 g gelatin.

Layer 13 (Second Blue-Sensitive Layer) Blue sensitized silver iodobromide emulsion (4 mol % iodide, average grain diameter 1.35 microns, average grain thickness 0.13 microns) at 0.39 g, yellow dye-forming image coupler COMP-1 at 0.13 g, DIR compound Y-1 at 0.043 g, Coupler C-1 at 0.0054 with gelatin at 0.86 g.

Layer 14 (Protective Layer 1) 0.108 g of dye UV-1, 0.118 g of dye UV-2, unsensitized silver bromide Lippman emulsion at 0.108 g, dye C-7 at 0.006 g, with gelatin at 1.08 g and surfactant PF-1.

Layer 15 (Protective Layer 2) Anti-matte polymethylmethacrylate beads at 0.0538 g with gelatin at 0.91 g and surfactant PF-2.

This film was hardened at coating with 2% by weight to total gelatin of hardener. Surfactants, coating aids, scavengers, soluble absorber dyes and stabilizers were added to the various layers of this sample as is commonly practiced in the art. This sample had a total thickness above the support of about 22 micrometers.

The coatings were exposed to white light through a graduated density step chart and processed through a KODAK C-41 protocol. This gave the sensitometric data given in Table 1.

The coatings were then evaluated for the effect of bending on Dmin by drawing unexposed looped 35 mm filmstrips between a pair of parallel metal plates rigidly held 2.8 mm apart. The test was performed twice on separate strips of each sample, once with the film looped emulsion side in and once with the film looped emulsion side out. The stressed samples were processed through a KODAK C-41 protocol and the Dmin in stressed regions was compared to the Dmin in the unstressed regions of the samples. An increase in Dmin in the stressed regions is a measure of the film sample's response to being tightly rolled. Lower values are preferred since bend, kink or stress marks on a film intended for either direct viewing or printing will produce unsightly marks and blemishes which detract from the visual appearance of the final image. Lower values thus allow for the film to be used with spools of smaller radii of curvature.

As can be appreciated from examination of the data in Table 1, the reduction of silver level in the fast yellow layer combined with the use of a coupler of the invention gives surprisingly good resistance to the formation of kink induced marks while maintaining sensitometric performance.

TABLE I

| | | | Speed/ Sensitivity ($10^{logE}$) | Max Contrast | Dmin After Bending as a Percent of Dmin with No Bending | |
|---|---|---|---|---|---|---|
| Part | Type | Dmin | -% of 1 | -% of 1 | Emulsion Side In | Emulsion Side Out |
| 1 | Comp | .67 | 100.0 | 100 | 110.5 | 143.4 |
| 2 | Inv | .68 | 93.3 | 97.6 | 105.9 | 133.8 |
| 3 | Inv | .68 | 91.2 | 100 | 105.9 | 129.4 |
| 4 | Comp | .66 | 58.9 | 110.3 | 106.1 | 124.2 |
| 5 | Comp | .65 | 61.7 | 113.7 | 106.2 | 124.7 |
| 6 | Inv | .67 | 81.3 | 101.7 | 107.4 | 123.9 |
| 7 | Inv | .67 | 85.1 | 102.6 | 106.0 | 121.1 |

Comparison of parts 1 and 4 shows that with a conventional yellow coupler, when the silver level in the blue light sensitive layer is halved, a drop in bending fog occurs but at the expense of a large sensitivity or speed loss (41%). This loss is unacceptable, especially in high speed systems. Comparing parts 2 and 3 with 1 shows that only a small sensitivity loss (<9%) occurs as a consequence of halving the silver level in the presence of the inventive couplers. The reduction in bending fog is evident. Removing the interlayer has no effect with the conventional coupler (4 versus 5) and little noticeable effect where the emulsion is inside on an invention film (6 and 7 versus 3 and 2) but surprisingly improves the emulsion outside results with the invention film (6 and 7 versus 3 and 2).

Comp-1

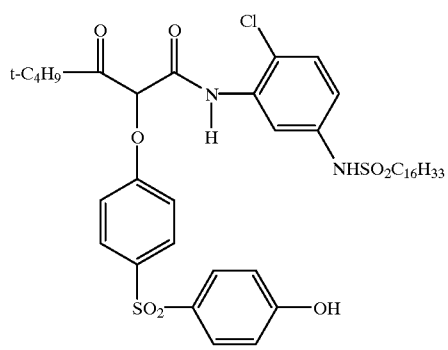

I-99
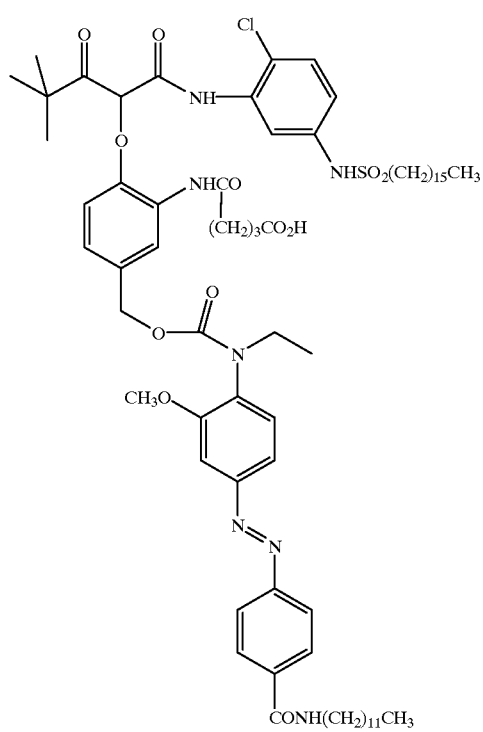
I-77
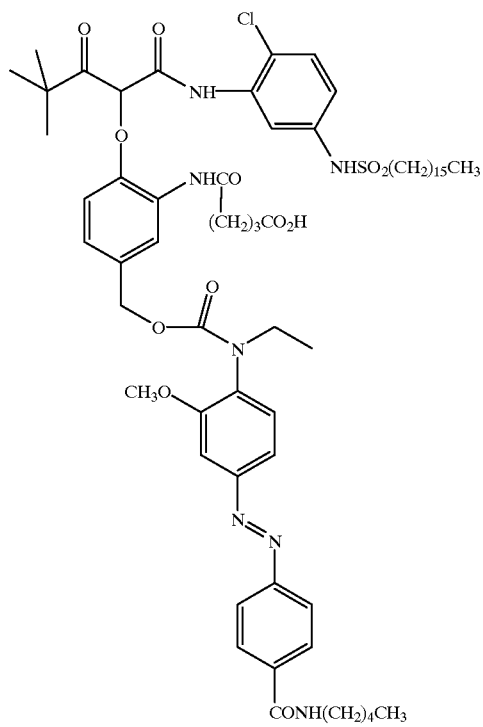

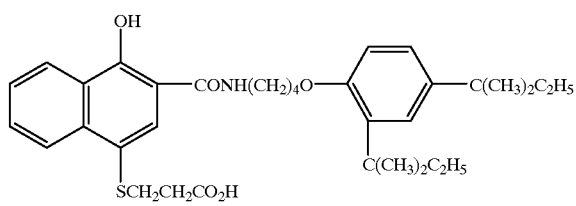
C-1
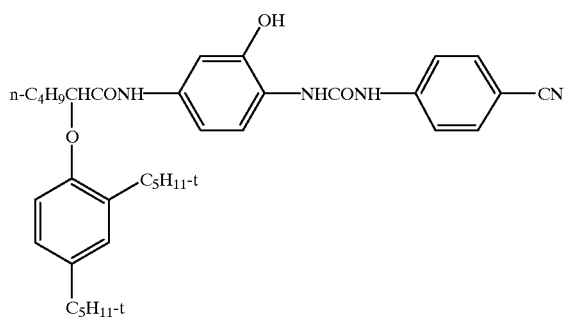
C-2
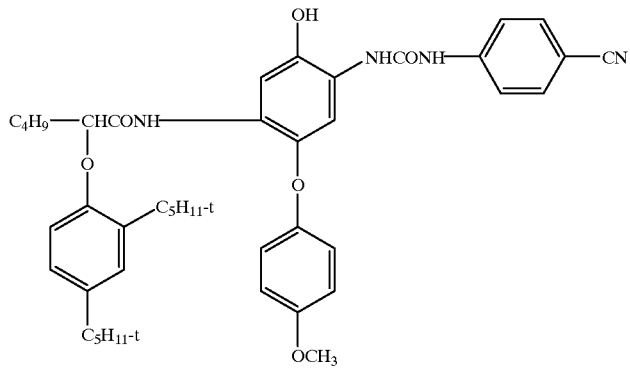
C-3
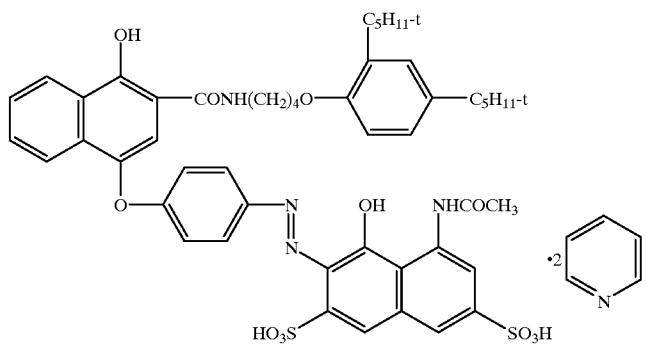
C-4
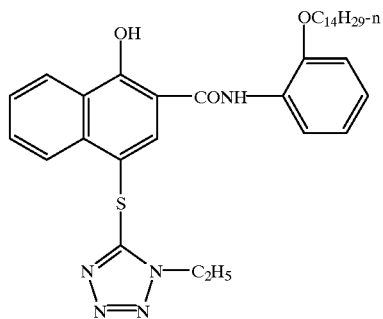
C-5

C-6
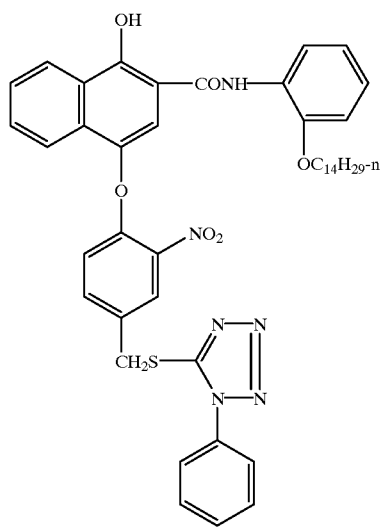
C-7
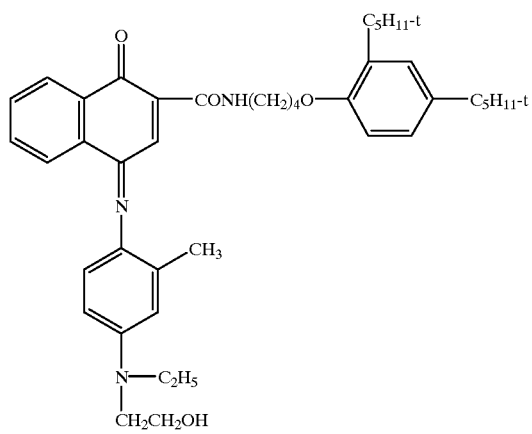
M-1
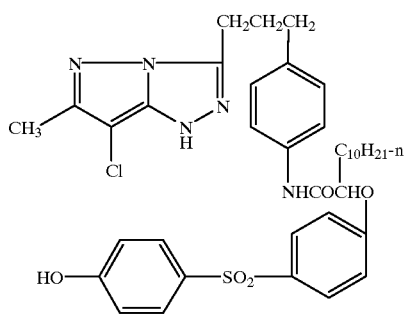
M-2
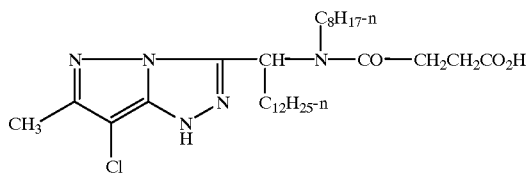

M-3
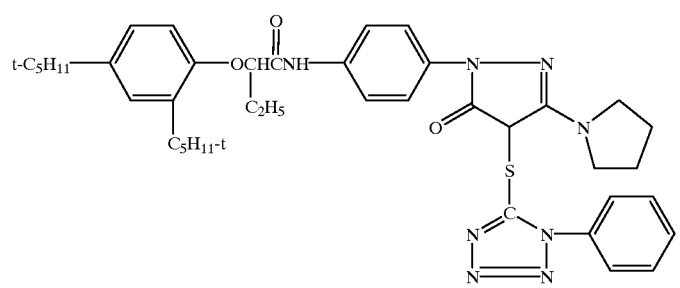
M-4
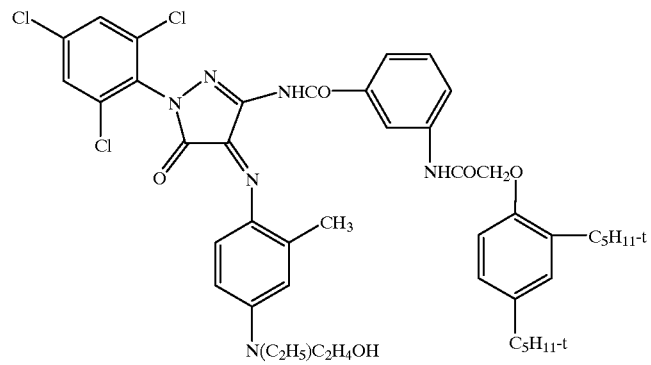
M-5
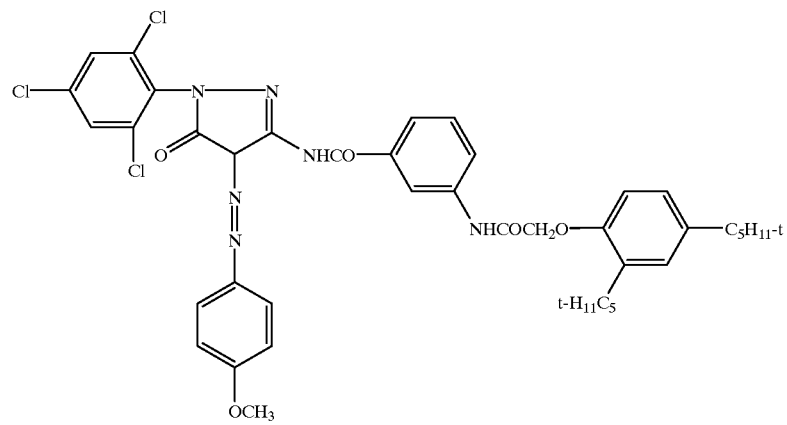
M-6
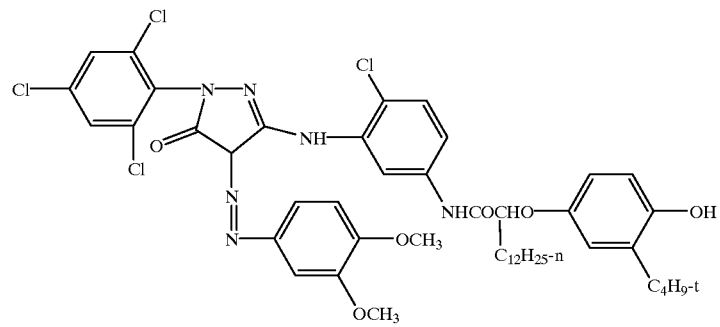
PF-1
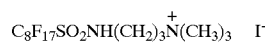
PF-2
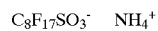

-continued

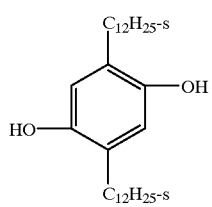

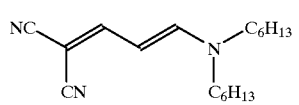

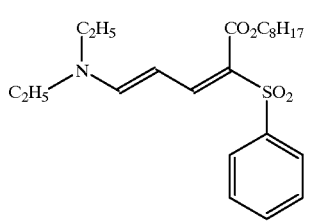

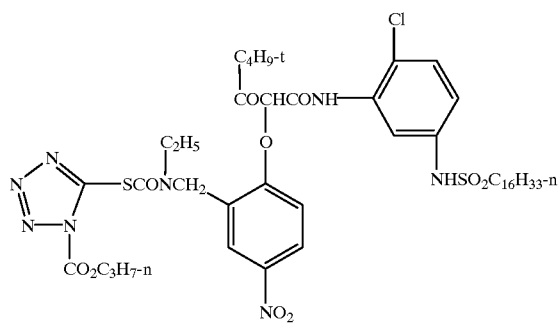

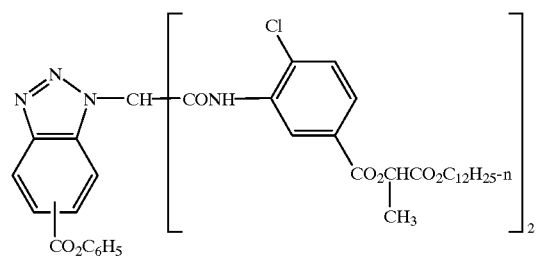

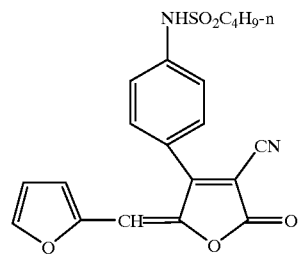

S-1

UV-1

UV-2

Y-1

Y-2

Y-3

The preceding examples are set forth to illustrate specific embodiments of this invention and are not intended to limit the scope of the materials or combinations of this invention. Additional embodiments and advantages within the scope of the claimed invention will be apparent to one skilled in the art. All previously cited patents, publications, and cofiled and copending patent applications are incorporated herein by reference in their entirety.

What is claimed is:

1. A tightly wrapped photographic element comprising a support bearing at least one photographic silver halide emulsion layer having associated therewith at least one high dye-yield coupler that releases a nondiffusible dye having an electrically neutral dye chromophore, wherein the total quantity of high dye yield coupler in any single layer of the element meets the following two limitations:

(a) is an amount sufficient to reduce the sensitivity by less than 9% when the silver level is halved, and (b) is about 0.11 g/m²;

said element having a radius of curvature of less than 6,000 micrometers.

2. The element of claim 1 wherein the high dye-yield coupler is capable of reacting with oxidized color developer to form a yellow dye.

3. The element of claim 1 wherein said high dye-yield coupler is one which releases a dye or dye precursor that contains a methine, azamethine, or azo group.

4. The element of claim 1 wherein said high dye-yield coupler is one wherein the released dye is yellow in color.

5. The element of claim 1 wherein the released dye has an electrically neutral dye chromophore bonded to a linking group selected from the group consisting of —OC(O)—, —OC(S)—, —SC(O)—, —SC(S)—, and —OC(=NSO₂R)— where R is a substituted or unsubstituted alkyl or aryl group.

6. The element of claim 1 wherein the high dye-yield coupler has the formula:

COUP-(T)$_m$-L-DYE where COUP is the parent group of the coupler capable of reacting at the coupling position with oxidized color developer to form a first dye, T is one or more optional timing groups with m=0 to 2, L is a linking group, and DYE is a second dye.

7. The element of claim 6 wherein L is selected from the group consisting of —OC(O)—, —OC(S)—, —SC(O)—, —SC(S)—, and —OC(=NSO₂R)— where R is a substituted or unsubstituted alkyl or aryl group.

8. The element of claim 6 wherein m is 1 or 2 and at least one T independently has a bond from COUP or another timing group to an oxygen atom which is bonded to a substituted or unsubstituted aromatic hydrocarbyl or heterocyclic ring at a location in conjugation with a methyl group on the ring which may optionally be substituted with one or two alkyl groups, where the methyl group is bonded to L-DYE or a second timing group.

9. The element of claim 6 wherein at least one T has the formula:

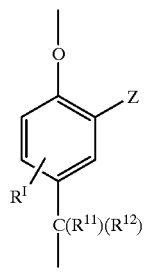

wherein Z is selected from the group consisting of nitro, cyano, alkylsulfonyl; sulfamoyl (—SO₂NR₂); and sulfonamido (—NRSO₂R) groups; R is hydrogen or a substituent; R', R¹¹ and R¹² are independently hydrogen or substituents that do not adversely affect the coupling and release reactions or the properties of the dyes formed thereby.

10. The element of claim 6 wherein COUP is an open chain ketomethylene compound capable of forming a yellow dye upon reaction with oxidized developer.

11. The element of claim 1 wherein the radius of curvature is less than 4000 micrometers.

12. The element of claim 1 wherein the radius of curvature is less than 2000 micrometers.

13. An image forming method comprising the steps of:

imagewise exposing a light sensitive photographic element comprised of a flexible support bearing at least one photographic silver halide emulsion having associated therewith at least one high dye-yield coupler that releases a dye having an electrically neutral chromophore wherein the total quantity of high dye yield coupler in any single layer of the element meets the following two limitations:

(a) is an amount sufficient to reduce the sensitivity by less than 9% when the silver level is halved, and (b) is about 0.11 g/m²;

bending said element through a radius of curvature of less that about 6,000 micrometers; and developing said element using a paraphenylene diamine developing agent to form a color image.

14. A film cartridge comprised of a light sensitive photographic element in roll form and a housing surrounding the film to form a cartridge receptacle for protecting the film from exposure and an opening for withdrawing the film from the cartridge receptacle; wherein said light sensitive photographic element comprises at least one photographic silver halide emulsion having associated therewith at least one high dye-yield coupler that releases a dye having an electronically neutral chromophore wherein the total quantity of high dye yield coupler in any single layer of the element meets the following two limitations:

(a) is an amount sufficient to reduce the sensitivity by less than 9% when the silver level is halved, and (b) is about 0.11 g/m²; and said element having a radius of curvature of less than about 6,000 micrometers.

15. A camera comprising a lens, a shutter, a light sensitive photographic element in roll form, means for holding the element in roll form prior to exposure, means for mounting a portion of the element for exposure through the lens, means for receiving portions of the element from the mounting means, and a housing for mounting the lens and shutter and for restricting light access to the film to that entering the camera through the lens; wherein said light sensitive photographic element comprises at least one photographic silver halide emulsion having associated therewith at least one high dye-yield coupler that releases a dye having an electrically neutral chromophore wherein the total quantity of high dye yield coupler in any single layer of the element meets the following two limitations:

(a) is an amount sufficient to reduce the sensitivity by less than 9% when the silver level is halved, and (b) is about 0.11 g/m²;

said element having a radius of curvature of less than about 6,000 micrometers.

16. A light sensitive photographic element according to claim 1 comprising a cyan dye image-forming unit comprised of at least one red-sensitive silver halide emulsion layer having associated therewith at least one cyan dye-forming image coupler, a magenta dye image-forming unit comprised of at least one green-sensitive silver halide emulsion layer having associated therewith at least one magenta dye-forming image coupler, and a yellow dye image-forming unit comprised of at least one blue-sensitive silver halide emulsion having associated therewith at least one yellow dye-forming image coupler.

* * * * *